(12) United States Patent
Wilson

(10) Patent No.: US 12,105,673 B2
(45) Date of Patent: Oct. 1, 2024

(54) SYSTEM AND METHOD FOR DIGITAL INFORMATION MANAGEMENT

(71) Applicant: SEFF TECHNOLOGY CORPORATION, Ottawa (CA)

(72) Inventor: Peter Wilson, Ottawa (CA)

(73) Assignee: SEFF TECHNOLOGY CORPORATION, Ottawa (CA)

( * ) Notice: Subject to any disclaimer, the term of this patent is extended or adjusted under 35 U.S.C. 154(b) by 0 days.

(21) Appl. No.: 18/012,460

(22) PCT Filed: Jun. 30, 2021

(86) PCT No.: PCT/CA2021/050906
§ 371 (c)(1),
(2) Date: Dec. 22, 2022

(87) PCT Pub. No.: WO2022/000090
PCT Pub. Date: Jan. 6, 2022

(65) Prior Publication Data
US 2023/0315685 A1    Oct. 5, 2023

Related U.S. Application Data

(60) Provisional application No. 63/046,269, filed on Jun. 30, 2020.

(51) Int. Cl.
*G06F 16/16* (2019.01)
*G06F 16/182* (2019.01)

(52) U.S. Cl.
CPC .......... *G06F 16/164* (2019.01); *G06F 16/182* (2019.01)

(58) Field of Classification Search
CPC ...... G06F 16/164; G06F 16/182; G06F 16/44; G06F 16/41; H04L 67/06
See application file for complete search history.

(56) References Cited

U.S. PATENT DOCUMENTS

| 10,219,047 | B1* | 2/2019 | Pawlik | H04N 21/2743 |
| 2007/0127888 | A1* | 6/2007 | Hayashi | G11B 27/322 |
| | | | | 386/230 |
| 2020/0014816 | A1* | 1/2020 | Speasl | H04N 1/00129 |

FOREIGN PATENT DOCUMENTS

WO    WO-2013140037 A1 *   9/2013   ......... G06F 17/3002

* cited by examiner

*Primary Examiner* — Mark D Featherstone
*Assistant Examiner* — Kweku William Halm

(57) ABSTRACT

Digital information management systems, methods and file formats are provided. One digital information management system comprises a receiving device comprising at least one processor and a memory storing instructions which when executed by the at least one processor configure the at least one processor to perform the method. The method comprises receiving a file construct from a source device, and rendering the file construct. Another digital information management system comprises at least one processor and a memory storing instructions which when executed by the at least one processor configure the at least one processor to perform another method. The other method comprises obtaining a file construct, and sending the file construct to a receiving device.

14 Claims, 42 Drawing Sheets

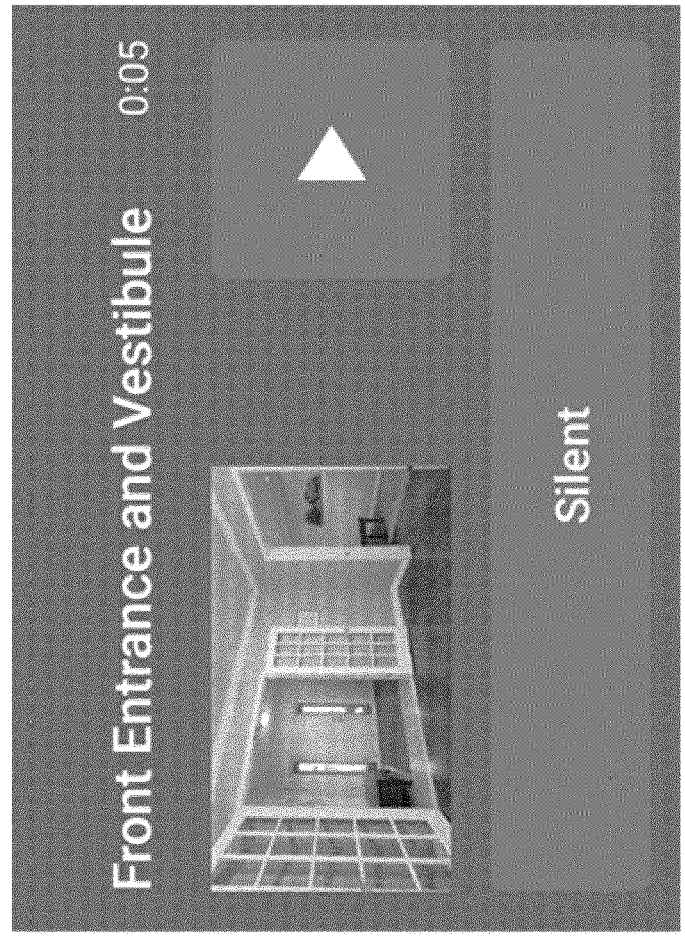
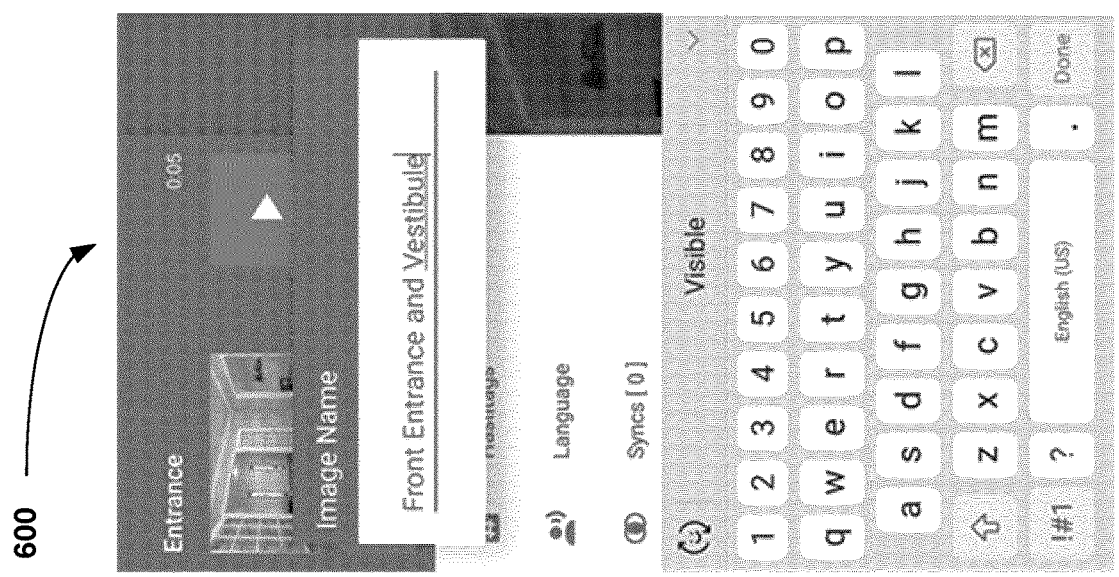
FIG. 6B
FIG. 6A

800B

800C

My Files >> .seffs > 1982285046734668403
1982285046734668403.jpg
Feb 25 2:46 PM                5.66 KB
1982285046734668403.mp3
Feb 25 2:46 PM               13.49 KB
1982285046734668403.vcf
Feb 25 2:46 PM               19.12 KB
1982285046734668403.icon
Feb 25 2:46 PM               62.27 KB
1982285046734668403.seff
Feb 25 2:46 PM                 351 B
FIG. 11

1200
   
My Files > > files > 7776183597317245592
 7776183597317245592.mp3
May 3 2:30 PM     13.49 KB
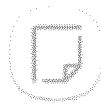 7776183597317245592.icon
May 3 2:30 PM     94.13 KB
 7776183597317245592.seff
May 3 2:31 PM     339 B
 Campground.kml
May 17 5:51 PM     339 B
FIG. 12

Select a Signature
Seff
 ← Signature Icon
 ← Signature Selector showing name
2
files
GO!
FIG. 18

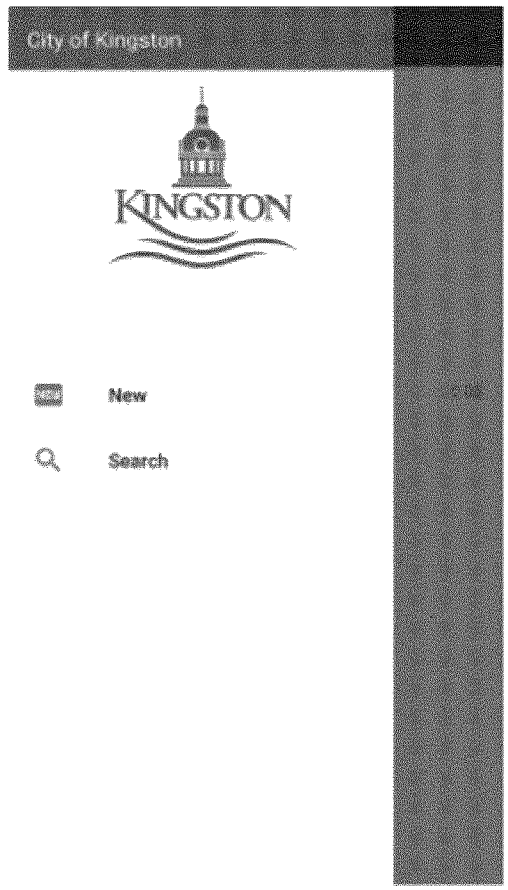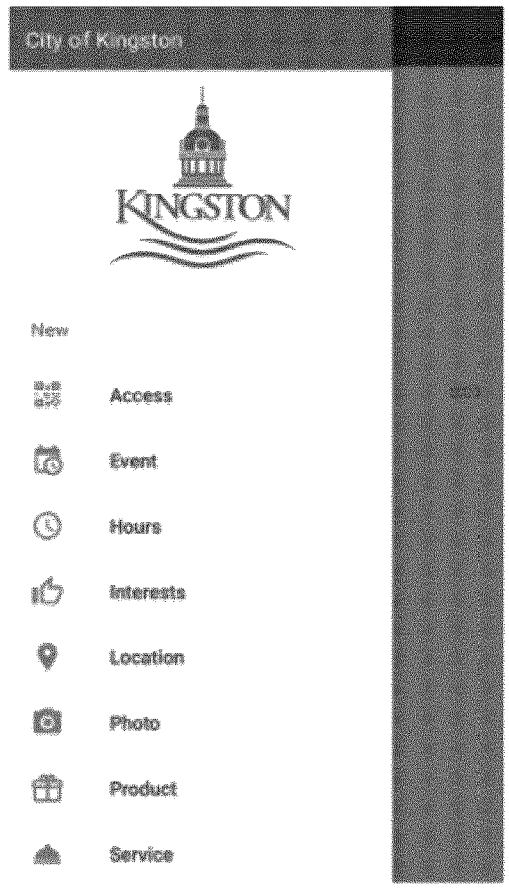
FIG. 19

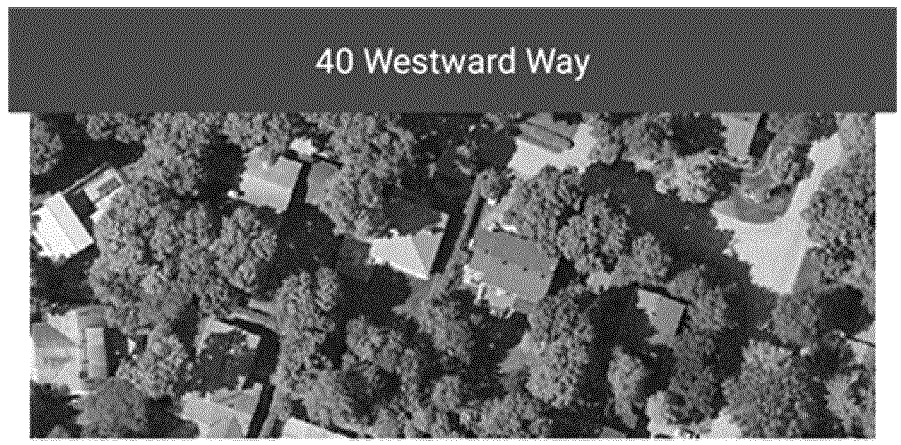
Location | 40 Westward Way
40 Westward Way  0:05
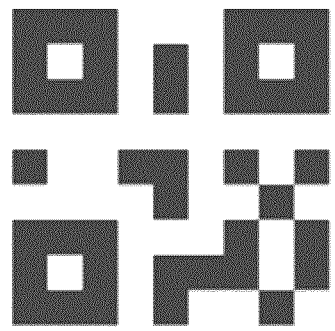
Access | 40 Westward Way
Door Opener  0:05
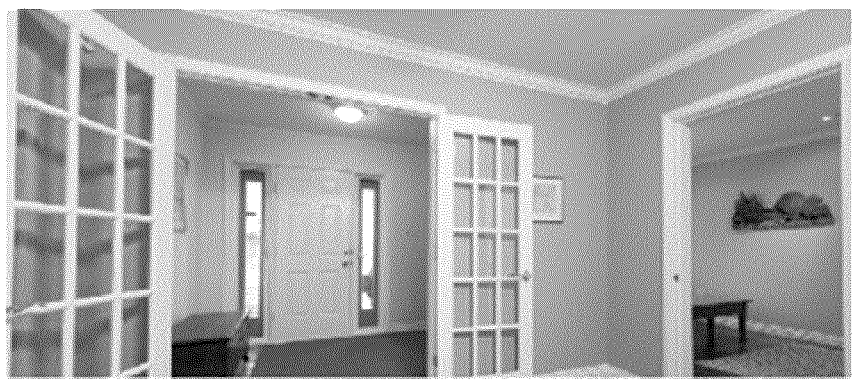
FIG. 24

FIG. 26A
FIG. 26B

FIG. 29

Tapping a Seff in the "Tap to Synchronize" view adds it to the synchs JSON Array within the .seff file. A virtually identical view is presented for "Tap to Unsynchronize," in which case tapping on a Seff removes reference to it in the synchs JSON Array within the .seff file.

Tap to Synchronize            DONE

Signature | AgainstTheWind
Peter Florida            05:33

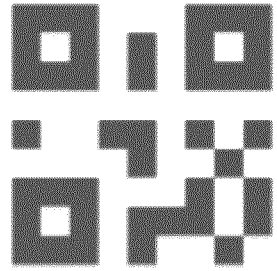

Access | Dont Fear The Reaper
12346            05:07

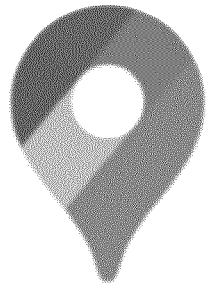

Application | Silent
Maps            0:05

FIG. 33

SYSTEM AND METHOD FOR DIGITAL INFORMATION MANAGEMENT

CROSS REFERENCE TO RELATED APPLICATIONS

This application is a national stage entry of PCT/CA2021/050906, dated Jun. 30, 2021 and entitled SYSTEM AND METHOD FOR DIGITAL INFORMATION MANAGEMENT, which is a non-provisional of, and claims all benefit, including priority, to U.S. Application No. 63/046,269, dated Jun. 30, 2020 and entitled SYSTEM AND METHOD FOR DIGITAL INFORMATION MANAGEMENT and incorporated herein in its entirety by reference.

FIELD

The present disclosure generally relates to the field of digital communications, and in particular to a system and method for digital information management.

BACKGROUND

The first Internet protocols, in the 1970s, standardized the way files were transferred from one computer to another. The transfer protocols were agnostic as to the type of file being transferred. The Internet protocol written for the purpose of providing context was HyperText Transfer Protocol (HTTP), in 1989. HTTP "understands" basic file types such as text and images, and allows web developers to layout photos, text, videos, and links to servers in a "page" format that mimics printed publications. Now thirty years since its invention, HTTP is the basis when it comes to sharing information on the Internet.

With respect to information sharing, HTTP cannot be used to effectively organize data into information for the purpose of sharing it due to the plurality of organizational protocols that treat information in different ways. As such, context is difficult to convey, and change. Consider, for example, listening to a podcast only to be directed to a first social media platform to see related photos, a different media platform for videos, another social media platform for communications, and yet another social media platform for the podcast's social media presence. This happens all the time. By the time the podcast listener has opened a web browser or the social media app, any "context" is limited to the idea in the user's head that there is content, in various forms and somehow related to the podcast, spread all over the internet. Web pages that direct readers to other servers for maps or directions is another example of lost context. All news broadcasts on television point viewers to multiple websites, apps and services where the television network has developed and/or stored content of various types.

With respect to searching, current hypertext-based web-wide Internet search is primitive, returning millions of results for typical searches. Without the metadata inherent in purpose-built databases (e.g., electronic commerce website databases), it is virtually impossible to return meaningful results in many cases. In 2020, multifaceted spatial, temporal and conceptual search functionality is limited to proprietary websites and their associated databases (e.g. search for a Holiday Inn hotel in Albuquerque on Oct. 28, 2020).

With respect to security and privacy, the client-server data model (databases connected to HTTP web pages via uniform resource locators (URLs)) is still used by corporations with whom citizens share their data (e.g., banks, airlines) and social media platforms where people try to restrict the sharing of personal information to friends and family. This protocol/data model is notoriously vulnerable for many reasons.

With respect to the presentation or "playing" of information/content, current protocols are limited to the presentation of content without consideration of duration or sequence. This is a further failure of contextualization because effective communication often requires the consideration of duration and sequence (provided, for example, by edited video).

An improved system and method for communicating information over networks is desirable.

SUMMARY

In accordance with an aspect, there is provided a digital information management system. The digital information management system comprises a receiving device comprising at least one processor and a memory storing instructions which when executed by the at least one processor configure the at least one processor to receive a file construct from a source device, and render the file construct. The file construct comprises a file construct identifier attribute, an audio file, an icon element, and at least one metadata file.

In accordance with another aspect, there is provided a method of digital information management. The method comprises receiving a file construct from a source device, and rendering the file construct. The file construct comprises a file construct identifier attribute, an audio file, an icon element, and at least one metadata file.

In accordance with another aspect, there is provided a digital information management system. The digital information management system comprises at least one processor and a memory storing instructions which when executed by the at least one processor configure the at least one processor to obtain a file construct, and send the file construct to a receiving device. The file construct comprises a unique file identifier, an icon file, and a content file comprising digital content.

In accordance with another aspect, there is provided a method of digital information management system. The method comprises obtaining a file construct, and sending the file construct to a receiving device. The file construct comprises a unique file identifier, an icon file, and a content file comprising digital content.

In accordance with another aspect, there is provided a file format comprising a unique file identifier, an icon file, and a content file.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures:

FIG. 6A illustrates an example of a user interface for changing a name of a SEFF, in accordance with some embodiments;

FIG. 6B illustrates another example of a SEFF, in accordance with some embodiments;

FIG. 11 illustrates an example of a contact file directory, in accordance with some embodiments;

FIG. 12 illustrates, in a screen capture, an example of a directory (folder) of a Location SEFF file, in accordance with some embodiments;

FIGS. 18 to 24 further illustrate an example of the generation of a SEFF file, in accordance with some embodiments;

FIG. 26A illustrates an example of a location view in SEFF, in accordance with some embodiments;

FIG. 26B illustrates an example of a Word document opened in mime-type-determined app using SEFF, in accordance with some embodiments;

FIG. 29 illustrates an example of a website equivalent view in SEFF, in accordance with some embodiments;

FIG. 33 illustrates an example of synchronizing a SEFF file, in accordance with some embodiments;

It is understood that throughout the description and figures, like features are identified by like reference numerals.

DETAILED DESCRIPTION

Figure 1:
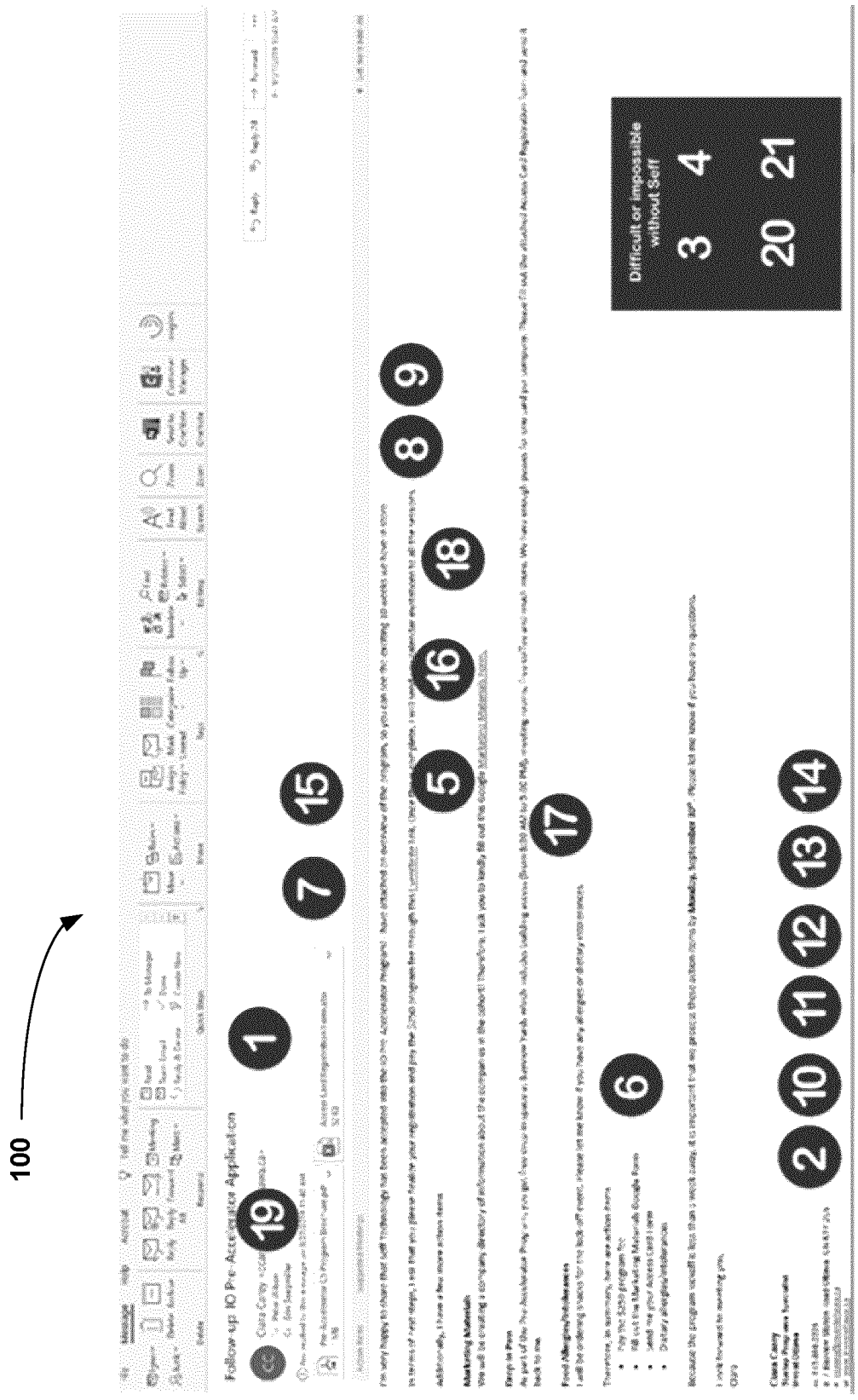
FIG. 1 illustrates, in a screen capture, an example of an email between a company and a business program.

Embodiments of methods, systems, and apparatus are described through reference to the drawings.

Embodiments described herein refer to a multi-element file format, such as the seven element file format (SEFF) and its related applications, systems, architectures and processes described herein. Details common to most SEFF embodiments are described. However, it should be noted that the description is by way of example and that other embodiments are contemplated.

Internet protocols standardize the way files are transferred from one computer to another. HyperText Transfer Protocol (HTTP) was written for the purpose of providing context. HTTP "understands" basic filetypes such as text and images, and allows web developers to lay out photos, text, videos and links to servers in a "page" format that mimics printed publications. Now thirty years since its invention, HTTP is still the state of prior art when it comes to sharing information on the Internet.

Digital information management currently comprises many protocols and methods, each with limited capabilities. Examples of digital information management include:

- A digital camera recording an image and metadata, such as the shutter speed, about it.
- A computer file system that manages access to both the content of files and the metadata about those files.
- Cutting and pasting a link to a website and emailing it to someone.
- Setting up a database of products that can be searched online.
- Writing hypertext markup language (HTML) to publish contextualized images and text using a web page.
- Posting a video on an online social media platform for others to view.
- Searching for a specific term on an online search engine.

Writing a program (e.g. a JavaScript program) that enables people to submit specific information to a server.

Double-clicking on a contact link to add it to a proprietary contacts management program.

Preparing a presentation that serializes information using slides.

These examples are a non-exhaustive representation of digital information management. Digital information management may comprise everything people do on computers, smart devices, and the Internet, many times per day.

Many problems exist with the plethora of existing digital information management protocols and methods. Digital information:
- exists in silos that are not compatible with one another (e.g. different social media applications);
- typically suffers from a lack of metadata relating to time, location, and signature;
- is not uniformly spatialized (e.g. address, latitude and longitude, place name);
- can sometimes be date-stamped, but much digital information is relevant within a timeframe (e.g. between two dates);
- is shared using multiple methods (e.g. email attachment, cut and paste a uniform resource locator (URL), post to web, etc.);
- can be too integrated, causing wasteful data transfer (e.g. multiple JavaScripts in one web page);
- is frustrating to search for (e.g. a search engine search followed by multiple searches on hotel websites);
- is notoriously insecure (e.g. bank and other corporate privacy breaches, data mining of social media);
- cannot be synchronized (e.g. narrated sketch);
- cannot be contextualized using the basic human practice of storytelling;
- etc.

From a human perspective, the internet has a single purpose: the sharing of information. But from a technical perspective, the internet is really just a tool for the transfer of data. It is protocols that turn data transfer into meaningful information sharing. In fact, the effectiveness of the internet as an information-sharing tool is determined by the quality of the protocol via which the information is shared. Marshall McLuhan famously stated: "The medium is the message." But on the internet, the medium (the protocol) is more powerful than the message (the data) because it can either significantly enhance or, alternatively, nearly destroy the message itself.

People today share information via the Internet using dozens of methods. Some of these methods are selected based on the file- or server-type (e.g. photos on social media applications, events on cloud calendar applications, videos on social media applications, maps on mapping applications, etc.) and some are defined by their intended audience (e.g. photo and text on social media and networking platforms, photo and text in an email, photo and text on a web page, etc.). As a result of the silos created by these filetype, server-type and audience considerations, the Internet is a poor information integrator—and therefore can be improved with respect to communications and information management.

The integration of information provides effective communications. However, information cannot be effectively integrated using current internet protocols. For example, consider a startup company participating in a pre-accelerator business program. Many communications are required between the company and the business program. FIG. 1 illustrates, in a screen capture, an example of an email 100 between the company and business program. The contents of FIG. 1 is also shown below in Table 7. This is one example email in a series of exchanges, attachments, downloads, uploads, online forms and visits to external sites over a period of days. In the end, much of the information shared was processed using multiple systems after being received. The information now resides in several locations (i.e. is disintegrated) and is not available in full or in any easily accessible format to either party. Table 1 illustrates a listing of ideal information/communication between the company and business program versus an actual information/communication between the company and business program.

TABLE 1

Ideal vs. Actual Information/Communication between Company and Business Program

| | Ideal Information/Communications | Provided? | Actual Information/Communications |
|---|---|---|---|
| 1 | All communications via a single window (app) | No | Email, online forms, spreadsheets, external websites |
| 2 | Content in a consistent format | No | Email, online forms, spreadsheets, external websites |
| 3 | Narrated information where appropriate | No | Not possible with existing protocols |
| 4 | Descriptive explanatory sketches | No | Not possible with existing protocols |
| 5 | Single-method information submission | No | Multiple systems including spreadsheets and JavaScript |
| 6 | Easy information sort/tap | click | swipe/sequencing | No | Not possible with existing protocols |
| 7 | Easy way to share only relevant information | No | Cut and paste into new emails only |
| 8 | Integrated confirmation of payment | No | Via electronic commerce app external link |
| 9 | A QR-code enabled access pass | No | Because no platform on which to use it |
| 10 | One tap | click | swipe directions to the venue | No | Text address only |
| 11 | A street image view of the venue | No | Could have been attempted via external URL |
| 12 | One tap | click | swipe to send a text | No | Text of mobile phone number only |
| 13 | One tap | click | swipe to email | No | Text of email address only |

TABLE 1-continued

Ideal vs. Actual Information/Communication between Company and Business Program

| | Ideal Information/Communications | Provided? | Actual Information/Communications |
|---|---|---|---|
| 14 | One tap \| click \| swipe to phone | No | Text of main phone number only |
| 15 | Promotional video | No | Could have been tried via link to social media application |
| 16 | Social media | No | Possibly listed on website but no reference |
| 17 | Business hours | Partially | In text of email message; static |
| 18 | Calendar event files for sessions | Yes | As attachments to email, but multi-step and external |
| 19 | A pdf file of the program/agenda | Yes | As attachment to email, openable in an external portable document format (PDF) application (so decontextualized) |
| 20 | Information about parking | No | And no external content from third parties |
| 21 | Automated building access | No | Have to fill in form with many fields every time |

The following lists example failures (Problem) of disintegrated information, together with solutions (Solution) provided with the unified digital information management system described herein:

Problem: No single window. Multiple applications, multiple online services, multiple URLs, multiple lines of static contact text, a static reference to business hours, a static reference to a deadline, etc.

Solution: SEFF integrates all digital information types and sources, and all search, submission, and presentation methods.

Problem: Content not in a consistent format. Multiple formats and methods used to share and submit.

Solution: The SEFF protocol applies a consistent data format to all digital information types and sources, and all search, submission, and presentation methods.

Problem: No standardized icon or tangibility.

Solution: The SEFF protocol assigns a consistent-format, tangible (tap-click-swipe-to-sort) visual icon to all digital information types and sources, and all search, submission, and presentation methods.

Problem: Impossible to apply narration to anything other than the email itself, as an attachment. If done using an attachment, there is no synchronization between the audio and related content. This is never done due to inefficiency and ineffectiveness without SEFF.

Solution: All digital information within SEFF can be narrated in seconds, and that narrated audio can be synchronized with all information types and information management methods presented in SEFF format.

Problem: No descriptive sketches. Impossible without SEFF.

Solution: Descriptive sketches on images (including images of maps, street views, and screen captures of text documents, spreadsheets, etc.) can be made and saved in seconds.

Problem: Multiple information submission methods including download/complete/upload a spreadsheet file, completion of online forms at multiple external sites, download apps with password and other information requirements.

Solution: SEFF supports JavaScript and all other scripting languages. All digital information can be submitted within the same application (SEFF).

Problem: No information sort/tap|click|swipe/sequencing.

Solution: SEFFs are represented by tangible icons that can be easily selected, dismissed and sorted with easy tap|click|swipe gestures. This cannot be done with a URL in an email.

Problem: No easy way to share only the relevant information with someone else. Cut and paste or download and attach into a new email only.

Solution: This is accomplished with a simple tap|click|swipe gesture in SEFF.

Problem: No integrated confirmation of payment due to reliance on external service that cannot run within email.

Solution: This can be easily accomplished within SEFF using existing JavaScript or other scripts.

Problem: No QR-Code enabled access pass. This would require an external application and service.

Solution: SEFF supports QR-code-enabled access as a filetype.

Problem: No one-click directions. Static address only.

Solution: One-click directions can be obtained in seconds within SEFF using the Location filetype, and directions can be assigned to all information types with a simple synch.

Problem: No street view sent. Best existing option without SEFF would be to create a long URL and cut and paste it into an email. Obviously not worth the hassle.

Solution: Street views are automatically created where available as part of the SEFF Location filetype.

Problem: No one-click to send a text, an email and/or make a phone call to the business program or the startup company.

Solution: Easy in SEFF and generally accompanies file during sharing due to association with Signature, so no repeated effort.

Problem: No promotional video or social media links. Could have typed out a reference and included a link but too much work.

Solution: SEFF can set videos and/or social media links as Signature defaults using simple synchs.

Problem: Business hours typed out manually. Static only so would be wrong if changed later and this old email was relied upon.

Solution: SEFF uses easily edited dynamic business hours.

Problem: Calendar events offered to be sent by the business program staff manually, "once this [application process] is finished".

Solution: Simple tap|click|swipe to include Events in SEFF.

Problem: Program overview pdf file sent as attachment. Could be downloaded and saved on device but then loses all context.

Solution: Set as Signature default using synch, play within SEFF.

Problem: No information about parking. Too complicated to describe and include. No easy way to import and share third-party information.

Solution: One tap|click|swipe to synch a narrated sketch from a municipal government, for example, using SEFF.

All of the above described in the document of FIG. 1 pertains to only a single email. Communications between the business program and the company could worsen if the applicants are instructed to communicate using various different social media platforms or communication applications, such as, LinkedIn, email, Slack, Prime, Wins, etc. Other methods included a requirement to download and install the Buzzyn app in order to receive free coffee. Applicants may also receive an email with a button to log into Slack, within which a message may be found in which there is a link to a YouTube video the applicant is required to watch.

The benefits of the integration of all digital information types and sources, and all search, submission, and presentation methods described above are long overdue. SEFF also provides advantages to digital information management through desirable and appropriate disintegration. Consider the current method and protocol by which most information is submitted to servers over the Internet: JavaScript routines embedded in web pages. A typical web page that enables a user to, for example, search for a flight is laden with text and images and multiple JavaScript routines. This is difficult to navigate and inefficient because so much superfluous data is transferred from the server to the user's browser. A JavaScript SEFF is disintegrated from all of this extraneous information, improving speed, efficiency and ease of navigation. Another example of disintegration is the ability to generate a Location SEFF that exists independently of other protocols, as opposed to pasting a URL to a map server (i.e. integrating the URL) into an email.

As will become evident in the teachings below, SEFF allows for the integration (and disintegration, where appropriate) of all information types and sources, and all search, submission, and presentation methods.

Why do websites, email, and apps fail internet users who want to manage their digital information? Because not one of them is an information management system. All three are information sharing systems, and all three are limited in the types of information they "understand." Websites, email, and apps all deliver—and a few receive—information in a static way determined by the person (developer or email author) who wrote them. When the recipient views the information on a website, in an email, or in an app, that information is effectively stuck there. While it is possible to right-click on, download, and save an image from a web page and then attach it to an email and send it to someone else, that requires much tedious work and all of the context provided by viewing the image within the original web page is lost. Furthermore, once the image is attached to the new email, it is effectively stuck again. Thus, repurposing the image is difficult. Similarly, management of other types of information is also limited with current digital information management systems.

In some embodiments, a new universal digital information management system is provided that improves information sharing, searching, and security online. The new system includes a universal file format, referred to herein as Synchronized Experience File Format (SEFF), that improves existing communications and internet protocols by: i) advancing the Internet from a data transfer tool into an information-management platform; ii) providing enhanced online search capabilities; iii) including client-controlled privacy and security to the Internet experience; and iv) enabling storytelling via the sequential presentation of information.

The present disclosure provides novel technical teachings that allow for improved digital information management. Universal digital information management can include the exercises of information generation, description, recording (e.g. saving) formatting, copying, deleting, synchronizing, temporalizing, ordering, versioning, and/or other means of organizing, searching, presenting, sharing and/or submitting information or content. In some embodiments, universal digital information management can include the application of metadata to files to transform data into information, sharing information with others, searching for information, and presenting information. In some embodiments, SEFF is a system of protocols and methods that can accomplish all of these digital information management tasks. In some embodiments, SEFF comprises a suite of functionality including all the digital information management activities listed above.

Two terms as used herein are now defined: Information and Protocol.

"Information" may be defined as data that is a) organized for a purpose, and b) presented within a context that gives the information meaning and relevance.

"Protocol" may be defined as a set of rules or procedures for transmitting data between electronic devices, such as computers. In order for computers to exchange information, there is a preexisting agreement as to how the information will be structured.

For the purpose of the following description, the definition of Protocol above may be extended from "a set of rules or procedures for transmitting data . . . " to "a set of rules or procedures for the saving, describing, transmitting, presentation, and other management of data . . . ." In other words, file format and file metadata are included under the term Protocol.

The Internet was designed to transfer data. Data is not information, and transferring data is only one part of overall information management, as indicated by the above listing of activities that comprise digital information management.

Data, metadata, files, and information are four different items. A data-stream of bits—zeroes and ones—moving from one computer to another may be considered as a transfer of data. However, unless the receiving computer has access to metadata—data about the data—it has no way of knowing whether the bits it is receiving represent an image, a text document, a video, geographic coordinates, a search result, etc. Metadata can be applied to the data either ephemerally or permanently. When an online search is conducted, for example, metadata is applied to the asynchronous query/response pair ephemerally so that the server knows what to search for and the client understands what is being returned to it. When metadata is applied to data permanently, a file is created. This process of converting data into information permanently is achieved by associating data and metadata in a recognized format (e.g. jpeg) and then recording it (e.g. on a hard drive). For example, when a photo is taken with a digital camera, a series of bits is arranged in a matrix—thus we have data. But that data is not yet information. The data (ordered bits) from the digital camera could be fed into an audio player and, while a human would hear noises, those sounds would hardly constitute meaningful information. However, when the same bits of data are assigned metadata, and that data/metadata combination is stored as a jpeg file, the result when viewed on a computer monitor is human-interpretable information: an image that portrays a person standing beside a school bus, for example.

Having more metadata means having more information. Associating spatial, temporal, formatting, and other descriptive variables such as keywords with data is the means by which data is converted into information that is of use to humans. But not all information is created equal. A photo of a person standing beside a school bus is far more informative if we know the five W's (W5): Who, What, When, Where and Why. The means by which computer system designers have enabled the application of W5 metadata to data in order to convert that data into rich information has historically been sporadic, unstandardized, inconsistent, and, as a result, ineffectual.

Having better metadata means having better information. Modern digital cameras will apply a timestamp and geographic coordinates to a jpeg image. With the right supplementary software, the image could be, for example, located on a map. This limited application of metadata to data is pretty much the current state of the prior art when it comes to helping people manage digital information. SEFF uses more sophisticated spatial and temporal information objects than the primitive date/time and latitude/longitude numbers currently in use. SEFF is unique in understanding the relationships within and between spatial and temporal metadata. Specifically, three main spatial and temporal relationships are defined, applied to, and understood by, the SEFF metadata protocol: (1) Parent-Child, (2) In-law, and (3) Cousin.

An event (time period) can exist as a "child" within a "parent" time period. For example, when a person attends a concert that starts at 8 pm and ends at 11 pm on Saturday November 23$^{rd}$, that person will intuitively understand that the event is taking place within the parent event "My Birthday Weekend" which starts at 6 pm on Friday, November 22$^{nd}$ and ends at 9 pm on Sunday, November 24$^{th}$. Current time-management systems, such as digital calendars, actively resist this most natural type of temporal relationship. For example, adding the event "Attend Lecture on AI Integration" overlapping "Attend Conference on Artificial Intelligence" and a typical calendar program will warn you that "This Event Conflicts With Another Event On Your Calendar!"

In some embodiments, SEFF comprises a digital information management system that enables users to define and use temporal parent-child relationships and apply them as metadata to all information types and methods.

In some embodiments, SEFF comprises a digital information management system that deals with information management methods (e.g. search criteria, computer scripts, information submission forms, mobile applications) the same way it deals with information itself.

In some embodiments, SEFF comprises a digital information management system that enables users to present an automated series of information types and management methods, using simultaneous audio and visual components. SEFF enables the compilation of self-timing Stories comprising all information types and methods.

In some embodiments, SEFF comprises a digital information management system that enables users to select, dismiss, re-order and re-package (into a SEFF Story file) all information types and management methods with simple tap|click|swipe gestures.

In some embodiments, SEFF comprises a digital information management system that enables users to search for information using concurrent W5L criteria (W5 plus Language). For example, SEFF may enable one to find all wheelbarrows for sale in either Gloucester or Orleans during Black Friday or Boxing Day sale periods, advertised in French.

A location (point, line or area) can exist as a "child" within a "parent" location (area). For example, "Algonquin Park" lies entirely within "The Province of Ontario". Some sophisticated and expensive geographic information systems use topological relationships to describe this type of spatial relationship. However, SEFF allows for the application of this level of topological functionality to all digital information types and methods.

In some embodiments, SEFF comprises a digital information management system that enables users to define and use spatial parent-child relationships and apply them as metadata to all information types and methods.

In-law relationships may be defined as those that overlap. An example of a temporal in-law relationship is the overlapping relationship between "Red-eye flight from Los Angeles to Boston" (Depart 8:50 pm Sunday, Arrive 5:20 am Monday) and "Work on Presentation" (start at noon on Sunday and finish by 2 am on Monday). Some, but not all, of the work on the presentation will be done on the red-eye flight.

In some embodiments, SEFF comprises a digital information management system that enables users to define and use temporal in-law relationships and apply them as metadata to all information types and methods.

An example of a spatial in-law relationship is the overlapping relationship between "Lake Ontario" and "Continental United States". Some, but not all, of Lake Ontario is within the Continental U.S.

In some embodiments, SEFF comprises a digital information management system that enables users to define and use spatial in-law relationships and apply them as metadata to all information types and methods.

Cousin relationships are those that are understood by humans to be related but do not overlap. Temporally, "March Break" and "Christmas Day" are both understood to be related to "Time off" but they do not overlap.

In some embodiments, SEFF comprises a digital information management system that enables users to define and use temporal "cousin" relationships and apply them as metadata to all information types and methods.

Spatially, Hawaii and Alaska are both understood to be part of the United States, but they are disconnected geographically and are understood to be related conceptually.

In some embodiments, SEFF comprises a digital information management system that enables users to define and use spatial "cousin" relationships and apply them as metadata to all information types and methods.

Simultaneously combining spatial and temporal parent-child relationships brings search power to users looking for information. "Show me all images taken in either Frontenac Park or Algonquin Park on either Christmas Day or New Year's Day." Or "Find all tickets on either Air France or United Airlines from San Francisco or Oakland to Paris Orly or Paris Charles De Gaulle during either 'My Birthday Weekend' or 'Our Anniversary Weekend'."

In some embodiments, SEFF comprises a digital information management system that enables users to find information using such sophisticated combinations of spatial, temporal and thematic metadata.

In some embodiments, SEFF comprises a digital information management system that enables users to add sophisticated spatial, temporal and thematic metadata to all information types and methods.

In some embodiments, SEFF comprises a digital information management system that enables users to add sophisticated spatial, temporal and thematic metadata using simple tap|click|swipe gestures.

Having more efficient metadata means having more efficient information. HTTP and JavaScript can be a wasteful combination of technologies when it comes to information management. A university student who wants to check her grades on her university's website requires only a few lines of JavaScript to do so. But getting to that JavaScript requires the transfer of masses of extraneous data in the form of all of the text and images on the page within which the JavaScript runs. Even finding the correct page can require the transfer of multiple intermediate pages during the student's search for the correct page. It is not uncommon for website developers to include "site maps" to help people navigate the complex and wasteful world they have created.

Because SEFF disintegrates JavaScript from web pages, the student in our scenario can be sent a tiny "Mark Checker" file that, with one tap|click|swipe, will return her marks. The amount of wasted text, images and unrelated script that the SEFF protocol avoids brings enormous advantages to the efficiency of work. This efficiency also brings environmental advantages through the elimination of massive amounts of unnecessary, wasteful, energy-requiring and time- and bandwidth-consuming data transfer.

In some embodiments, SEFF includes inherent novel information types. For example, current technologies that handle location do so in a single way. A few translate between, say, an address and a latitude/longitude coordinate pair in order for the system to understand location in that single way. However, SEFF's Location filetype, for example, can handle locations in many different ways, such as a formatted municipal address, place-name surrogate (e.g., "Our House"), latitude/longitude, viewpoint [lat/lng, bearing, tilt, zoom], point, line and area definitions [kml and other geospatial protocols], parent-child, in-law and cousin relationships. Some of these concepts will be further described below.

Some existing information types can be shared by some existing applications (e.g. photos via social media applications), some can be presented in web pages (e.g. text as HTML), and some can be attached to emails (e.g. a spreadsheet file). The present disclosure describes a novel approach for a single system by which all of these new-to-digital and existing information types could be universally managed. Moreover, the novel protocols and systems described herein can establish and maintain complex W5L context and handle parent-child, in-law, and cousin data relationships (described below). In some embodiments, the universal information management system described herein supports the understanding, integrating, disintegrating, describing, relating and presenting/playing of all digital information in a human-understandable W5L paradigm.

Many existing information management methods currently used to manage information include, but are not limited to: (1) the creation of unique file formats, (2) the assignment of metadata, (3) relational (SQL) databases, (4) non-SQL databases, (5) file naming conventions, (6) data interpretation protocols, (7) visualization, and (8) file grouping (e.g. folders/directories). All have their strengths and weaknesses. The novel universal information management system described herein brings increased functionality, findability, consistency, efficiency and security to the management of the world's information.

Creation of a new file: SEFF. In some embodiments, SEFF files include the following information and information types which combine to create the SEFF files that "play" and can be managed in browsers and on all computers and mobile devices.

TABLE 2

Variable Type, Name and Description

| Variable Type | Variable Name | Variable Description/Example |
| --- | --- | --- |
| String | seffid | Unique ID of the SEFF |
| String | signid | Unique ID of the Signature that created the SEFF |
| String | sftype | SEFF File Type (e.g. Image, Sketch, Contact, Link) |
| String | subtyp | File Subtype (e.g. PowerPoint) |
| String | sfname | SEFF Name (e.g "Photo of a polar bear", "My Location") |
| String | audnme | Name of the audio file (e.g. "Silent", "Roxanne") |
| String | audext | Audio file extension (e.g. ".mp3") |
| Integer | duratn | Duration in milliseconds (e.g. 76582) |
| Boolean | silent | Is SEFF silent (true/false) |
| String | langge | Language (e.g. "English", "Inuktitut") |
| Integer | colour | The SEFF's colour as an integer (e.g. −12345) |
| Integer | orient | Portrait or Landscape for multiple device types (0 or 1) |
| Long | verson | Epoch millisecond file-creation timestamp |
| JSON Array | hshtgs | Hashtags (e.g. #meToo) |
| JSON Array | synchs | Array of SEFF IDs synched with current SEFF |
| JSON Object | sfdata | SEFF data in JSON object format (e.g. Sketch points) |

Assignment of metadata. The assignment of metadata to data turns the data into information. A series of binary digits can be printed on a page, sent to a monitor, or heard using an audio player. But only if we have metadata about those binary digits can we convert that data into human-understandable information (e.g. meaningful text, an image, or meaningful sounds). A SEFF file format assigns metadata to all information types and methods. This metadata assignment is the first step in the establishment of a consistent system for the organization of all information types and methods. This can be achieved using many methods. For example, the metadata could be stored in a relational database, a non-relational database, the EXIF tag of an image, in a text file, using Extensible Markup Language (XML), JSON, etc. In some embodiments, the method chosen for SEFF is the storing of metadata in JavaScript Object Notation (JSON) format. While some examples below refer to XML, JSON is mostly used for ease of presentation.

In some embodiments, an example basic SEFF may be defined using JSON as follows:

```
{
    "audext" : ".mp3",
    "audnme" : "Silent",
    "colour" : 9603975,
    "duratn" : 5256,
    "hshtgs" : {"values" : [ ]},
    "langge" : "English",
    "orient" : 0,
    "seffid" : "7776183597317245592",
```

```
"sfdata" : {"nameValuePairs" : { }},
"sfname" : "Florida1958",
"sftype" : "Signature",
"signid" : "7776183597317245592",
"silent" : true,
"subtyp" : "Signature",
"synchs" : {"values" : [ ]},
"verson" : 1588530646162
}
```

The duration attribute is used for serialization and synchronization. The Boolean value silent is used to avoid unnecessary data transfer.

The sfdata element can be empty or can comprise specific SEFF-filetype data (e.g. location data, business hours, keywords, sketch points).

The synchs element can be empty or can comprise synchs to other SEFFs. In this way, spatial, temporal and thematic relationships can be established and maintained between SEFFs. For example, a Location SEFF of a soccer complex might include synchs to nine SEFF Location files, one each for the soccer fields within the complex, establishing them as child objects. Additionally, an Event synch might be present to indicate that the soccer tournament starts at 08:00 on Saturday, June 10 and ends at 14:00 on Sunday, June 11. The synch element is a JSON array of the SEFF IDs of the SEFF files to which the current SEFF is synchronized.

In the above JSON implementation for a basic SEFF, the field which is named "synchs" comprises a JSON Array of the unique identifiers of other SEFFs with which the active SEFF is synchronized. In the list above, the SEFF is not Synched to any other SEFFs, so the JSON array is empty. If this SEFF was synchronized with three other SEFFs, the field would look like this:

"synchs": {"values": [1971624190256284423, 484377754544525217, 9823063105392052]}, Using JSON to manage information is far more efficient than using a relational database because there are fewer wasted (empty) fields and because the metadata travels with the SEFF.

When a SEFF is made, it is assigned a unique ID. A folder is created with that ID because the folder name and key files within it are assigned the same Unique ID prefix. By using this standardization method, further relationships between spatial, temporal and thematic variables are established and maintained.

In some embodiments, a SEFF comprises a minimum of three files:

An audio file that provides duration (".mp3" in the example above);

An image file that is a standardized representation (an icon)—so that a URL appears and is dealt with in the same way as a video, a pdf, an event, a location, etc.; and A JSON metadata file, described above (file extension may be ".seff").

To repeat, these three files may have the same Unique ID before their extensions (here, 1400207972918774141.mp3, 1400207972918774141.icon, and 1400207972918774141.seff) and may be located, together, in a directory of the same name (here, 1400207972918774141).

In some embodiments, the audio file (with ".mp3" or other audio mime-type file extension) provides the duration for the SEFF. It also enables the SEFF to be played sequentially and to be synchronized with dynamic content (e.g. narrated sketches). Finally, the audio file can be used to introduce other content that already has its own audio component (e.g. a video—"Here is a video of the motorboat salvage" or "Listen to the third line in 'Against The Wind' by Bob Seger"). The audio file supports many useful functions in the unique Synchronized Experience File Format. Nevertheless, it may be wasteful to transfer the (albeit very small) silent audio file to and from the cloud with every SEFF, including those SEFFs with no actual audio (i.e. designated silent='true' and using the default five-second silent ".mp3" file for serialization and synchronization). To avoid this unnecessary data transfer, the JSON metadata file comprises a Boolean silent field. When set to true, the silent audio file is not zipped with the other files, or transferred. Instead, it is automatically regenerated on devices to which silent SEFFs have been downloaded.

Toggling the view of information by SEFF icon or Signature icon is available in all views with the single tap|click-|swipe. Icons are also used to select, sort, tap|click|swipe, relate, and dismiss information. This functionality is unique to SEFF because only SEFF assigns an icon to all of the world's information types and management methods.

The three (or two in the case of a silent SEFF) or more (in the case of a SEFF with additional files, such as a video or script) files are zipped into a ".sefz" file before transfer to reduce bandwidth consumption.

Note the version attribute (version) in the JSON file, above. In some embodiments, SEFFs have an epoch millisecond timestamp so that SEFF can ensure users are receiving up-to-date information. SEFF is unique in verifying that users are seeing up-to-date information. If a business changes the Business Hours synched with its Signature file, for example, SEFF will compare the local version with the most recent published version and download the new version if necessary. This is just another example of the many ways in which SEFF—unlike the current World Wide Web—is an information management system, as opposed to merely an information sharing system.

Signatures are a SEFF filetype and are managed in the same way as all other information. A minimal Signature can be used, for example, by a person who wants to manage all of his or her digital information without sharing references to Location, Business Hours, Contacts, Events, etc. But the option is there to easily synchronize the Signature (via simple tap|click|swipe gestures) with a potentially unlimited array of connections to any SEFF type. This turns the Signature into an even more powerful, contextualized definition of a person, business, organization, or event.

Figure 2B:
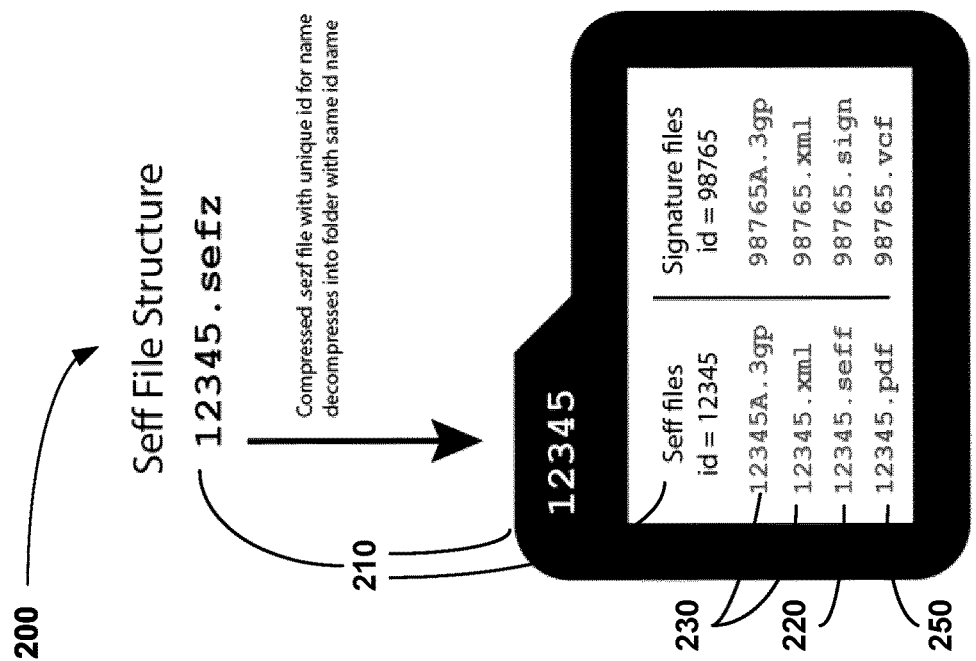
FIG. 2A to 2C illustrate examples of a file structure, in accordance with some embodiments.
Figure 2A:
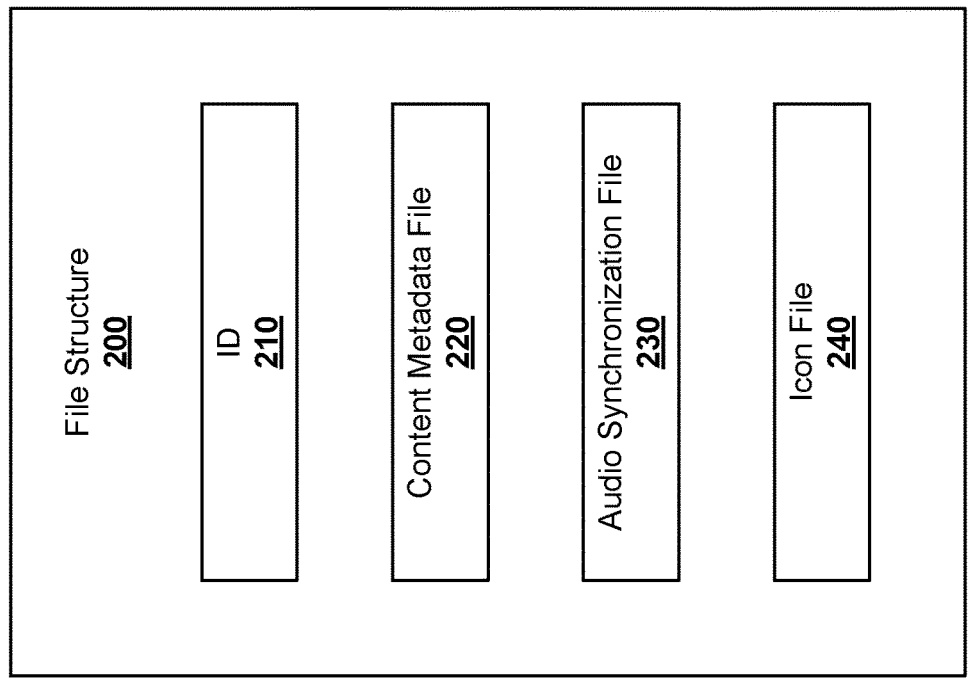

FIG. 2A illustrates, in a component diagram, an example of a file structure (e.g. file construct) 200, in accordance with some embodiments. The file structure 200 comprises a unique identifier (ID) 210, at least one content metadata file 220, one audio synchronization file 230, and one icon file 240. Other components may be added to the file structure 200.

Figures 2C, 3:
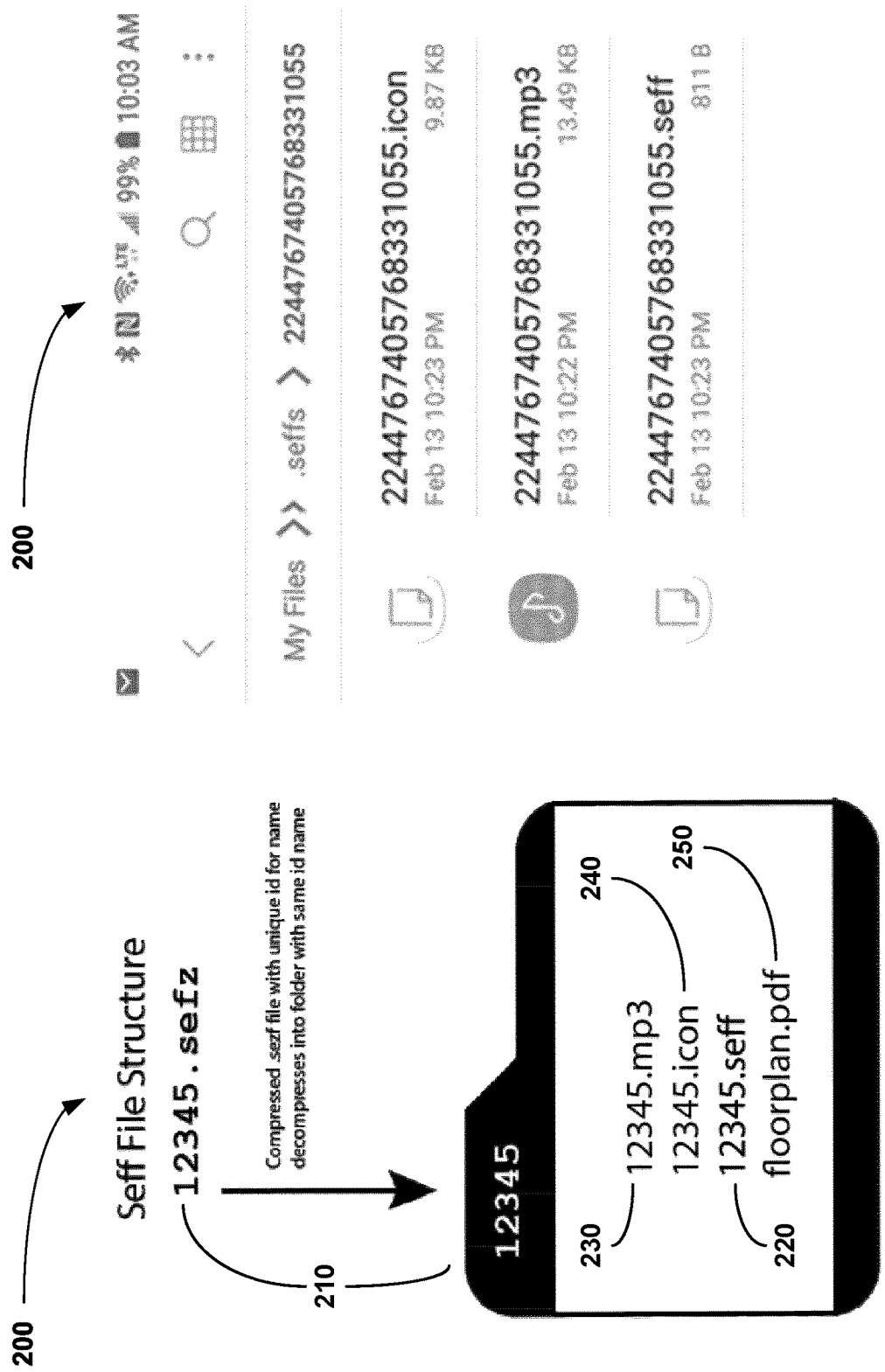
FIG. 3 illustrates another example of a SEFF file format, in accordance with some embodiments.

FIGS. 2B and 2C illustrate other examples of the file structure (e.g. file construct) 200, in accordance with some embodiments. The file structure 200 may be a compressed .sefz file with unique id 210 for name and do compresses into a folder with the same id (name).

In some embodiments, every file structure 200 includes three standard files and an unlimited number of (but typically few) optional files. The three standard files define the content metadata 220, audio synchronization file 230, and icon 240.

In the example of FIG. 2, 12345.mp3 is the audio synchronization file 230 for the SEFF. This establishes the duration of a file when the files are played in series and allows for synchronization with other elements, such as sketch-points. If the filetype has an inherent duration (e.g. music or a video), the audio-synchronization file duration can be ignored during Play in favor of the inherent duration. 12345.seff comprises metadata 220 for the file content. Different SEFF filetypes may have different data in the XML file or sfdata component of the JSON object. For example, a SEFF street view file may comprise entries for latitude, longitude, zoom, bearing, and tilt, whereas the sfdata JSON object for a sketch may comprise sketch-point time, x and y values. 12345.icon may be a jpeg file with standardized dimensions, used as an icon 240. This jpeg file may also comprise metadata about the file and its Signature. 12345.pdf and floorplan.pdf are shown to represent optional files. For example, if a user creates a SEFF of sftype 'File' and subtyp 'Acrobat', the original ".pdf" file will be compressed into the ".sefz" SEFF file. A SEFF Location file may be accompanied by Keyhole Markup Language files ".kml" and/or one or more other geospatial files.

Like SEFFs, Signatures can be synchronized with unlimited SEFF files of all types. Typical synchs selected by business users for their Signature would be Location, Link (to the corporate website), and Business Hours. A business could also include a SEFF Contact file, which would include a standard ".vcf" format file to provide one-click phone-calling to their store, and one-click save-to-contact-list on a customer's device.

Common Elements: Three files in a directory of the same name (unique id).

In some embodiments, the SEFF file format comprises three files: (1) an audio file, (2) an icon file, and (3) a metadata file. These three files share a common name (with different file extensions). The common name is a unique id. The files are stored in a directory with the same (unique id) name.

FIG. 3 illustrates another example of a SEFF file format 200, in accordance with some embodiments. In this SEFF configuration: An icon file (".icon"), an audio file (".mp3") and a metadata file (".seff") all with the same unique id and all located in a directory also named with that unique id.

FIGS. 4A to 4D illustrate, in screenshots, examples of SEFF user interfaces 400, in accordance with some embodiments.

Common Element 1: An audio file comprising silence, narration, or audio from an external file (see FIG. 4A).

SEFFs may include an audio file. The default is five seconds of silence, as shown above. When a new SEFF file is made, a silent 5-second audio file is generated and given a name based on the unique ID of the SEFF (e.g. 12345.mp3).

In some embodiments, the metadata (".seff") file keeps track of a number of variables related to the SEFF's audio component, specifically: (1) the audio file name, (2) the audio file extension, (3) the duration of the audio, (4) a Boolean value indicating whether the file is silent. These are described in more detail in the section on the metadata file below.

Figure 4A:
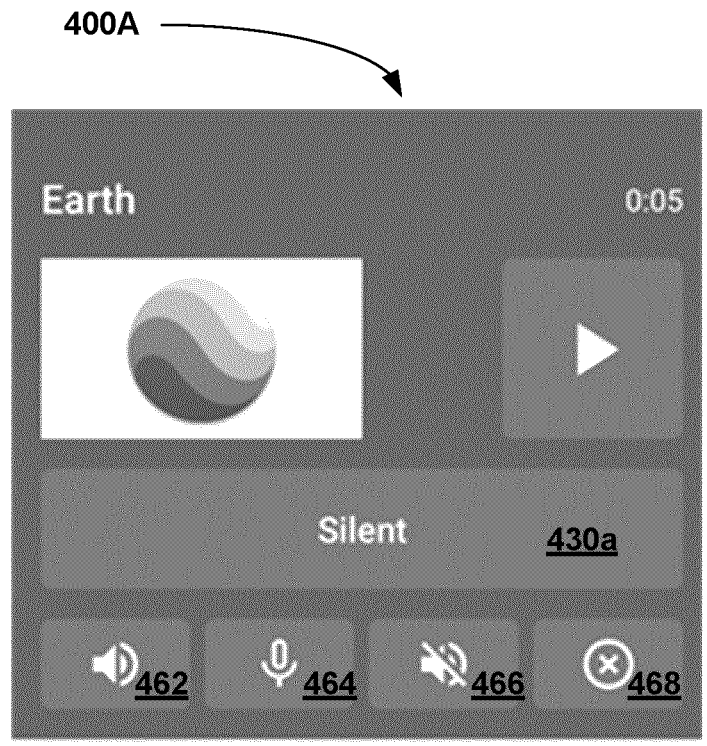
FIGS. 4A to 4D illustrate, in screen captures, examples of SEFF user interfaces, in accordance with some embodiments.
Figure 4B:
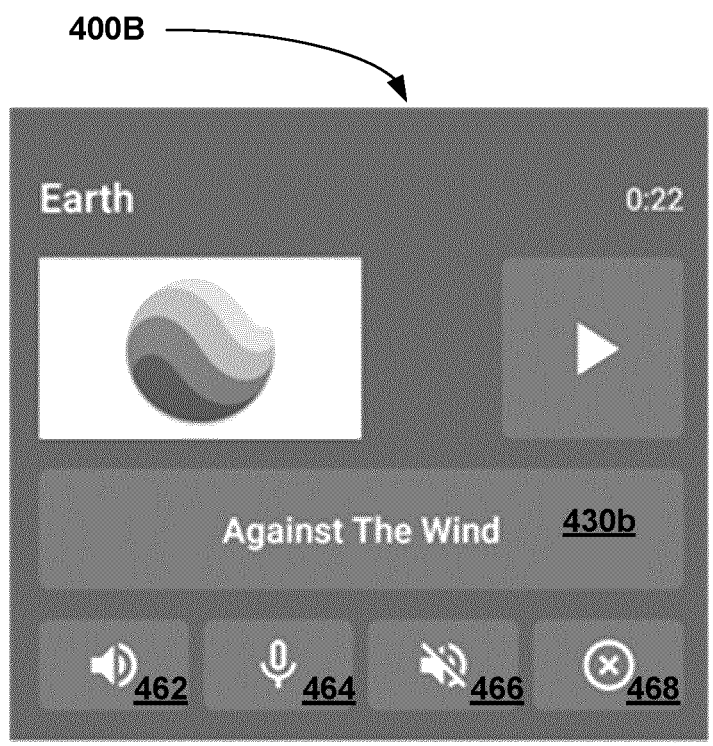

The "Silent" button 430a in FIG. 4A or the "Against The Wind" button 430b in FIG. 4B (in other words, the Audio Name Button) is used to open a file selector that enables users to assign any existing audio file to the SEFF. In FIG. 4B the user has selected a 22-second clip from the song "Against the Wind" by Bob Seger. The Boolean value for silent is set to false in the metadata.

Figure 4C:
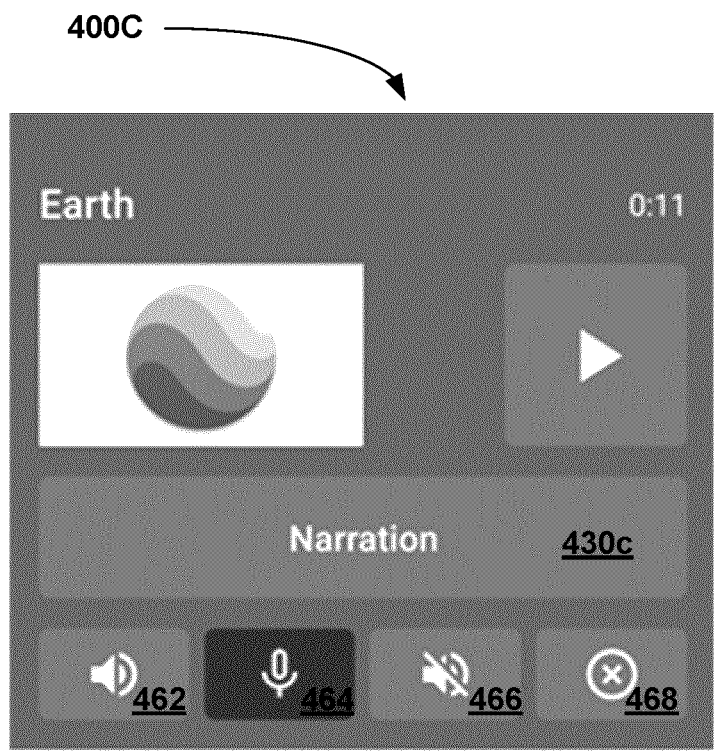

Clicking the microphone button 464 puts SEFF into audio recording mode. This enables users to easily narrate any information type. In FIG. 4C, 11 seconds of narration has been captured. The Boolean value for silent is set to false in the metadata and the audnme (audio name) variable is set to "Narration."

Figure 4D:
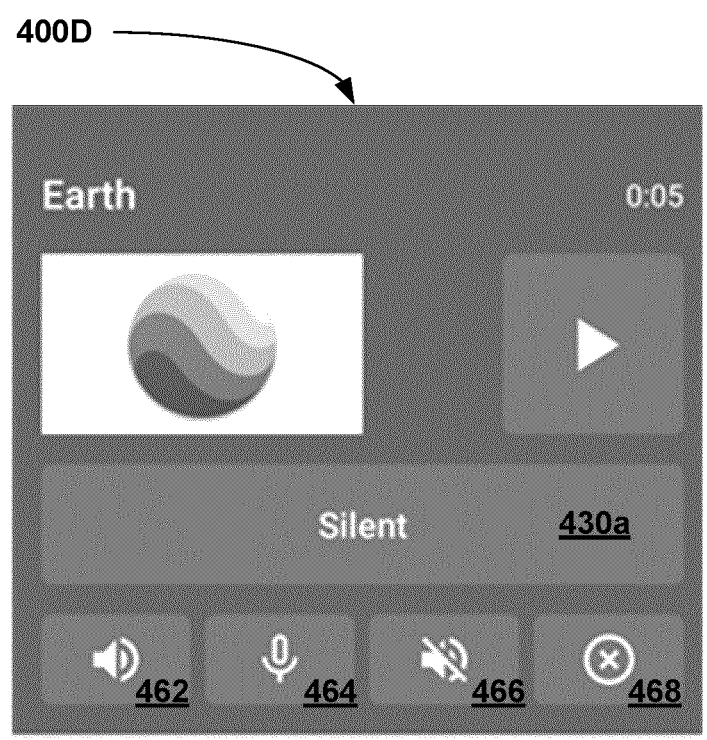

Clicking the third button 466 from the left in the bottom row of buttons shown in FIG. 4D regenerates a five-second silent audio file, resets the name in the metadata file (the value of audnme) to 'Silent" and sets the Boolean value of silent to 'true'.

The final button 468 in the audio control row is used to close that part of the dialog to free space for other functions in the interface. The audio control dialog can be re-opened at any time by clicking the Audio button 430a, 430c, 430b named either "Silent", "Narration", or by file name (e.g. "Against the Wind").

The audio generated by any of the three methods described above plays in advance of, or synchronized with, the main content. In Story mode, an event listener is applied to the audio player. That event listener listens for the end of the audio clip. In story mode, SEFF then plays the next file in the story. This is described in more detail below.

Common Element 2: An icon file of fixed dimensions with a multiple-element EXIF metadata tag.

In some embodiments, the icon file may be a ".jpg" file with the extension changed to keep it distinct from other jpeg files that sometimes occupy the same folder. In some embodiments, the icon file is a consistent size, for example, 480 pixels wide and 270 pixels in height. A default icon file may be generated automatically whenever a SEFF file is made. The icon file can be changed by the user at any time. As the visual representation for the SEFF file, the icon file enables easy recognition as well as tap|click|swipe gestures for inclusion, dismissal, selection, re-ordering, and other purposes. In some embodiments, the icon file may also comprise multiple fields of information in its EXIF tag. This is done so that key variables accompany the small icon file without the need to transfer more data than necessary (for example, when presenting search results).

In some embodiments, the following variables are stored in the metadata: seffid (e.g. 12345), signid (e.g. 45678), sftype (e.g. "Location"), sfname (e.g. "Calabogie"), silent (e.g. False), duratn (e.g. 15468), verson (e.g. 1588530646162).

Figure 5A:
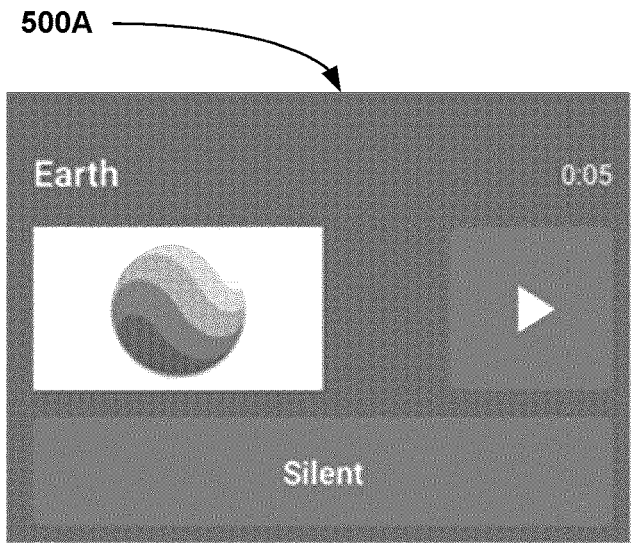
FIGS. 5A to 5C illustrate three examples of auto-generated icons, in accordance with some embodiments.
Figure 5B:
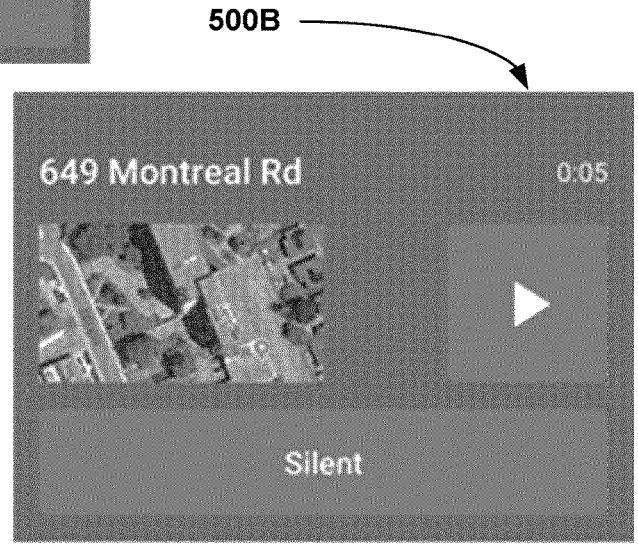
Figure 5C:
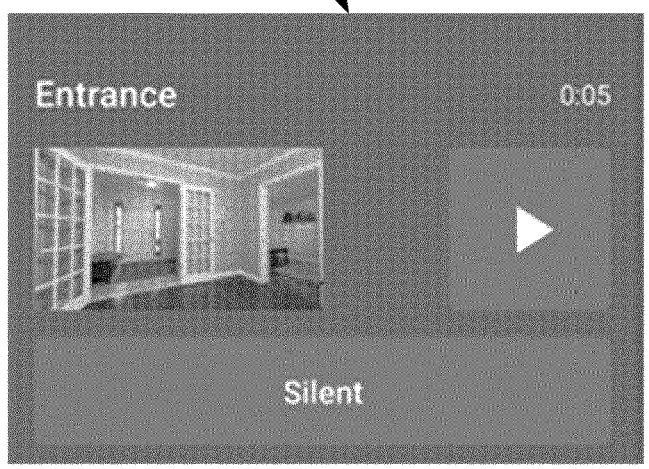

In some embodiments, when a SEFF is made, an icon is automatically generated. This automatic generation varies with filetype. For example, the icons for many third-party filetypes and Applications (e.g. MS Word, PowerPoint, Adobe Acrobat, Google Earth, Facebook) may be generated from their logos. Icons for Location files are auto-generated from maps or street views. Default icons for images are auto-cropped from the image itself. These multiple icon-generation methods are discussed in detail for each of the filetypes in another document. FIGS. 5A to 5C illustrate three examples of auto-generated icons 500A, 500B, 500C, in accordance with some embodiments: (See FIG. 5A—Google Earth (from logo), FIG. 5B—Location filetype (from map), and FIG. 5C—Image filetype (from image).

Common Element 3: metadata.

In some embodiments, SEFFs include metadata comprising a number of fields. In some embodiments, this metadata is stored in JSON (JavaScript Object Notation) format. Below is sample metadata for the SEFF Image file called "Entrance" 500C shown in FIG. 5C. In this embodiment, variables, except for hshtgs, synchs and sfdata, are stored using key/value pairs. hshtgs and synchs are stored as arrays, to accommodate a variable number of entries. The sfdata field is a JSON object of variable structure, depending on filetype.

Figure 7:
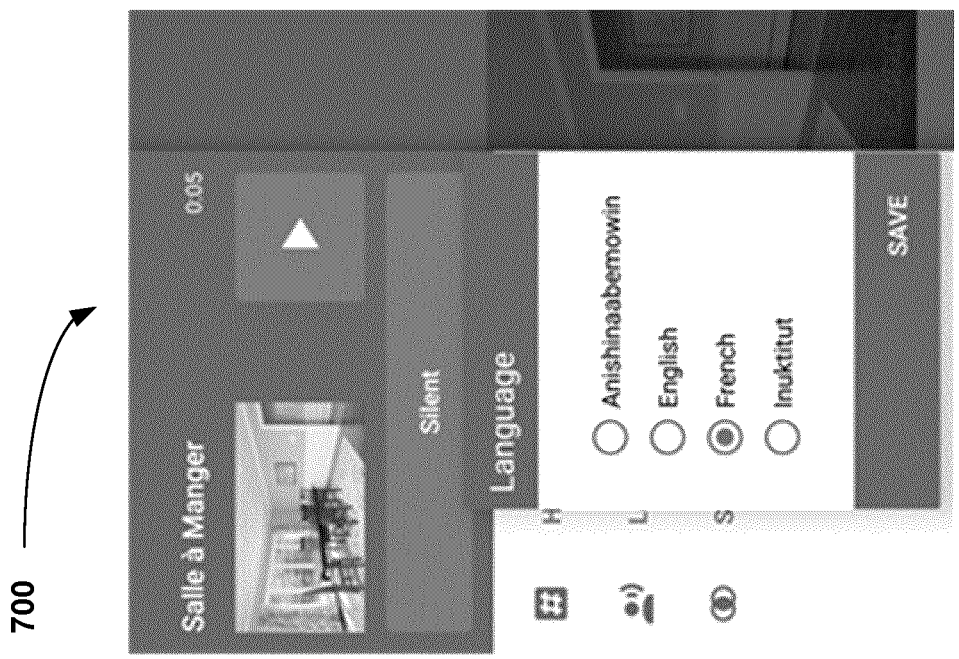
FIG. 7 illustrates an example of a user interface dialogue box, in accordance with some embodiments.

```
{
"seffid" : "23368151852728952",
"signid" : "36050876962798 50157",
"sftype" : "Image",
"subtyp" : "Image",
"sfname" : "Entrance",
"audnme" : "Silent",
"audext" : ".mp3",
"silent" : true,
"duratn" : 5256,
"langge" : "English",
"colour" : 11505770,
"orient" : 1,
"verson" : 1582645662031,
"hshtgs" : [ ],
"synchs" : [ ],
"sfdata" : {"file_name_without_extension" : "entrance", "file_extension" : ".png",
"file_name_with_extension" : "entrance.png", "mime_type" : "imageVpng"}
}
``` seffid: "23368151852728952". The unique ID assigned to the SEFF when it is made. In some embodiments, the directory, audio file, and icon file all use this name. The audio file name also includes its relevant file extension.

signid: "36050876962798 50157". The unique ID of the Signature used to create the file. Signatures are a SEFF filetype and follow the same data structure and file format as all other SEFFs. Associating SEFFs with the Signature that made it using this coding system of unique IDs enables SEFF users to, for example, get one-click directions to the store that posted a product.

sftype: "Image" One of the many SEFF filetypes. This is used by the SEFF Player to determine how to play (present) the content. Values for this field can be, for example: Access, Application, Contact, Event, File, Hours, Image, Link, Location, Music, Product, Search, Service, Signature, Sketch, Slideshow, Story, Video, and many more.

subtyp: "Image". Some SEFFs have a subtype. For example, a SEFF "File" filetype could have a subtype (field name subtyp) "Excel" or "Acrobat". This field is also used by the SEFF Player to determine how to play (present) the content. For SEFFs that do not have a subtype (e.g. the Image in this example), the value of subtyp is automatically set to the same value as sftype.

sfname: "Entrance". SEFF auto-generates icons based on filetype (See FIGS. 5A to 5C). It can do the same for names. Using the same example as for icons, SEFF has auto-generated the names "Earth" (from the Application selected by the user), "649 Montreal Rd" (an address looked up by SEFF for the user's location at which the SEFF was made, which is automatically updated whenever the user changes location on the map) and "Entrance" (the name of the image selected by the user, minus its file extension). It is easy to change the name of the SEFF from its auto-generated value to a new name. Simply tap|click|swipe on the name button and a dialog is presented to change it. FIG. 6A illustrates an example of a user interface 600 for changing a name of a SEFF, in accordance with some embodiments. Click "Done" and the name has been changed. The new name is written to the sfname field in the metadata. FIG. 6B illustrates another example of a SEFF 650, in accordance with some embodiments.

audnme: "Silent". The audio name value can be either "Silent," which is the default and can be regenerated by the user during editing, "Narration," which is the name presented to the user if the SEFF was narrated using the audio-recording feature, or the name of an audio file selected by the user (e.g. "Against the Wind"). Note that the audnme value stored in the metadata is the name presented to the user.

audext: ".mp3". Audio recording programs vary across device types and so do the filetypes they use to store the recording. Additionally, a SEFF user can assign any audio file, of any recognized audio mime-type, to a SEFF. This field is used to tell the SEFF player the format of the audio file associated with the SEFF.

silent: true. This may be set to 'false' for narration and for audio files selected by the user. It may be set to 'true' by default and if the user resets the file to silent during editing. This value is especially useful in Story and Slideshow modes.

duratn: 5256. The duration of the audio file (in milliseconds) that comprises part of the SEFF. This value is used to count down the seconds remaining when playing.

langge: "English". FIG. 7 illustrates an example of a user interface dialogue box 700, in accordance with some embodiments. SEFF assumes that a user is generating content in the language of the default locale of the device. A user can override this by setting a different default language synch for the Signature or by editing the Language value in the generated SEFF file itself. In other words, regardless of the default synch, any SEFF can be assigned a language by simply clicking the "Language" button and selecting a new language to be assigned to that SEFF. This enables the "L" in W5L search. The ability to search for, for example, only SEFFs made in Inuktitut makes Language a powerful variable for worldwide use.

colour: 11505770. In some embodiments, a Signature has a default colour. This can be a corporate colour or custom-selected. In some embodiments, navigation in SEFF may be performed with a theme set to that colour. Colours are selected from images when Signatures are made or edited. (See FIG. 8A)

Figure 8A:
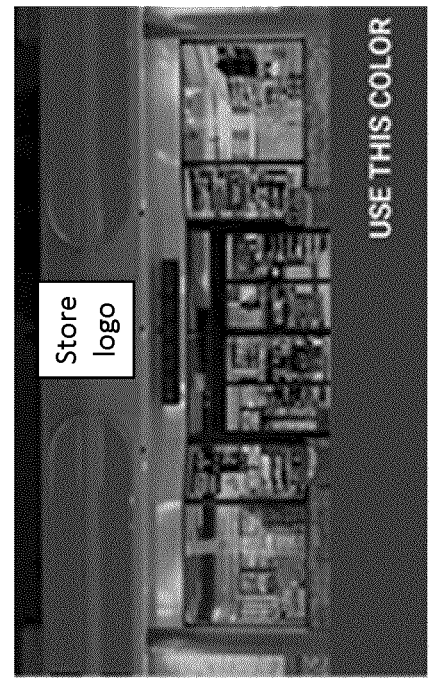
FIGS. 8A to 8C illustrate examples of SEFF signatures in different colours, in accordance with some embodiments.
Figure 8B:
Figure 8C:
Figure 9:
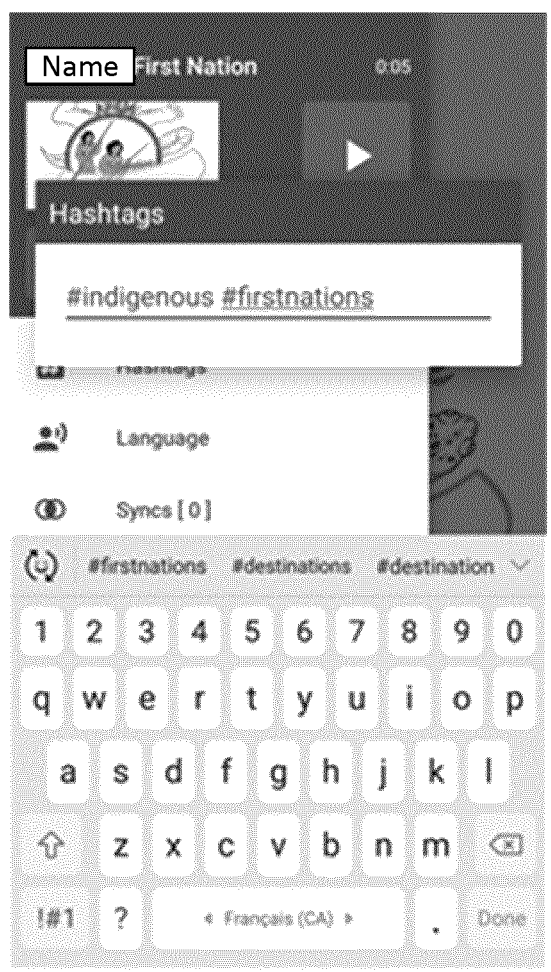
FIG. 9 illustrates an example of a user interface hashtag dialog box, in accordance with some embodiments.

FIGS. 8A to 8C illustrate examples of SEFF signatures in different colours 800A, 800B, 800C, in accordance with some embodiments. In the first example (See FIG. 8B) the user has selected a blue from the sky in the background of the Signature icon. In the second example (See FIG. 8C) the corporate colour of the organization is used. The use of custom colours for Signatures makes it easy to find content and identify its providers. A Signature's custom colour also provides the theme colour for the "website equivalent" that SEFF provides all users (by Signature).

orient: 1. This value is automatically captured and stored when the SEFF is made. 0=Landscape; 1=Portrait. This is useful when the content is played on mobile devices that can be rotated.

verson: 1582645662031. This value is automatically stored whenever a SEFF is made or edited. It is an epoch-time timestamp in milliseconds. This is useful during search to determine if the user is seeing up-to-date content.

hshtgs: [ ]. This array can be empty, as in the case of the Image file example here. Alternatively, by simply clicking the Hashtags button available when making or editing any SEFF, the user can assign Hashtags to any SEFF. FIG. 9 illustrates an example of a user interface hashtag dialog box 900, in accordance with some embodiments. Now the Hashtags array within the metadata would look like this: "hshtgs": [#indigenous, #firstnations]

Establishing relationships between files in order to provide a useful, convenient, efficient, and enjoyable internet experience is, in existing art, attempted by two methods: (1) hyperlinks, and (2) relational databases. Both technologies require infrastructure—hardware and software—that is complicated and expensive to build and maintain.

SEFF—the Synchronized Experience File Format—is unique in eliminating the need for hyperlinks and relational databases. This is because the SEFF file format anticipates relationships between information, stores and processes relationships between the parent file and all other forms of related information, including other SEFF files.

There are different methods by which SEFF may establish and process relationships between files. In some embodiments, a SEFF file comprises (1) its own information type (e.g. image, location, video, business hours, custom code, etc.), and (2) relationships to other SEFF and non-SEFF files.

In some embodiments, SEFF establishes relationships between files in three ways:
(1) by organizing (storing) related files together in a uniquely identified folder;
(2) by allowing users to attach non-SEFF files to a SEFF (e.g. attach a PDF map to a SEFF Contact File); and
(3) through the concept of Synchs.

In some embodiments, synchs are a list of the unique identifiers of other SEFF files to which the SEFF file is related (synchronized). A SEFF comprising a PDF of a menu could, for example, be synched to other SEFFS storing the restaurant's opening hours, location, phone number, etc.

synchs: [ ]. Synchs are a very useful part of the SEFF technology. SEFF files are interrelated and grouped though a number of methods (some widely used and some optional), including a common ID, a common directory, common language, hashtags, and metadata. All of these behind-the-scenes methods enable SEFF users to manage digital information in a single, easy-to-understand manner. Synchs may be used to relate any SEFF file (of any type) to one or more other SEFF files (of any type). If a user wants to create a "group" Signature that is similar to a group email, then the user may create a Signature (e.g. "Class of 2020") and synch it with other Signatures. It is now easy to communicate with all of the Signatures in that group by communicating with the single group Signature named "Class of 2020". If a user wants to make a SEFF Access file (e.g. a QR code that will unlock a door) available for a certain time only, then the user may synch the SEFF Access file to, for example, the Event file "Bluesfest 2020" and a temporal relationship has been created and will apply W5L search capabilities to the SEFF.

Synchs may also be used as a tool for spatializing information. If a user wants to make a video easy to find for people in the waiting room at the Ottawa General Hospital, then the user may synch the video with the Location file "Ottawa General Hospital"; a spatial relationship has been established and will be used in W5L search.

Figure 10B:
FIGS. 10A to 10D illustrate, in screen captures, an example of the generation and selection of synchs, in accordance with some embodiments.
Figure 10A:
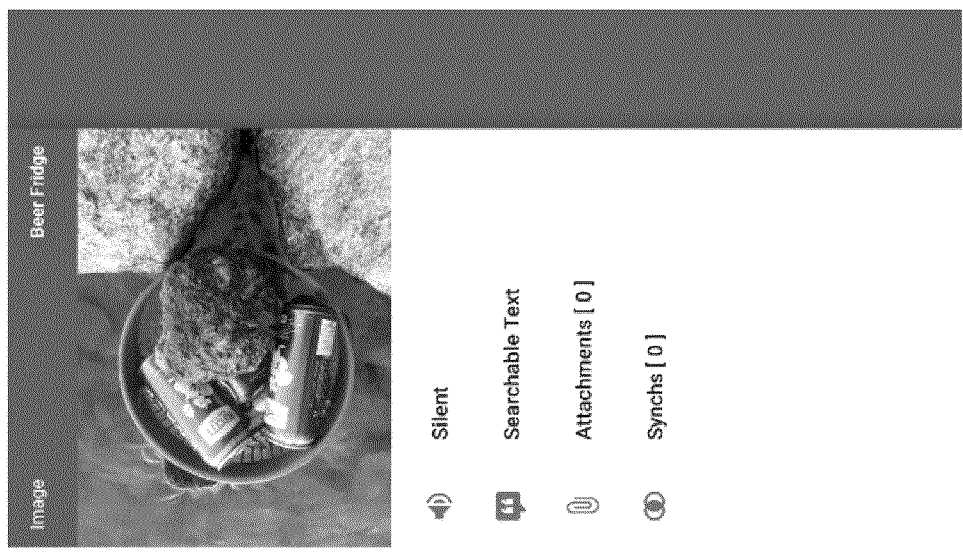
Figure 10D:
Figure 10C:
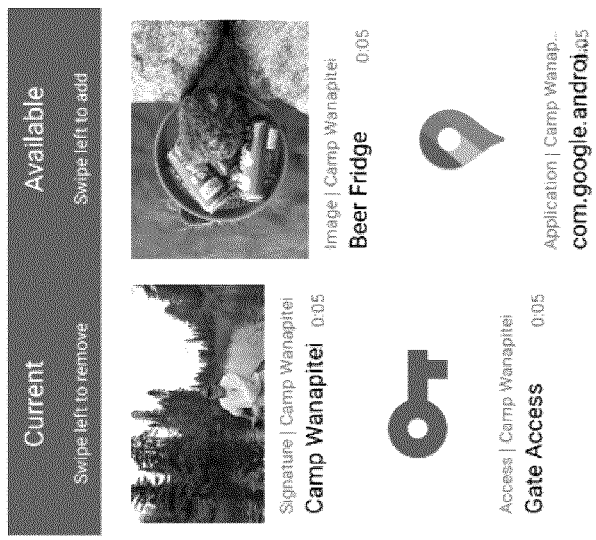

FIGS. 10A to 10D illustrate, in screen captures, an example of the generation and selection of synchs, in accordance with some embodiments. FIG. 10A illustrates, in a screen capture, an example of a SEFF user interface for a new, and not yet synched, SEFF Image file named "Beer Fridge", in accordance with some embodiments. Note that the number of synchs is zero. When the user clicks on the Synchs [0] button on the menu, SEFF launches its Synchs selector interface. FIG. 10B illustrates, in a screen capture, an example of a Synchs selector interface, in accordance with some embodiments. This interface comprises two columns. The column on the left is a graphical list of the other SEFFs currently synched to the active SEFF. Note zero "Current" Synchs. The column on the right is a graphical list of SEFFs that are available to be synched. The user simply swipes SEFFs from the right-hand into the left-hand column to add Synchs. FIG. 10C illustrates, in a screen capture, the Synchs selector interface having selected Synchs, in accordance with some embodiments. Note that two Synchs have now been selected, by swiping them into the "Current" column. Ready to Save changes. In some embodiments, swiping SEFFs left out of the left-hand column removes them. Once the user has added and/or removed synchs, the "Save" button may be clicked to save the unique IDs in the "synchs" field's JSON Array. FIG. 10D illustrates, in a screen capture, the SEFF user interface, where the SEFF's menu now shows "Synchs [2]".

Any SEFF file can be synched to an unlimited number of other SEFF files, enabling multivariate descriptions that focus search results. Show me all SEFFs: (1) posted by "The City of Montreal", (2) located in "My Neighbourhood", (3) during "March Break", (4) containing the word "Parking". This is just one example of the power of synchs to relate space, time, and themes, and to empower W5L search.

Figure 10G:
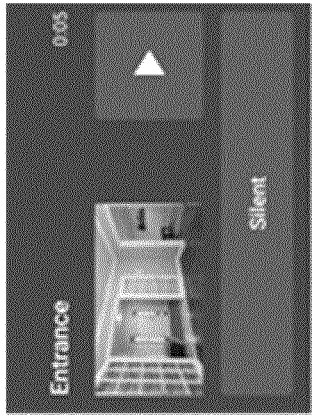
FIGS. 10E to 10G illustrate, in screen captures, an example of the use of synchs in SEFFs, in accordance with some embodiments.
Figure 10F:
Figure 10E:
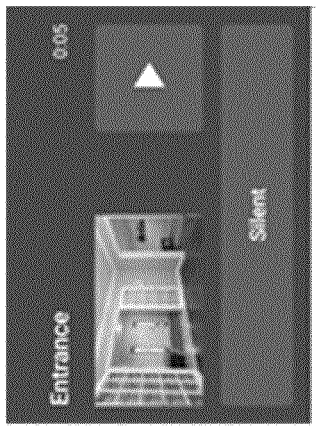

Synchronizing files is as easy as tap|click|swipe of a SEFF icon. If a file is not synched with anything, the array in the synchs field of the metadata is empty "[ ]". For example, assume that a real estate agent is listing a house for sale. The agent would like to relate all photos, his contact information, the location of the home, other documents about the home, and SEFFs generated by other organizations such as the local transit authority, schools, libraries, etc. By creating—in about 10 seconds—a Signature dedicated to the sale of the property and synching that Signature to all of the other content described above (using simple tap|click|swipe gestures) the agent can create a tool to help sell the home that is infinitely more powerful than if he or she had taken days or weeks to build a dedicated website for that listing. FIGS. 10E to 10G illustrate an example of the use of synchs in SEFFs, in accordance with some embodiments. See FIG. 10E—"Entrance" Image file with no synchs [0], FIG. 10F—Tap|click|swipe to add (or remove) synchs, and FIG. 10G—The Image file now has three synchs [3].

The Image file of the entrance is now synched with the Signature for the sale of the home, a Location file (the location of the house) and an Event file (describing an open house). When the user clicks the "Done" button, the synchs are written to the synchs field (array) of the metadata. In this example, that field was previously empty "synchs": [ ] but now comprises the IDs of the three SEFFs to which it is synched: "synchs": ["7487941113434096407", "2272336199748634789", "5574798692553336726"].

When a Signature is synched with other files, any new SEFF made by that Signature automatically inherits all of the Signature's synchs. These are easily added to or removed in seconds using tap|click|swipe gestures in the interface shown in FIG. 10F. A business user would typically synch the business Signature with a Contact file, a Location file, possibly a menu or other pdf file, a Business Hours file, etc. This way, recipients of any SEFF from the business have access to all the spatial and temporal information they require, every time.

sfdata : {"file_name_without_extension" : "Entrance", "file_extension" : ".png", "file_name_with_extension" : "Entrance.png", "mime_type" : "image\/png" }}

The sfdata element is the final part of the metadata in this embodiment. In some embodiments, the metadata is stored in a JSON object. JSON objects can comprise other JSON objects. The sfdata field can thus be thought of as a JSON object within a JSON object. This method accommodates SEFF files being able to store significantly different information in filetype-specific formats.

The specific information (variables) stored in the sfdata block will be outlined in detail below. For now, suffice to say that many of the SEFF filetypes may comprise different information, in a variety of formats, in this block. Table 3 shows a quick sample:

TABLE 3

File type and Data block contents

| File type | Data block contents |
| --- | --- |
| Access | Access code. |
| Application | Package name and manager. |
| Contact | Contact Name. |
| Event | Event start and end details. |
| File | File type, name, extension, etc. |
| Hours | Start and end hours and minutes by day. |
| Image (Sketchable) | File type, name, extension, etc., sketch points if applicable. |
| Interests | Keywords. |
| Link | Url. |
| List | IDs of SEFFs in list. |
| Location | Many variables describing address, map, street view, etc. |
| Message | Empty. |
| Music | Title, artist name, file name, extension, etc. |
| Product | Barcode, name, price, currency, etc. |
| Script | Default file names. |
| Search | Array of search terms in key-value pairs. |
| Service | Service-specific data. |
| Signature | Empty. |
| Slideshow | Array of start times and SEFF IDs. |
| Story | Array of SEFF IDs in play order. |
| Stream | Empty. |
| Task | Task specifics. |
| Title | Text of title, color of background. |
| Tracker | Empty. |
| Video | File type, name, extension, etc. |

Uncommon Elements: Additional Files in SEFF Directories

In some embodiments, SEFF file directories include a minimum of three files: audio, icon, and metadata. But some directories can also include other files as well. For example, a Contact file will include a ".vcf" file comprising the full contact information. Contact file directories can also include an image file, if the original contact has one. FIG. 11 illustrates an example of a contact file directory 1100, in accordance with some embodiments.

Table 4 shows a summary of additional file inclusion in the current implementation:

TABLE 4

Sample additional file inclusion

| Directory type | Additional files |
| --- | --- |
| Access | Yes. Mandatory JPEG of the QR code. |
| Application | No. All data is in the sfdata block. |
| Contact | Yes. Mandatory ".vcf" and optional contact photo. |
| Event | Yes. Mandatory ".ics" file. |
| File | Yes. Mandatory MIME-type file (e.g. "My Resume.docx"). |
| Hours | No. All data is in the sfdata block. |
| Image (Sketchable) | Yes. Mandatory image file (e.g. "Sunset.jpg"). |
| Interests | No. All data is in the sfdata block. |
| Link | No. All data is in the sfdata block. |
| List | No. All data is in the sfdata block. |
| Location | Yes. Optional ".kml", ".gpx", or other spatial files. |
| Message | Yes. Mandatory ".txt" or ".html" file. |
| Music | Yes. Mandatory music (audio) file (e.g. "Imagine.mp3"). |
| Product | No. All data is in the sfdata block. |
| Script | Yes. Mandatory script files (e.g. "form.js"). |
| Search | No. All data is in the sfdata block. |
| Service | No. All data is in the sfdata block. |
| Signature | No. All data is in the sfdata block. |
| Slideshow | No. All data is in the sfdata block. |
| Story | No. All data is in the sfdata block. |
| Stream | No. All data is in the sfdata block.. |
| Task | No. All data is in the sfdata block. |
| Title | No. All data is in the sfdata block. |
| Tracker | No. All data is in the sfdata block. |
| Video | Yes. Mandatory video file (e.g. "Car Chase.mov"). |

A zipped SEFF file (.sefz) 200 is a compressed file comprising one or more directories (folders) of standardized files that are tangible, synchronized and serializable.

"Standardized" means that all computer filetypes (e.g. a contact file, an image, a song), all internet URLs (e.g. a link to an organization's website, or a YouTube video), all programs (e.g. a JavaScript program that submits a form to a server), all search criteria, and everything else that is accessible via—or used to access—the Internet is stored in a common file format—the SEFF file format.

"Tangible" means that a SEFF file can be easily selected, played, paused, dismissed, deleted, re-ordered in a playlist, etc. using simple tap|click|swipe gestures. The user interacts with SEFF files using an app or within a browser.

"Synchronized". In some embodiments, SEFF files have a duration which is established by the length of a dedicated audio-synchronization file. The duration and audio components of SEFF files enable synchronization in the form of, for example, narrated sketches (users can sketch on different parts of a photo or screen capture of a map, street view, etc. while speaking about the area being sketched upon).

"Serializable". Where more than one SEFF file is used to comprehensively share information, the individual SEFF files can be played in sequence. This sequence can be easily changed by the user, due to the tangibility of SEFF files.

The standardization, tangibility, synchronization and serialization of every element of the Internet are found in the SEFF technology. These file characteristics are not currently available on the internet using any existing file system or protocol. In addition to the many other advantages of the SEFF protocol, it makes the SEFF system capable of Internet of Everything (IoE) "storytelling".

In some embodiments, SEFF files are rich in spatial, temporal and other metadata. Metadata may be stored in various ways: (1) in a dedicated file that forms part of a SEFF, and (2) as fields within the EXIF (EXchangeable Image Format) tags of the SEFF icons. This rich metadata enables simultaneous multivariate searching that is not possible using Google or other text-based search engines. It also enables one-click phone-dialing, directions, business-hours listing, and a host of other conveniences unknown to any filetype before SEFF.

SEFF files are autonomous, can be encrypted, and can be shared and posted anywhere. The security and privacy of the SEFF data model are described herein.

SEFF File Composition

In some embodiments, compressed SEFF files (".sefz") have a unique ID and include the following three files:

A SEFF icon file with metadata in its EXIF tag;
A SEFF JSON metadata file with type-specific variables (i.e. Location file JSON is different from Contact file JSON);
The SEFF's audio-synchronization file.

Optionally, the compressed SEFF file (.sefz) can include additional files, such as a contact (".ics") file, an Acrobat (".pdf") file, or any other device-recognizable filetypes. For example, if the SEFF is an image, the original ".jpg" file of the image is compressed into the ".sefz" file. If the SEFF file is a Location, an associated ".kml" file may be included.

FIG. 12 illustrates, in a screen capture, an example of a directory 1200 (folder) of a Location SEFF file made by Camp Wanapitei, in accordance with some embodiments. The screen capture shows the directory 1200 (folder) for the SEFF file with the unique ID 7776183597317245592.

Figure 13:
FIG. 13 illustrates, in a screen capture, an example of the Signature icon for the Signature used to make the Location file, in accordance with some embodiments.

FIG. 13 illustrates, in a screen capture, an example of the Signature icon 1300 for the Signature used to make the Location file, in accordance with some embodiments.

7776183597317245592.mp3 is the SEFF's audio-synchronization file.

Figure 14:
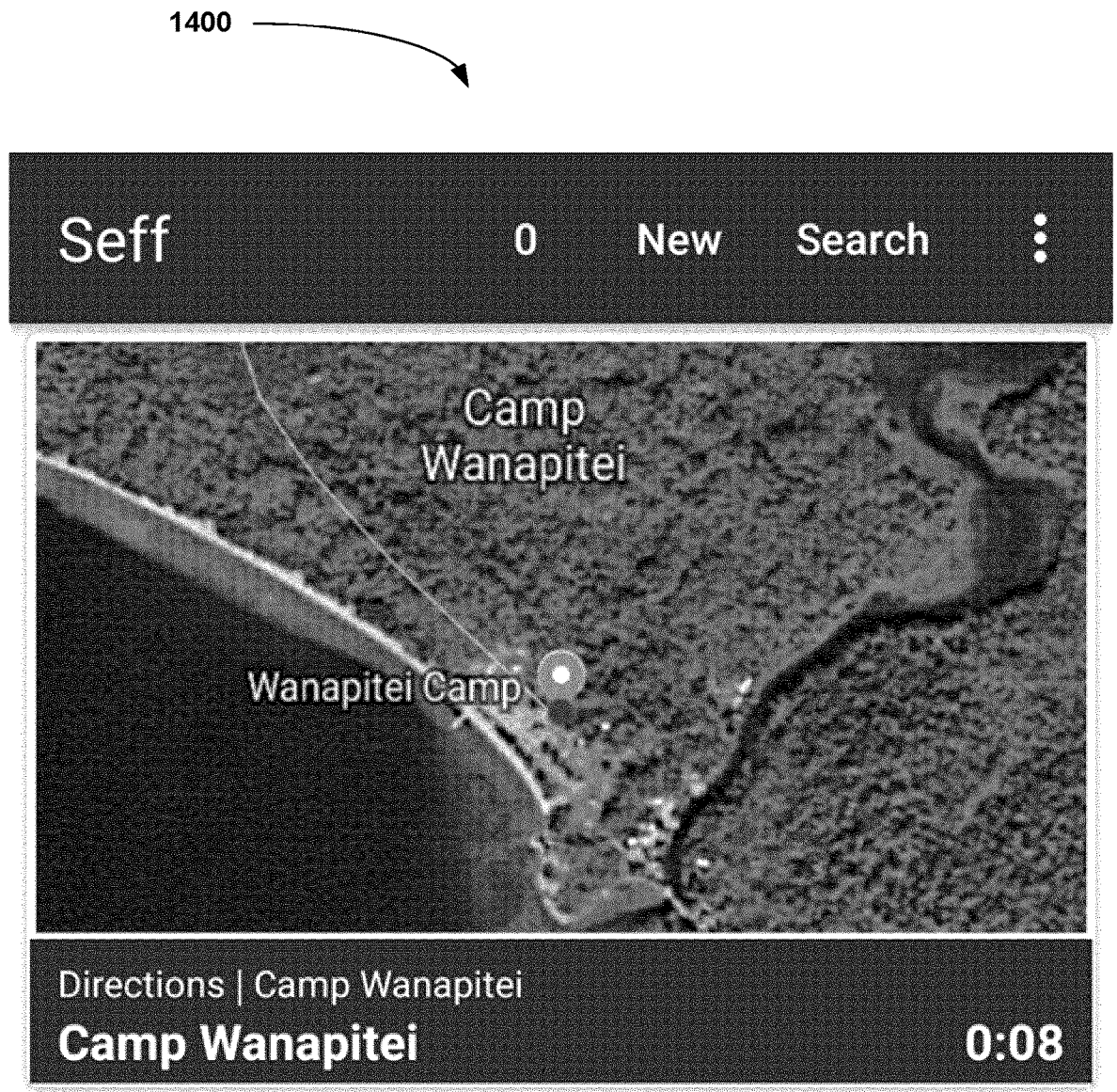
FIG. 14 illustrates an example of a SEFF icon, in accordance with some embodiments.

7776183597317245592.icon is the SEFF's icon. It is a .jpg file—with the extension reassigned from ".jpg" to ".icon"—that provides the visual representation of the SEFF 1400 shown in FIG. 14. This file also includes metadata about the SEFF, stored in its EXIF tag. One of the key EXIF entries is the ID of the Signature that made the SEFF.

7776183597317245592.seff is a file that holds information about the SEFF. In this example, the JSON file includes all of the fields listed in Table 2. The camp's location, expressed as a SEFF Location object can include geographic coordinates, street address, street view variables and more. The geographic coordinates can be used to obtain one-click directions to the camp from anywhere.

In 2019, the 30th anniversary of the invention of the World Wide Web, digital information management, by individuals and organizations, is more chaotic than ever. Millions of apps, millions more websites, millions of databases, and an unimaginable number of files and search results are coursing through cyberspace with no attempt at standardization or integration. The lack of context this creates is astonishingly inefficient in terms of: (1) time wasted, (2) the amount of irrelevant data transferred, and (3) monetary and environmental costs.

Solving these problems can be achieved through a universal digital information management system, in which multiple elements can be simultaneously applied to all digital information:

Standardization
Sensitization
Spatialization
Synchronization/Serialization
Signable
Specifiable
Sketchable "Standardization". Think of the thousands of ways in which people generate, describe, search for, organize, present, share and submit information today. SEFF—the Synchronized Experience File Format—provides a standardized filetype and methods for all aspects of digital information management. In other words, SEFF provides a standardized approach to universal digital information management. A single standardized filetype and interface are the methods through which SEFF files are generated and by which all digital information can then be described, searched for, organized, presented, shared and submitted.

"Sensitization". Humans make use of five senses when managing information in the real world: sight, smell, hearing, taste, and touch. Three of these senses—sight, hearing, and touch—are currently used to facilitate digital information management. For example, the invention of the graphical user interface dramatically improved the way in which sight could be employed in the management of digital information. The invention of the touchscreen enabled the selection, ordering and deletion of information using the human sense of touch. Digital audio enables us to hear information, such as spoken directions from a GPS. Hearing is an increasingly important sense with respect to the sharing of information in a mobile and hands-free world.

But the power of sight, hearing and touch is sparingly and sporadically employed in the millions of methods people use to manage digital information. For example, look at all of the digital information types and sources and all of the search, submission and presentation methods used in the "simple" email of FIG. 1.

All of this digital information was painstakingly prepared fora small audience. And, now, all of it is locked in place. Because none of the 21 digital information elements in this email is tangible with respect to sharing, the only way to share a single element is to download an attachment, create a new email, attach the file to the new email, and send it. If the element being shared is not an attachment, a new email is still required, into which a URL could be cut and pasted. That URL might be a link to a web page on which a JavaScript routine is running. Imagine if all of these elements were, instead, presented in a standardized, tangible format. Simply tap|click|swipe the JavaScript SEFF to submit information, or tap|click|swipe to share it with others.

SEFF is the only digital information management system that sensitizes (i.e. applies sight, hearing and touch to) all digital information types and sources, and all information description, search, submission and presentation methods.

"Spatialization". Location is a useful type of digital information. It is difficult to call an Uber, book a hotel room, meet a friend at a restaurant, hike a trail, take an airline flight, or receive an Amazon shipment without understanding location. But how do people actually think about location, and how do computers handle it? People think about location in a number of ways. They may think of it in terms of a point defined by an address (e.g. 40 Westward Way, Ottawa, Ontario, Canada), a point described by a view (e.g. meet me at the green bench near the side door of our office building), an area (e.g. inside Terminal 1 at Heathrow Airport), or a line (e.g. Trail 95—L'Algonquin, a hiking trail on Mont Tremblant). In short, people understand location using points, lines and areas and they define and share them using formal names, proxy names, addresses, and descriptions. People often think of locations visually without reference to a standardized name or address (e.g. meet me at the green bench near the side door of our office building). Computers understand locations when these human surrogates for location (address, name, description, visualization)

are translated into geographic coordinates. Those coordinates can then be used to define points, lines, or areas that computers can process. Digital information management systems typically take a minimalist approach to converting human-understandable locations (e.g. an address) into computer-understandable coordinates (i.e. a single latitude/longitude pair). No existing digital information management systems use a Location object that comprises at least one of—and as many as all of—address, audio description, point definition, line (e.g. route) definition, area definition, and visualization parameters (i.e. view latitude and longitude, bearing, tilt, zoom). SEFF is a digital information management system that uses a proprietary Location object that simultaneously understands all of the ways in which both humans and computers define locations using addresses, voice descriptions, formal place names, proxy place names, view parameters, points, lines, areas, latitude and longitude. Because of the sensitization inherent in the SEFF protocol, all of these parameters can be applied to any information type or method using a simple tap|click|swipe gesture. For example, synch a Location file with an Event file using a simple tap|click|swipe gesture to provide address and one-click directions to the event "Gloucester Under 14 Soccer Tournament".

"Synchronization"/"Serialization". How do people think about time, and how do computers handle it? People define—and share information about—time in much the same way they define—and share information about—location: using words and numbers. "When I was in Grade 6" is a description of a time period that people can understand, and so is "Your appointment is at 10:15 a.m. on Thursday, Oct. 31, 2019." Computers are confused by "10:15 a.m. on Thursday, Oct. 31, 2019" because that time occurs repeatedly throughout a 24-hour period, sequentially throughout all of the time zones on Earth. And, a computer has no idea when you were in Grade 6. As with the translation of human descriptions of location into latitude and longitude, computers translate human descriptions of time into any number of Date-Time formats, one of which, for 10:15 a.m. on Oct. 31, 2019 in London, England, looks like this: 2019-10-31T10:15:00.000Z. SEFF is a digital information management system that uses a proprietary Event filetype that simultaneously understands all of the ways in which both humans and computers define time using written descriptions, voice descriptions, names (e.g. "My birthday weekend"), and year, month, day, hour, minute, second, millisecond, time zone, daylight savings time, start and end variables. Because of the sensitization of the SEFF method, all of these parameters can be applied to any information type or method using a simple tap|click|swipe gesture to synch the files. For example, tap|click|swipe the "Halloween Sale" Event file over the "OH HENRY! Halloween Chocolatey Candy Bars, 30 Count, 450 Gram" Product file to indicate that this product is on sale from 9:00 a.m. on Saturday, October 19$^{th}$ until 9:00 p.m. on Thursday, October 31$^{st}$.

SEFF is a digital information management system that assigns a duration to all digital content. Audio and visual elements can then be synchronized. (See discussion of "Sketchable" for one description of the power of managing information this way.)

The duration attribute also enables SEFF content to be serialized. SEFF is a digital information management system that enables the presentation of interactive information in an easily reorderable yet familiar "story" format. Existing methods of (albeit primitive) serialization include the use of HTML to present a caption below a related image, the use of PowerPoint to present one slide after another, or the production of an edited video. All of these technologies required considerable time and effort to edit, with limited interactability, contrary to a SEFF Story.

"Signable". Email programs allow for the automatic inclusion of a static "signature" at the bottom and it's possible to open multiple social media accounts for home and work. Other methods of managing information around a theme include the creation of groups on some social media platforms. SEFF is a digital information management system that enables users to create a Signature in seconds and to synch it using simple tap|click|swipe gestures with video, business hours, contacts, events, files, keywords, links, locations, scripts and more. Create a Signature for an entire business, for a special event like a conference, or for "My Vacation in Barbados."

"Specifiable". The amount of sophisticated metadata—including audio, and unique Location objects to handle spatialization and Event objects to handle temporalization—that SEFF brings to all digital information makes that information specifiable. SEFF is a digital information management system that enables concurrent W5L (Who, What, Where, When, Why, Language) search and distribution. SEFF can to find all flights on British Airways or United Airlines between London and San Francisco on "My Birthday Weekend" or during "Debbie's Vacation". SEFF can distribute a map of overnight parking ban notices to people living on a specific block. SEFF can provide QR Code access (effectively a modern-day ticket) to a Boston Bruins' hockey game to a specific person from two hours before the event "Bruins vs. Flyers" and only viewable when located at "TD Place". SEFF can subscribe to all new posts from The Backstreet Boys relating to events in Montreal in December. SEFF is a "specifiable" digital information management system for the efficient temporal and spatial finding, organizing, sharing, submitting and presenting of information.

"Sketchable". Cavemen first shared information through primitive language 100,000 years ago and then through drawings about 40,000 years ago. Sketching on a map or photograph while speaking about what a user is drawing is a powerful way to present digital information. However, digital information is not typically shared in this manner. This is because information management systems do not recognize the power of simultaneous visual/auditory information sharing that is inherent in a narrated sketch. SEFF is a digital information management system that employs a Sketch object to bring synchronized narrated sketches to views of all filetypes.

As noted above, SEFF is a unique digital information management system that provides methods and processes for information generation, description, search, organization, presentation, sharing and submission. SEFF does this by bringing multiple elements to its unique file structure, including:

Standardization
Sensitization
Spatialization
Synchronization/Serialization
Signable
Specifiable
Sketchable The result is improvement in the efficiency—and fun—of all aspects of digital information management. Specifically, SEFF is a digital information management system that:
  applies a standardized approach to all digital information management;

sensitizes (i.e. applies sight, hearing and touch to) all digital information types and sources, and all information description, search, submission and presentation methods;

uses a proprietary Location filetype that simultaneously understands all of the ways in which both humans and computers define locations using addresses, voice descriptions, place names, view parameters, points, lines, areas, latitude and longitude;

uses a proprietary Event filetype that simultaneously understands all of the ways in which both humans and computers define time using written descriptions, voice descriptions, names (e.g. "My Birthday Weekend"), and year, month, day, hour, minute, second, millisecond, time zone, daylight savings time, start- and end-time variables;

assigns a duration to all digital content;

enables the presentation of interactive information in an easily reorderable yet familiar "story" format;

enables users to create a Signature in seconds and to synch it, using simple tap|click|swipe gestures, with video, business hours, contacts, events, files, keywords, links, scripts, locations, and more;

enables concurrent W5L search and distribution;

provides easy metadata application to all digital information types, making it a "specifiable" digital information management system for the efficient temporal and spatial finding, organizing, sharing, presenting and submitting of information; and employs an audio-synchronized Sketch object to bring this powerful means of human communication (narrated sketches) to digital information management.

Ever since the invention of the computer, people have tried to use digital technology to better manage (i.e. generate, describe, search for, organize, present, share and submit) digital information. But systems such as relational databases, the World Wide Web, and, more recently, mobile applications, were developed to optimize specific functions using specific types of information. If a user needs to find a location, then the user would use a Maps application. If a user wants to submit a payment, then the user would use a JavaScript routine embedded in a web page. If the user wants to share a video, then the user would post it to a video application (e.g., YouTube). If a user wants to advertise their company, then the user would build a website. The result is millions of different databases, search methods, web pages, social media sites, and mobile applications. SEFF was designed by looking at the problems people have managing digital information and by starting again.

The first step was to categorize the types of digital information that individuals and organizations manage billions of times per day. But "types of digital information" could not be limited to "filetypes" because much of the digital information managed is ephemeral and may never exist in a traditional computer file of any type. Also considered was the standardization of not only the types of information but also all of its sources (e.g. servers) and all of the search, submission, organization, and presentation methods used in its management. Table 5 shows a list of filetypes in the current implementation (in alphabetical order), each of which is now a SEFF filetype:

TABLE 5

 Access. Whether a user is getting on a flight, heading to their seat at a hockey game or simply looking to access information about a painting at an art exhibit, QR codes are a common means of providing access. SEFF Access files make it easy to limit access to a person at a location and during an event. Just (optionally) synch a Signature file, Location file, and Event file and you have an Access file that the user can get directions to with one tap | click | swipe or add to their calendar with one tap | click | swipe. Why not narrate the Access the user is sharing: "Hey, Peter, here's your access code to the building for our meeting on Thursday. Once you're scanned in, I'll be notified and will meet you in the lobby."

 Application. Many applications serve very specific purposes. By generating an Application file (which involves merely selecting the app on your phone and, optionally, narrating it), a user can include that functionality within a SEFF Story or share it with a friend so they can turn on and off the lights in the user's home while the user is away. The inclusion of Application files in SEFF means any code written for a device can inherit metadata.

 Contact. Creating a SEFF Contact file is as easy as selecting a contact on a device. A user can then narrate it if you like and synch it with the user's Signature with a simple tap | click | swipe.

 Event. The SEFF Event file is described in more detail elsewhere. Taking only a few seconds to create, the Event file can then be synched with other SEFF files to, for example, provide access to a Product at a given price, but only during a sale at a specific location.

 File. The SEFF 'File' filetype can be thought of as a metadata-turbocharged version of any existing filetype. Synch a Location file to a pdf of fishing regulations for a specific lake, or synch an Event file (e.g. "Dinner Thursday, October 31") to a pdf of a menu for that night. SEFF recognizes all existing Mime types, enabling the inclusion of any file in a SEFF Story and allowing it to benefit from the other powerful SEFF files with which it can interact.

 Hours. Opening and closing hours by day of week. Current best practice for publicizing business hours requires changes to html on a corporate website and/or an account with Google. SEFF business hours can be changed in seconds and can be synched with locations and other relevant W5 information.

TABLE 5-continued

Image (Sketchable). Images can be narrated, sketched upon, synched to locations and events, and shared or posted, all through the SEFF UI. Sketching on a map or photo or screen capture of a spreadsheet or text message while describing what you're drawing is a powerful method of information sharing. SEFF's fast and easy Sketch object brings this functionality to first responders describing the flight of a suspect, physicians circling and describing an area of concern on an x-ray, and kids showing their grandparents which puppy in the litter they chose.

Interests. Declare interests using simple keywords and have SEFF find related files using its sophisticated synchronized W5 search technology.

Link. If a user wants people to be able to find their company's social media links, or wants to include a promotional YouTube video in their Signature, then the user may create a Link file in seconds and then synch it to an Event file and a Location file.

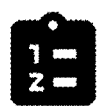
List. Create sharable lists of SEFFS, including products, that can be edited by anyone with whom the list is shared. Watch in real time as shopping is done.

Location. The way in which SEFF understands points, lines and areas in the same way that both humans and computers do, means users can bring the most comprehensive spatial specificity logic to the search, organization, presentation, and sharing of all information types (e.g. send an Amber Alert to only those Signatures located within an irregular area).

Message. Messages sent and received using SEFF can include audio narration and can be synched with all information types and methods. Use "Comment" to respond to a posted message and "Reply" to respond to a private message.

Music. The SEFF Music file enables people to do whatever they currently can using existing playlist applications, plus add all of the functionality of SEFF, including adding introductory narration to a song, including a song in a story, and having a song play when a person arrives at a specified location. SEFF brings the power of swipeable metadata to music.

Product. SEFF solves the problem of bricks and mortar retailers unable to compete with online giants. A user may post their products on SEFF and other users will be able to find them by scanning a barcode, by keyword, or just by being within a given distance of the first user's store.

Script. Millions of scripts, written in a variety of programming languages, are running in web pages around the world, providing search and submit access to databases and many other functions. A SEFF Script file is as simple to integrate with all other information as any other type of SEFF file (i.e. tap | click | swipe to synch). Literally billions of dollars of scripts developed by corporations will run more efficiently in SEFF than they do in their current web pages.

Search. The simultaneous W5L search - and distribution - enabled by is powerful. Information may be found at any number of locations during any number of time periods with the simple tap | click | swipe of Location files and Event files. The search may be saved as a SEFF Search file and sent to a friend. One tap | click | swipe to get the latest search results. It may also be narrated: "Hey Peter, click here to see all wheelbarrows for sale at Home Depots and Canadian Tire stores in Orleans and Gloucester over Thanksgiving Weekend."

Service. SEFF solves the problem of small service businesses unable to compete with online giants. Services may be posted on SEFF and users will be able to find them by keyword, or just by being within a given distance of the business.

Signature. SEFFs unique combination of a Signature name, unique ID, color, and common filetype with SEFFs make it a powerful information management tool.

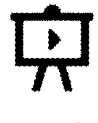
Slideshow. Slideshows are one of multiple ways in which information can be synchronized using SEFF. In this case, a single background audio file is used and SEFFs are synchronized with it using key-value pairs of start time and SEFF ID.

Story. The SEFF information management system can apply a duration to all content. This duration is automatically adjusted without any thought or effort by users. For example, narrate a Contact file for 33 seconds and that becomes its duration. Make a SEFF Video file from a video and the duration is read from the original file. These durations enable the presentation (playing) of SEFFs in sequence, creating stories.

TABLE 5-continued

Re-ordering, adding to or deleting from a Story is as simple as using tap | click | swipe gestures to include (or remove) the SEFFs you want to use. Stories can be paused by the viewer to, for example, submit information to a server (e.g. checking in to a hotel), or look around the hotel's neighbourhood using a Location file (comprising a map, a view, addresses, place names, and geographic coordinates). SEFF is a interactive storytelling platform.

Stream. This SEFF filetype allows live-streaming of audio and video with one device running SEFF as a host and unlimited other devices receiving the stream.

Task. Tasks are a common filetype that benefit from synchronization with other information types, especially locations and events, when used in SEFF

Title. Because SEFF plays information in sequence in various ways including in Stories and Slideshows, the Title filetype enables users to introduce content in much the same way as is done in edited videos.

Tracker. SEFF enables subscribing devices to track the location of a broadcasting device and to see street views, look up addresses, and get directions to the device being tracked.

Video. Videos can be narrated, synched to locations and events, and shared or posted, all through the SEFF UI, as with SEFF filetypes. The use of videos within other serialized content (via the Story filetype and the Slideshow filetype) is especially powerful.

The SEFF file format was designed to handle all of the world's digital information types and management methods in a standard way, to bring W5L (Who, What, Where, When, Why, Language) metadata and search to all information types, to spatialize and temporalize all information, and to enable the "playing" of files in sequence (i.e. the creation of multimedia stories/slideshows of all information types).

Figure 15:
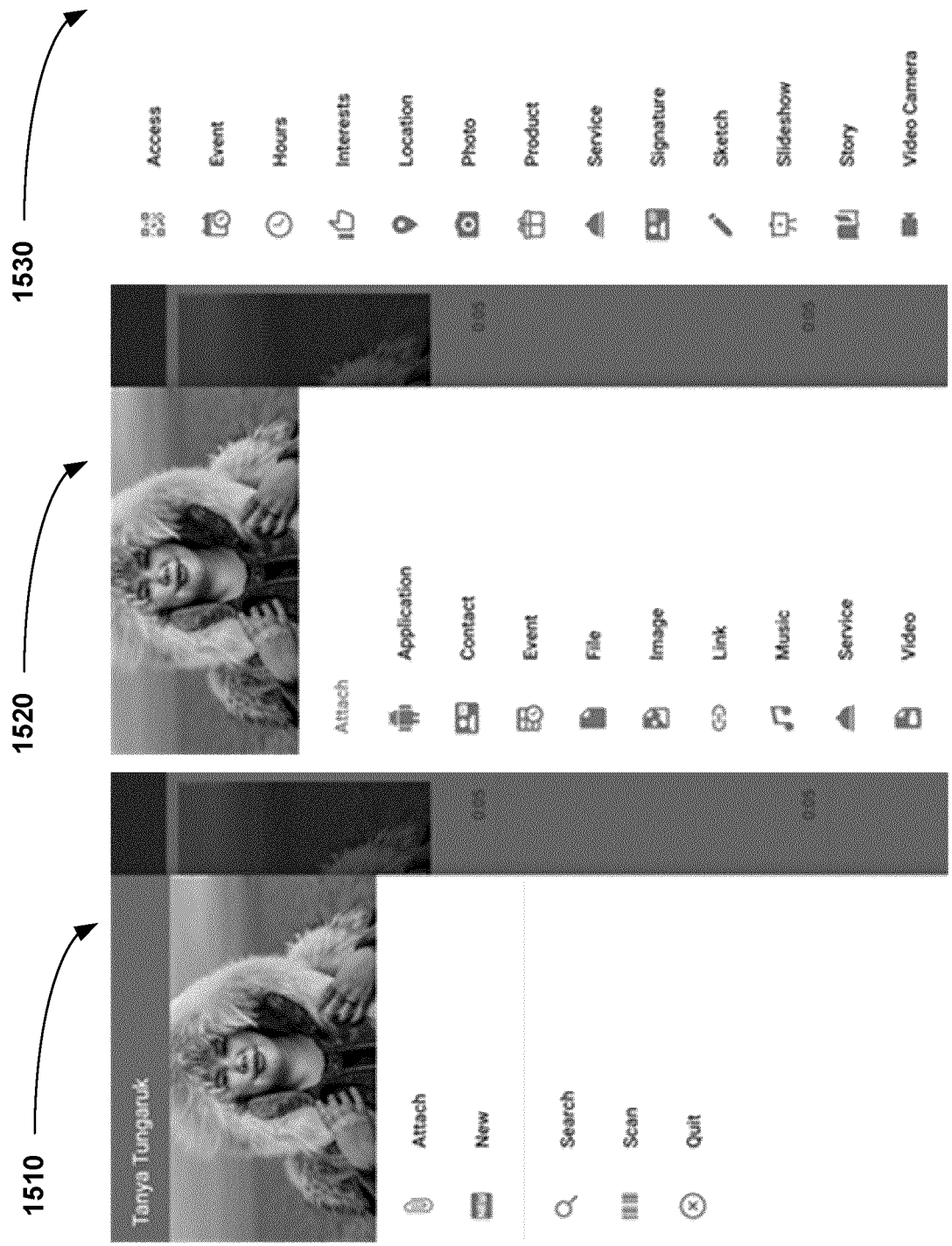
FIGS. 15A to 15C illustrate an example of the generation of a new SEFF, in accordance with some embodiments.

Creating a new SEFF. FIGS. 15A to 15C illustrate an example of the generation of a new SEFF, in accordance with some embodiments. See FIG. 15A—New SEFF option 1510, and FIGS. 15B and 15C—"New" SEFF options expanded 1520, 1530.

In some embodiments, there are multiple distinct SEFF filetypes, including, but not limited to:
Access
Application
Contact
Event
File
Hours
Image (Sketchable)
Interests
Link
List
Location
Message
Music
Product
Script
Search
Service
Signature
Slideshow
Story
Stream
Task
Title
Tracker
Video The SEFF file format may be used to represent all information accessible on the Internet as well as every method of accessing that information. In other words, a jpeg image can be converted into a SEFF file as easily as can a URL; a Location SEFF file has the same format as a Search SEFF file; SEFF treats an appointment the same as a sketch.

Making a SEFF file varies slightly by filetype. There are steps during the creation of a SEFF file from a URL that are different from those used when creating a SEFF file of an Adobe Acrobat pdf document, for example. But the user interface developed to enable people to make SEFF files has far more common steps than filetype-specific ones.

Figure 16:
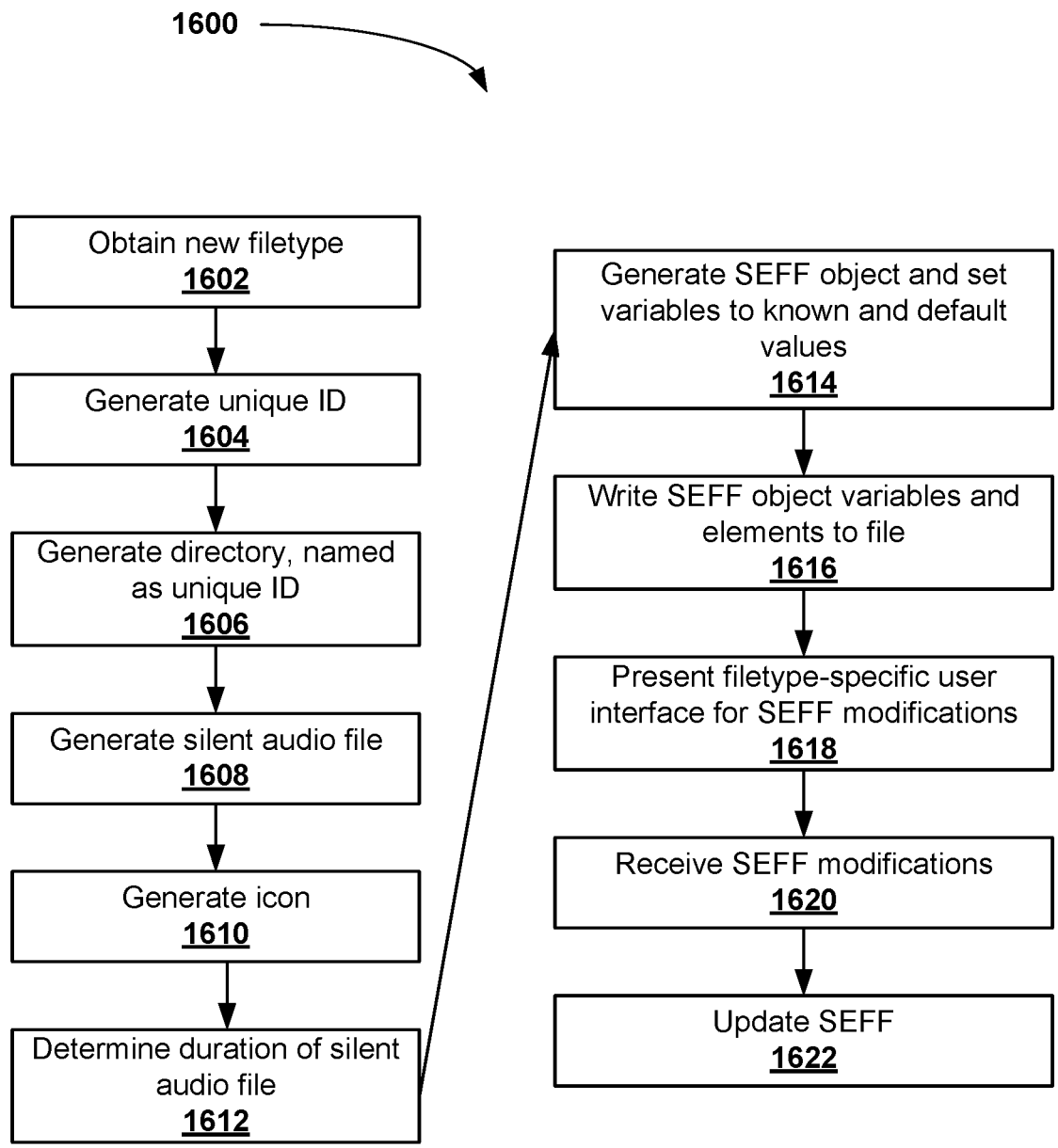
FIG. 16 illustrates, in a flowchart, an example of a method of generating a SEFF file, in accordance with some embodiments.

FIG. 16 illustrates, in a flowchart, an example of a method of generating a SEFF file 1600, in accordance with some embodiments. The method 1600 comprises obtaining 1602 a new filetype. For example, a new filetype is read from a user input (e.g., menu selection). Next, a unique ID (e.g., 12345) is generated 1604. A directory is generated 1606 and named after the unique ID (e.g., 12345). A silent audio file may be generate 1608 as a .mp3 file. The silent audio file may comprise five seconds of silence and may be saved in the 12345 directory as 12345.mp3. An icon may be generate 1610. The icon may be 480 pixels by 270 pixels, named 12345.icon, and saved in the 12345 directory. The icon may be based on the filetype and its colour may be set to a colour of an active Signature. A duration of the silent audio file is determine 1612 using a "MediaMetadataRetriever".

Next, a SEFF object may be generated 1614 with variables set to known and default values. Some of the variables may be updated by a user later in the file creation/editing process. Below illustrates an example SEFF script for a new "Location" field with unique ID 12345:

```
class Seff {
var audext     String       .mp3                           Audio extension. . mp3 is default.
var audnme     String       Silent                         Audio name. Silent is default.
var colour     Integer      −348721                        Integer value of color of user's active
                                                           Signature.
var duratn     Integer      5269                           SEFF duration. Set to value established in
                                                           Step 1612.
var hshtgs     JSONArray    {"values":[ ]}                 Empty (default) JSONArray( ) to accept
                                                           hashtags later.
var langge     String       English                        Default is device default display language.
var orient     Integer      0                              Integer value for default portrait mode.
var seffid     String       12345                          The unique ID generated in Step 2.
var sfdata     JSONObject   {"nameValuePairs":{ }}         Empty (default) JSON object to accept
                                                           letype-specic data.
var sfname     String       Location                       Filetype used as name until actual name is
                                                           determined.
var sftype     String       Location                       SEFF filetype.
var signid     String       67890                          SEFF ID of Signature used to create the
                                                           SEFF.
var silent     Boolean      true                           Is the SEFF silent? True is default.
var subtyp     String       Location                       SEFF file subtype. Same as SEFF filetype
                                                           unless required.
var synchs     JSONArray    {"values":[ ]}                 Empty (default) JSONArray( ) to accept
                                                           synchs later.
var verson     Long         1591914761668                  Version. Epoch millisecond of file
}                                                          creation/edit.
```

In some embodiments, the SEFF object variables are written to the JSON file. In some embodiments, some elements are also written to the EXIF tag of the icon. The file name is 12345.seff and is saved in the 12345 directory. Next, a filetype-specific user interface is presented 1618 to user. Changes/modifications made there are received 1620 and updated 1622 in the 12345.seff JSON file that defines the SEFF and relevant elements are updated in the EXIF tag of the icon. Other steps may be added to the method 1600. The method 1600 is explained with reference to JSON. It is understood that other scripting languages, such as XML or others in the future, may be used to implement the method 1600.

Figure 17:
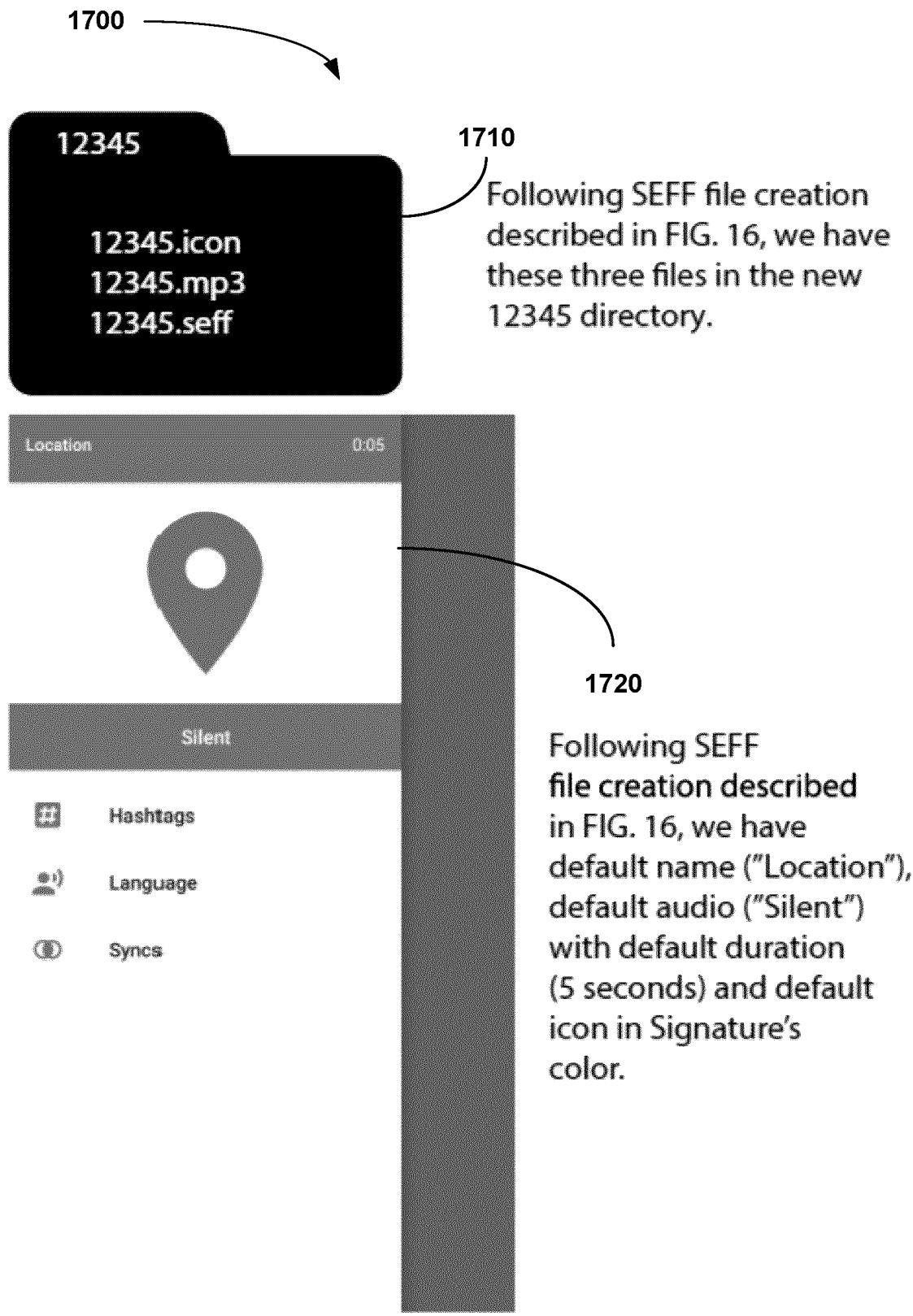
FIG. 17 illustrates an example of the results of the generation of a SEFF, in accordance with some embodiments.
Figure 20E:
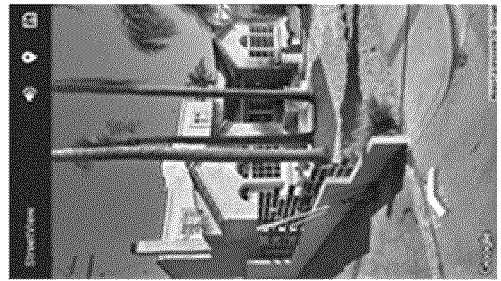
Figure 20D:
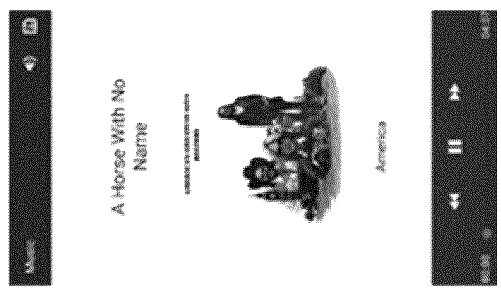
Figure 20C:
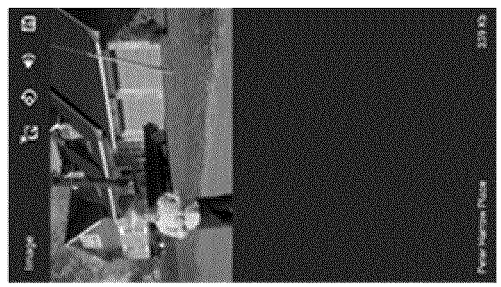
Figure 20B:
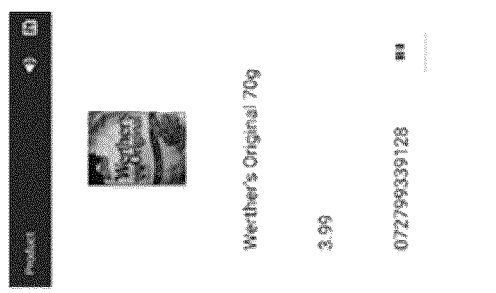
Figure 20A:
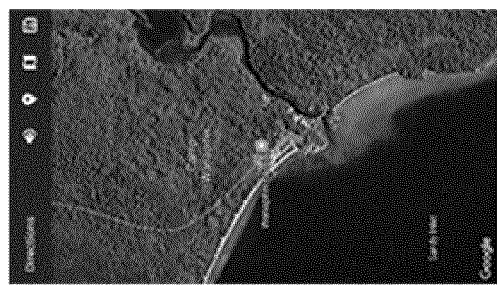

FIG. 17 illustrates an example of the results 1700 of the generation of a SEFF, in accordance with some embodiments. Following SEFF file creation 1600, the 12345 directory 1710 includes files 12345.icon, 12345.mp3 and 12345.seff. Following SEFF file creation 1600, the SEFF 1720 includes a default name ("Location"), default audio ("Silent") with default duration (e.g., 5 seconds), and a default icon in the Signature's colour.

FIGS. 18 to 24 further illustrate an example of the generation of a SEFF file, in accordance with some embodiments. Only the steps common to the creation of SEFFs are described below. Other steps may be added.

To get started making a SEFF file, the user selects a Signature and then clicks GO! In some embodiments, SEFF files are created using a pre-defined "Signature". Signatures themselves follow the SEFF file format. The ID of the Signature used to make a Seff is included in the new SEFF's metadata. This information may, thereby, be compressed into SEFF files. In some embodiments, as shown in FIG. 18, selection of a Signature opens a Main Activity window as shown in FIG. 19. From the Main Activity menu and submenus, the user selects "New" and then selects the type of new SEFF file being made. In this case New→Location.

A unique ID may be generated for the new SEFF. For example, "12345". A silent, default, 5-second long, audio-synchronization file is generated and saved in the new directory (also named 12345). This audio-synchronization file is named using the SEFF's unique id, followed by the file extension of the type of audio file created. For example 12345.mp3.

Depending on the SEFF filetype (sftype) being made, code is run that guides the user through the generation of the SEFF file. For example, if a Location file is being made, a map is presented; if a Music file is being made, a music-file-selector is presented; if an Image file includes a sketch, a background- and audio-type-selector dialog is presented.

At some stage, either before or after filetype-specific associated files and variables have been selected and set, and before being saved (updated), SEFFs, regardless of type, are presented within a user interface that allows for the selection or recording of an audio-synchronization file to replace the default, silent, 5-second audio-synchronization file generated at the beginning of the file creation process.

Depending on the SEFF filetype (sftype) being made, other menu options may also be presented (e.g. a dialog to move a street view to an address, or buttons to rotate an image). But common buttons include: (1) a button for the selection or recording of an audio-synchronization file to replace the silent, default version, (2) a button to change the name of the SEFF, (3) A button to change the SEFF's icon, and buttons to add or delete (edit) Hashtags, the SEFF's Language, and synchs. FIGS. 20A to 20E illustrate five example UIs with common and optional buttons.

Figure 21A:
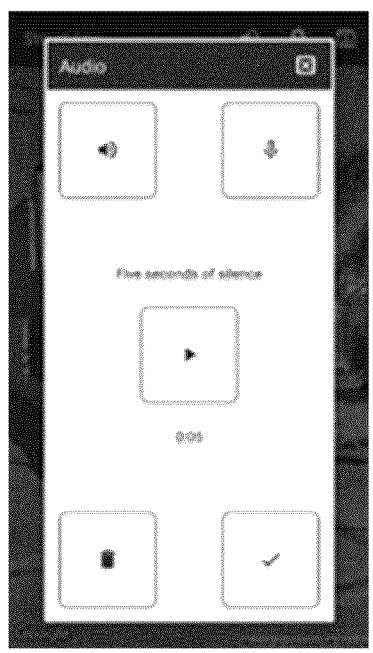
Figure 21B:
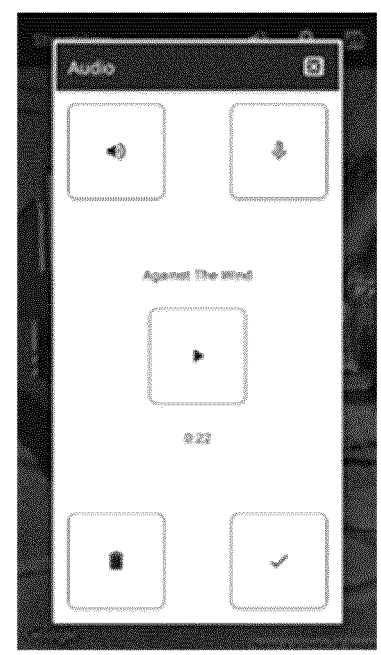

Clicking the new audio-synchronization file selection/recording button opens a dialog (shown twice (before and after) in FIGS. 21A and 21B) that allows for (1) selection of an existing audio file, (2) recording of a new audio file, (3) playback with pause option, (4) deletion (file is replaced with 5-second silent default), (5) acceptance of the new file. The file name/description, duration, and progress are also presented in this dialog.

Depending on the type of SEFF file being made, the user is prompted to select files, dates or times, describe events, define search criteria, make appointments, locate and format maps or street views, import JavaScript, find a website, build a product, etc. In short, a filetype-specific GUI is used to generate and/or gather all of the files and variables that will comprise the final SEFF compressed file. The specific code used to generate the new SEFF file gathers filetype-specific information. For example, when the user is making a Location SEFF file, the code will capture latitude, longitude, bearing, tilt, and zoom for the street view component, latitude, longitude, map-type and map zoom for the map component, the boundaries of a viewport (bounding box), and the street address, if applicable. In a different example, if a user is making a SEFF Contact file, the contact image, if present, is saved as part of the SEFF, as is the standard ".vcf" file for the contact.

Once all of the related files and variables have been selected, defined and assembled by the filetype-specific file-making code—and whether or not the user has replaced the audio-synchronization file—the SEFF file's JSON objects are updated.

Figure 22:

In some embodiments, a SEFF file includes a standard-dimension icon, stored in .jpg format. The icon file is made in one of two ways: If the SEFF filetype has a visual component (e.g. an image, map, street view, video, etc.), the user is prompted to crop that image to create the icon. FIG. 22 illustrates an example of cropping a dialog to generate an icon of standard dimensions.

Figure 23:

If the SEFF filetype does not have a visual component (e.g. an Excel spreadsheet, or an Event), the icon is auto-generated, with the same standard dimensions, based on the filetype. FIG. 23 illustrates an example of an automatically generated icon for an Event SEFF filetype.

Elements of the metadata built at the start of the file creation process—having since been updated during that file creation process—are also now stored in the metadata.

Filetype-specific variables are written to (updated in) the metadata. For example, the sfdata element of the JSON file for a SEFF Image file with a sketch comprises timed x-y point elements defining the sketch points and their timing, whereas the same sfdata JSON object for a SEFF Location file includes variables related to the Location's street address (if applicable), map, viewport (bounding box), and street view (e.g. latitude, longitude, bearing, tilt and zoom), if applicable.

In some embodiments, the SEFF's directory is compressed into a final ".sefz" file (e.g. 12345.sefz) as required for faster sharing.

In some embodiments, as soon as it has been made, the new SEFF file is loaded into the list of active SEFFs in the Main Activity. From here it can be played, shared, or posted.

List Mode

In some embodiments, there are multiple filetypes via which all of the world's digital information and methods can be managed. There are different manners in which SEFF can present the files to the user. The first way is in List mode. This can be thought of as the main interface. Newly created SEFFs, SEFFs in search results, and SEFFs being browsed on a Signature's "website equivalent" are all presented in lists that can be: (1) viewed by either SEFF icon or Signature icon, (2) collapsed (no icon) or expanded (icon showing), (3) sorted by name or date, and (4) reordered, selected and dismissed using simple tap|click|swipe gestures. FIG. 24 is a screen capture showing three SEFFs being viewed in List mode (a Location file followed by an Access file followed by an Image file).

Play (Open) Mode

Figure 25:
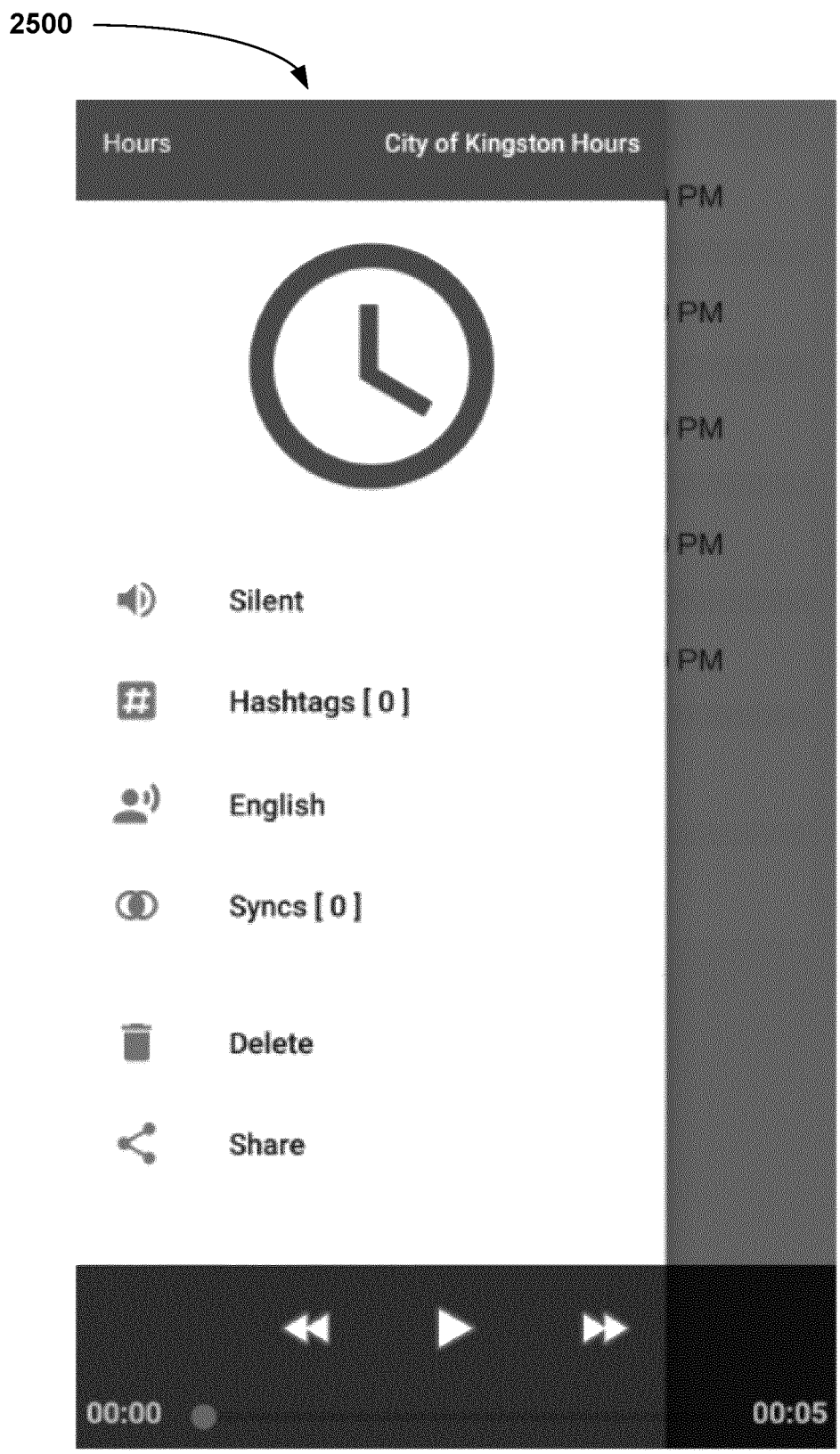
FIG. 25 illustrates an example of a SEFF in play mode, in accordance with some embodiments.

FIG. 25 illustrates an example of a SEFF in play mode 2500, in accordance with some embodiments. Because SEFFs have a duration, a media controller is provided during Play to enable users to move forward or back within the audio, and to see the Play position (time) relative to the SEFF's duration (duratn).

Table 6 shows a list of Handlers by SEFF filetype for some SEFF filetypes:

TABLE 6

Handlers for some SEFF File types

| File type | Play (Open) Handler |
|---|---|
| Access | SEFF |
| Application | Third party. Runs Application. |
| Contact | Third party. Uses standard ".vcf" file. |
| Event | Third party. Uses standard .ics file with Calendar app. |
| File | Third party. Opens mime-type-determined app (e.g. PowerPoint) |
| Hours | SEFF |
| Image | SEFF |
| Interests | SEFF |
| Link | SEFF |
| List | SEFF |
| Location | SEFF |
| Message | SEFF |
| Music | SEFF |
| Product | SEFF |
| Script | SEFF |
| Search | SEFF |
| Service | SEFF |
| Signature | SEFF |
| Slideshow | SEFF |
| Story | SEFF |
| Stream | SEFF |
| Task | SEFF |
| Title | SEFF |
| Tracker | SEFF |
| Video | SEFF |

FIG. 26A illustrates an example of a location view in SEFF, in accordance with some embodiments.—A Location file playing full-screen, handled by SEFF, after the user has selected map mode while playing a Location file. Other Location views show Address (if applicable), street view (if applicable) and Viewport (Bounding Box). FIG. 26B illustrates an example of a Word document opened in mime-type-determined app using SEFF, in accordance with some embodiments.

Receiver Mode

In some embodiments, SEFFs can be made by opening the SEFF application and then selecting "New" to make a new SEFF. But the SEFF program can also receive any filetype, even if the SEFF application is not running, and convert that file into SEFF format automatically. For example, in the screen captures in FIGS. 27A to 27C, a user has created a Calendar event. Before SEFF the user might have shared the event using email or text messaging. This would have involved entering a lot of names and addresses and phone numbers. Instead of doing that, the user shares the file with SEFF. SEFF, if not already open, starts up, in this case with a newly created SEFF Event file read from the mime-type file.

Figures 27A, 27B, 27C:
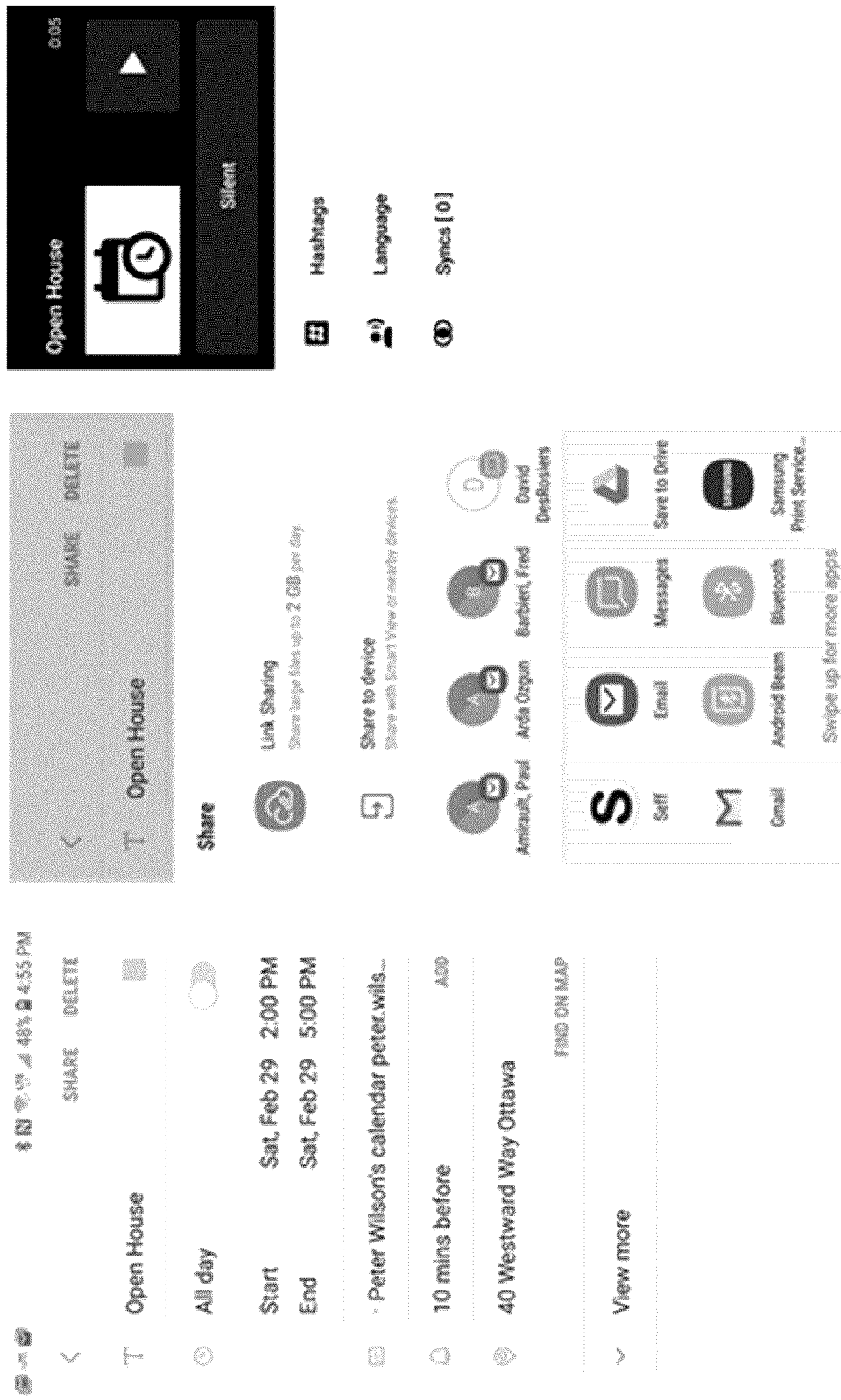
FIGS. 27A to 27C illustrate in screen captures, an example of generating a SEFF event file, in accordance with some embodiments.

Example 1: Sharing a calendar file with SEFF (Making a SEFF Event file). FIGS. 27A to 27C illustrate in screen captures, an example of generating a SEFF event file, in accordance with some embodiments.

See FIG. 27A—User clicks standard "Share" button in calendar application outside SEFF, FIG. 27B—SEFF is a share option for all filetypes, and FIG. 27C—SEFF auto-generates a SEFF Event file and opens it in the Player/Editor utility where it is ready to receive all of the powerful functionality of SEFF, including audio narration, synchs, hashtags, tap-click-swipe-to-share, inclusion in stories and slideshows, etc.

Figure 28C:
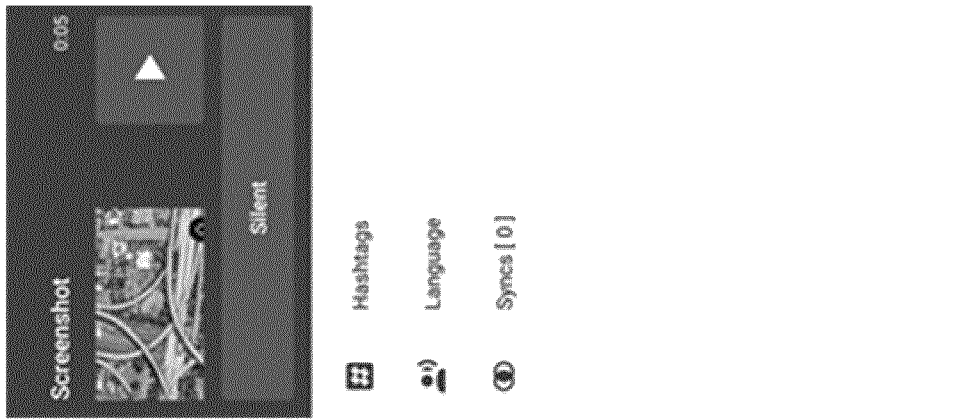
FIGS. 28A to 28C illustrate in screen captures, an example of generating a sketchable SEFF image file, in accordance with some embodiments.
Figure 28B:
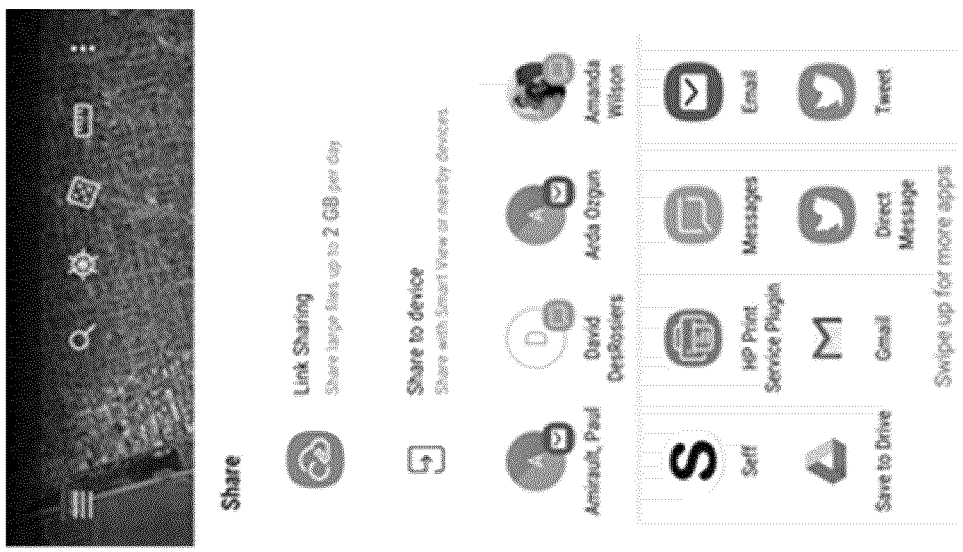
Figure 28A:
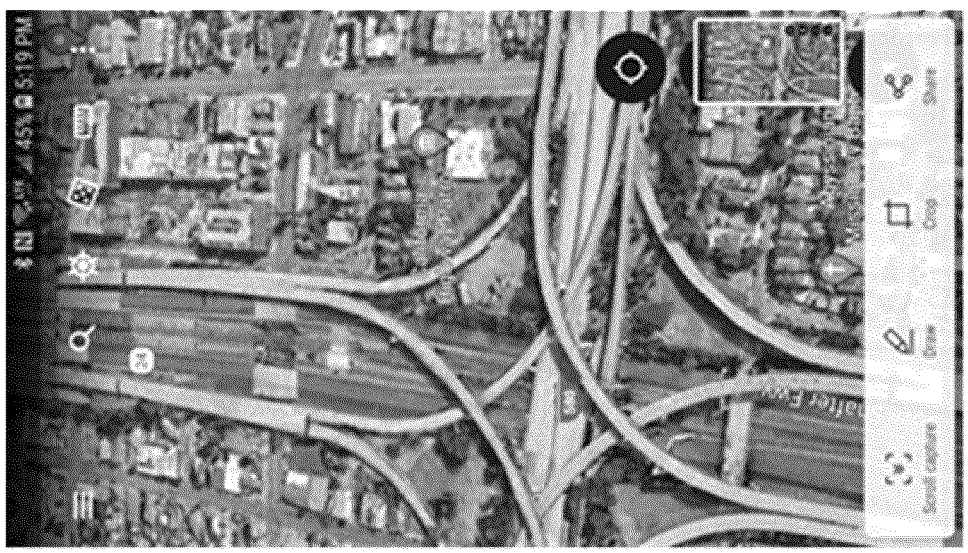

Example 2: Sharing a screen capture with SEFF (Making a sketchable SEFF Image file). FIGS. 28A to 28C illustrate in screen captures, an example of generating a sketchable SEFF image file, in accordance with some embodiments.

See FIG. 28A—User clicks standard "Share" button after generating a screen capture of any content, FIG. 28B—SEFF is a share option for all filetypes, and FIG. 28C—SEFF auto-generates a sketchable SEFF Image file and opens it in the Player/Editor utility where it is ready to receive all of the powerful functionality of SEFF, including audio narration, synchs, hashtags, tap-click-swipe-to-share, inclusion in stories and slideshows, etc.

This screen-capture-to-image-sketcher functionality is especially powerful. It enables, for example, a police officer to narrate a sketch on a map generated in another app, on a street view, or photo, or document, or any other content.

Sharing any geospatial file (for example a ".kml" point) with SEFF results in the auto-generation of a SEFF Location file. From the relatively meaningless latitude and longitude in the ".kml" file, the SEFF Location file will include the point's street address, a map with viewport (bounding box), and indoor and outdoor street views, if available at that location.

Story and Slideshow Modes

When a user plays a SEFF that is of filetype "Story" or filetype "Slideshow", the result is a serialized multimedia presentation. Although the logic behind the file structures of Stories and Slideshows is slightly different, the presentation of the content to the user is very similar.

In order to play Stories, an event listener is placed on SEFF audio files and native files that can have duration of their own (e.g. music, video). The on-completion listener is removed when the audio (or video) ends and is then applied to the next audio (or video) file in the stack. This is repeated until the last SEFF has been played. Users have the option of watching Stories with or without audio-introduction previews. Watching a Story with the audio-introduction previews option selected will, for example, open a Video and play that SEFF's audio (for example: "This is a video of a seaplane being salvaged in Lake St. Louis, at Beaconsfield, Quebec, in 1964"), after which the video itself plays, after which a (different SEFF) narrated map of the area plays, followed by some (different SEFFs) narrated photos, followed by some (different SEFFs) narrated sketches, etc.

When playing a Slideshow file, an event listener is placed on a single background audio file. This listener compares the progress of the audio with a lookup table of start times for the presentation of SEFFs (typically images, locations, and other content that does not have its own duration or audio).

"Website Equivalent" View

All content posted (i.e. made publicly available) via the SEFF server can be browsed in a view that resembles a website. Buttons for each of the many SEFF filetypes are presented in a horizontal scroll view across the top. If no content of a certain type has been posted, that button is not presented. This means that a SEFF user has an automatically generated website-like interface that adjusts to the content on it at any given time. Full SEFF W5L search is available. FIG. 29 illustrates an example of a website equivalent view in SEFF, in accordance with some embodiments.

SEFF Interface and Infrastructure

Figure 30:
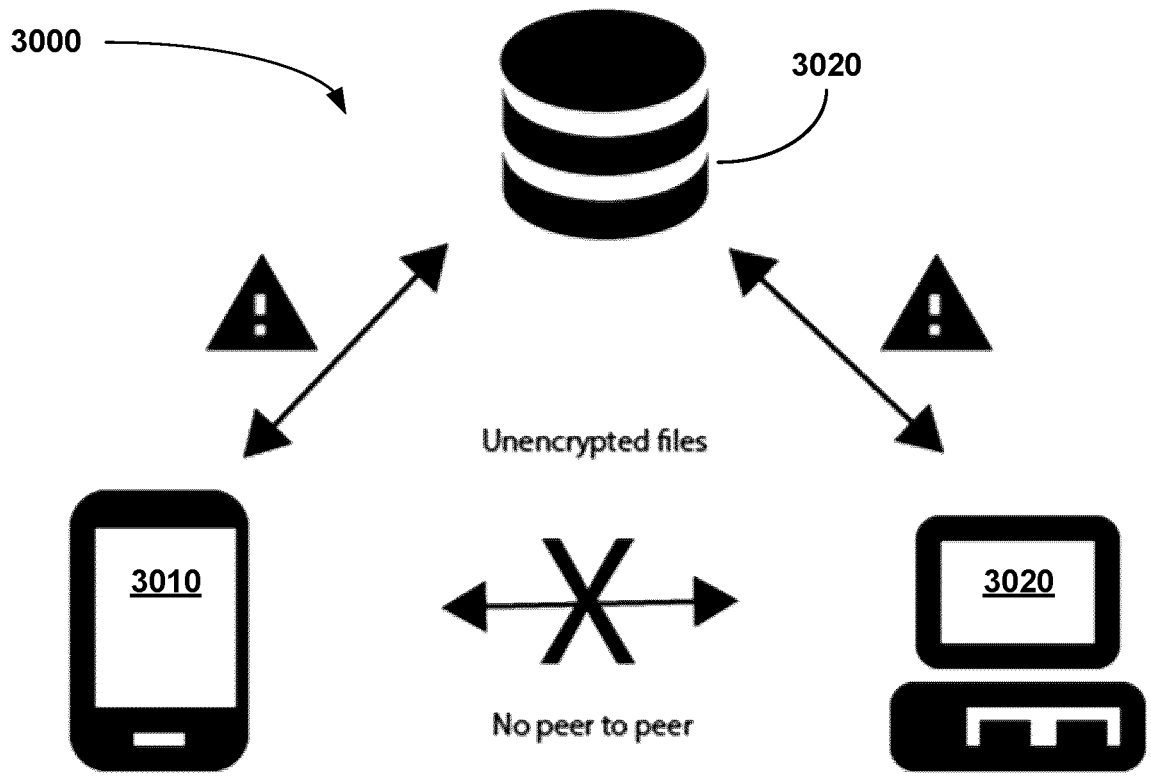
FIG. 30 illustrates, in a component diagram, an example of a file sharing architecture.

FIG. 30 illustrates, in a component diagram, an example of a file sharing architecture 3000. The architecture 3000 includes a digital information source device 3010, a database 3020 and a digital information recipient device 3030. The devices 3010 and 3030 communicate with the database 3020. The digital information source device 3010 populates the database 3020 with files comprising data. The content recipient device 3030 obtains the files from the database 3020. There is no peer-to-peer communication in this example file-sharing architecture 3000. The devices 3010 and 3030 may comprise any electronic devices that include communication capabilities, such as smartphones, tablets, laptop and/or desktop computers. In this prior art example, all personal information is located in one repository (e.g. database 3020). If the repository is hacked, then all personal information is affected. The owner of the repository determines where the data is stored, and the provider (sometimes owner) of the personal information may not have a say.

Figure 31:
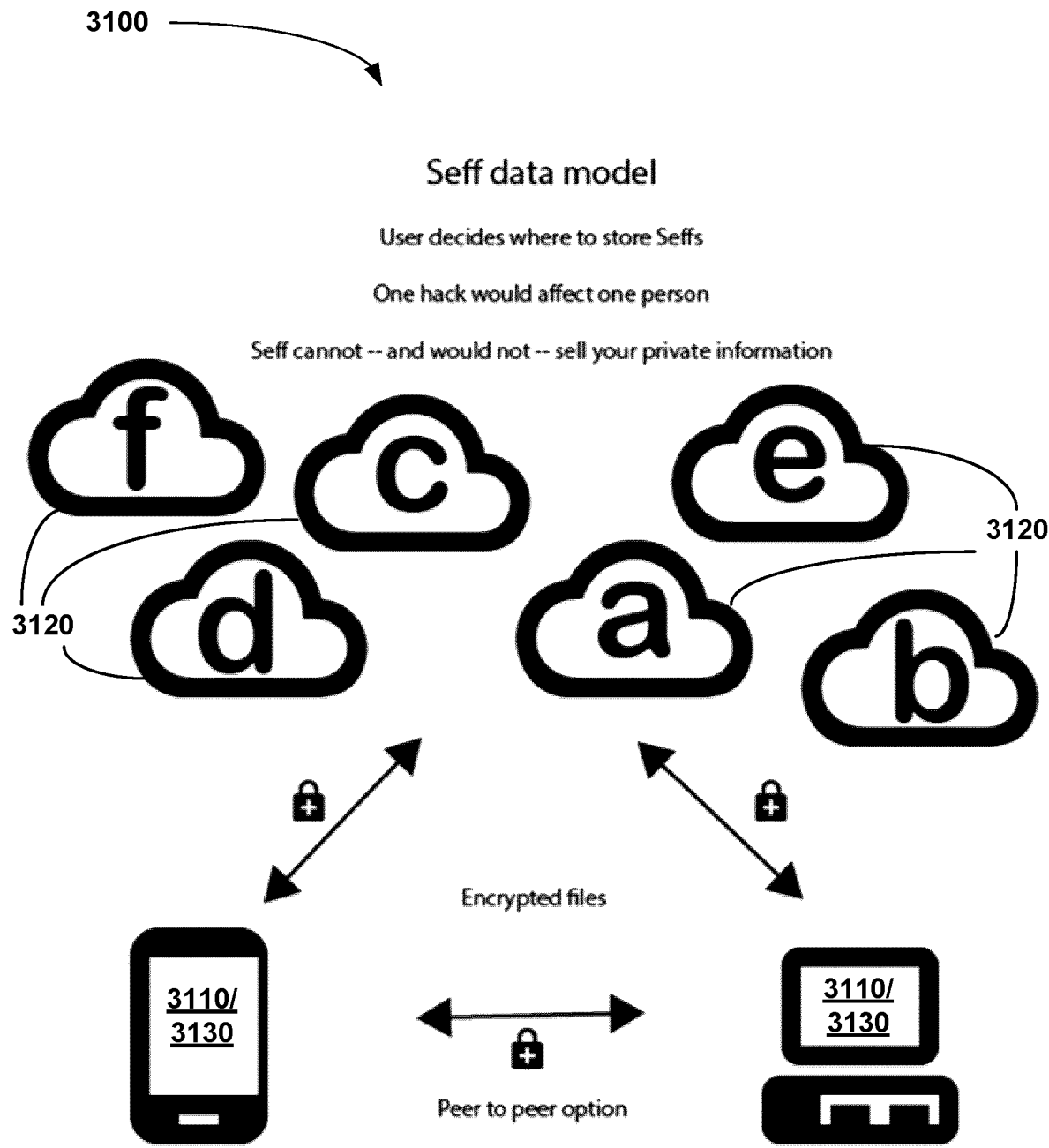
FIG. 31 illustrates, in component diagram, another example of a file-sharing architecture, in accordance with some embodiments.
Figures 32A, 32B, 32C, 32D, 32E, 32F:
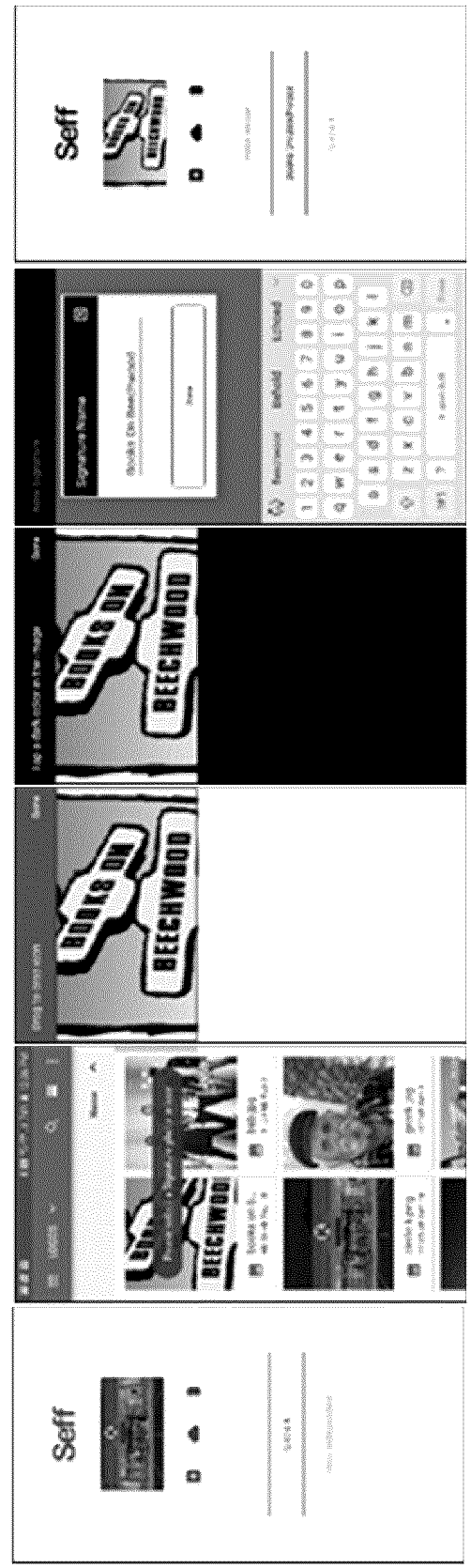
FIGS. 32A to 32F illustrate an example of generating a SEFF Signature, in accordance with some embodiments.

FIG. 31 illustrates, in component diagram, another example of a file-sharing architecture 3100, in accordance with some embodiments. The architecture 3100 includes at least one user device 3110, and at least one data repository 3120. The at least one user device 3100 may include one or more digital information source devices 3110, one or more digital information recipient devices 3130 and/or one or more devices that can be both digital information sources and recipients. The at least one data repository 3120 may include one or more databases or other repositories located at one or more cloud storage locations. Each user device 3110 may send files (including encrypted or encoded files) to another user device 3110, or store the files in a data repository 3120 that can be accessed by another user device 3110. The files comprise data and metadata that can be rendered into human consumable information. In some embodiments, source user devices 3110 may choose a data repository 3120 in which to store the data files accessible to user devices 3110. As such, one hack would affect only one person. In some embodiments, the files are not stored by the source device; rather the files are generated and sent to recipient devices for processing and/or storage.

For the purpose of this discussion "managing information" is defined to include the exercises of information generation, description, recording (saving), formatting, copying, deleting, synchronizing, serializing, temporalizing, ordering (sorting), combining, separating, versioning, other means of organizing, searching, presenting, sharing, playing, submitting, and otherwise manipulating.

Under the prior art, digital information is integrated and contextualized in three main ways: (1) by the creation of web pages for general (public) consumption, (2) by sending emails or other message types to one or more individuals, and (3) by using one of millions of information-type-limited applications. For clarity, reference is made to the contextualizing of information using html (web pages) as the "posting" of information, as distinct from the "sharing" of information via one-to-one (peer-to-peer) or one-to-many emails or other messaging methods, and apps.

Under the prior art, posting contextualized information requires access to: (1) software to design web pages, (2) a dedicated http web server, and (3) a program (browser) to present the information to users. The creation of even a simple web page is a time-consuming and expensive process reserved for businesses and organizations who want to advertise their products and services and engage with customers in a one-size-fits-all manner (e.g. book a flight using an airline's custom-built website).

Under the prior art, sharing information via email is an easier and more customizable method than designing web pages. But putting together an email like the sample in Table 7 below is still time consuming. Context is provided by written information such as "I have attached an overview of the program," and instructions such as "I ask you to kindly fill out this Google Marketing Materials Form."

Under the prior art, information is shared in multiple ways, such as in written text messages, using file attachments, by cutting and pasting links to web pages, and by typing out street addresses, telephone numbers and email addresses.

Under the prior art, none of this digital information is inter-related in any way other than in the mind of the person who prepared it in the chosen format. Removing any element and re-using it removes all context from that element. Re-ordering content requires starting a new email and cutting and pasting links, attaching files and writing out explanatory text in a different order. The recipient has to remember where he or she saw, for example, the address listed in the signature block at the bottom of this email.

Consider the multiple information types and management methods used in the email shown in Table 7 below.

TABLE 7

Pre-Accelerator C5
Program Brochure.p

Access Card
Registration Form.xl

Hello Peter,
I'm very happy to share that SEFF Technology has been accepted into the Pre-Accelerator Program! I have
attached an overview of the program, so you can see the exciting 10 weeks we have in store.
In terms of next steps, I ask that you please finalize your registration and pay the $250 program fee
through this link. Once this is complete, I will send you calendar invitations to all the sessions.
Additionally, I have a few more action items:
Marketing Materials We will be creating a company directory of information about the companies in the cohort! Therefore, I
ask you to kindly fill out this Google Marketing Materials Form.
Drop-In Pass As part of the Pre-Accelerator Program, you get free drop-in space at Office Yards which includes
building access (from 8:30 AM to 5:00 PM), meeting rooms, free coffee and much more. We have
enough passes for one card per company. Please fill out the attached Access Card Registration form and
send it back to me.
Food Allergies/Intolerances I will be ordering snacks for the kick-off event. Please let me know if you have any allergies or dietary
intolerances.
Therefore, in summary, here are action items:
Pay the $250 program fee
Fill out the Marketing Materials Google Form
Send me your Access Card Form
Dietary allergies/intolerances
Because the program kickoff is less than a week away, it is important that we process these action items
by Monday, June 29th. Please let me know if you have any questions.
I look forward to meeting you,
Nick
Nick Person
Executive Director
Accelerator Program
m: 613-555-1212
a: 7 Main Junction Road, Ottawa, ON K1Y 2M5
e: person@mockaccelerator.ca
w: www.mockaccelerator.ca SEFF standardizes, disintegrates, right-sizes, and frees up for easy re-purposing all of the information presented above.

In place of the typed-out signature block above, SEFF uses an easy-to-create Signature filetype. In some embodiments, Signatures, like any SEFF, may include an audio element, a visual element, and a data/metadata JSON element.

FIGS. 32A to 32F illustrate an example of generating a SEFF signature, in accordance with some embodiments. Creating a Signature is a simple process that can be done in seconds: (1) select an icon with a simple tap|click|swipe, (2) crop the icon by dragging a rectangle, (3) select a colour with a tap|click|swipe, (4) name the Signature. (See FIG. 32A—Splash screen before new Signature, FIG. 32B—Step 1: Select icon, FIG. 32C—Step 2: Drag to crop, FIG. 32D—Step 3: Tap colour, FIG. 32E—Step 4: Name, and FIG. 32F—Splash screen with new Signature)

In some embodiments, behind the scenes, SEFF:
1. generated a unique id (6780270582404108125)
2. created a new SEFF object with default values
3. set the SEFF object's sftype value to "Signature"
4. set the SEFF object's seffid value to "6780270582404108125"
5. set the SEFF object's signid value to "6780270582404108125"
6. created a folder named "6780270582404108125"
7. called the device's native file finder (specifying and filtering by mime-type "image")
8. handled the user's selection (tap|click|swipe) by copying the selected image into the newly created folder
9. closed the file selector
10. called the SEFF routine "Crop Icon" which presents selected image and cropping rectangle
11. created a bitmap from the image file
12. loaded the bitmap into the image viewer component of the icon cropper 13. accepted the "Done" input from the user
14. closed the image cropper
15. cropped the large icon into the standard SEFF size defined by the rectangle position set by the user
16. saved the icon as 6780270582404108125.icon in the 6780270582404108125 folder
17. generated a bitmap from the 6780270582404108125 jpeg file
18. called the SEFF routine "Select Color" which presents icon
19. created a bitmap from the icon file
20. loaded the bitmap (icon) into the colour-selector image viewer component
21. handled the user's colour selection (tap|click|swipe) by recording the integer value of the tapped pixel
22. set the colour value on the SEFF object to "−16777216"
23. set the colour of the interface (i.e. all toolbars, dialogs, etc.) to the Signature's new colour
24. presented the SEFF "Name Dialog"
25. accepted the user's "Done" input
26. error-checked and accepted the Signature name entered by the user
27. if error-check failed, return to 24
28. set the SEFF object's sfname value to the name
29. set the SEFF object's signid value to the Signature's ID
30. generated a silent 5-second audio file named 6780270582404108125.mp3
31. saved 6780270582404108125.mp3 in the 6780270582404108125 folder
32. set the audnme value to "Silent"
33. set the audext value to ".mp3"
34. read the duration of the audio file and set the duratn value to 5256 (milliseconds)
35. set the Boolean silent value to 'true'
36. created a new ".seff" (JSON) file named 6780270582404108125.seff in folder 6780270582404108125
37. set the SEFF's langge value to the device default language (in this example, "English")
38. set the SEFF's orient value to "1" (portrait)
39. used the device's clock to generate a GMT epoch timestamp in milliseconds (1575394763534)
40. set the SEFF's verson value to 1575394763534
41. called the SEFF "JSON Writer" utility to create the Signature's metadata
42. closed the "Name Dialog" and sent an "activity complete" message to the splash page
43. read the metadata
44. created a new SEFF object using SEFF's "JSON Reader" utility
45. added the new SEFF object to the Array list of SEFF objects
46. loaded the Signature's icon into the splash page's image viewer
47. refreshed the image viewer
48. added the Signature name to the selection list
49. refreshed the selection list
50. added the Signature's ID to an array of such IDs in the device's user preferences file On creation, the new Signature SEFF filetype does not comprise intrinsic data or synchs.

FIG. 33 illustrates an example of editing a SEFF Signature, in accordance with some embodiments. Synchs are added through the interface shown in FIG. 33.

The Signature's (SEFF's) ".seff" file's synchs JSON array now comprises the three newly selected IDs, one for each of the Seff files tapped on the interface above.

Information in the sfdata JSON object may be customized by SEFF filetype. For example, the City of Kingston's Signature file comprises a synch to the City's Business Hours SEFF file. That Business Hours SEFF file's sfdata component may include:

sfdata":{"nameValuePairs":{"hours":{"fridayCloseHour":17,"fridayCloseMinute":0,"fridayOpenHour": 9,"fridayOpenMinute":0,"mondayCloseHour":17, "mondayCloseMinute":0,"mondayOpenHour":9, "mondayOpenMinute":0,"saturdayCloseHour":−2, "saturdayCloseMinute":−2,"saturdayOpenHour":−2, "saturdayOpenMinute":−2,"sundayCloseHour":−2, "sundayCloseMinute":−2,"sundayOpenHour":−2, "sundayOpenMinute":−2,"thursdayCloseHour":17, "thursdayCloseMinute":0,"thursdayOpenHour":9, "thursdayOpenMinute":0,"timeZoneId":"EDT", "tuesdayCloseHour":17,"tuesdayCloseMinute":0, "tuesdayOpenHour":9, "tuesdayOpenMinute":0, "wednesdayCloseHour":17,"wednesdayCloseMinute": 0,"wednesdayOpenHour":9,"wednesdayOpenMinute": 0}}}

Audio

Figure 34A:
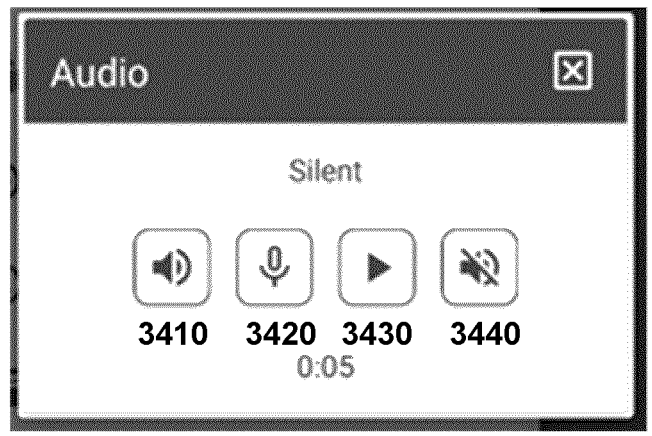
FIGS. 34A to 34C illustrate examples of generating and selecting audio files using SEFF, in accordance with some embodiments.
Figure 34B:
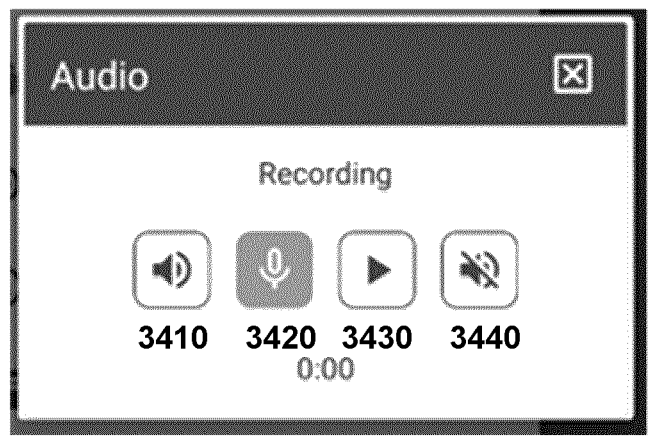
Figure 34C:
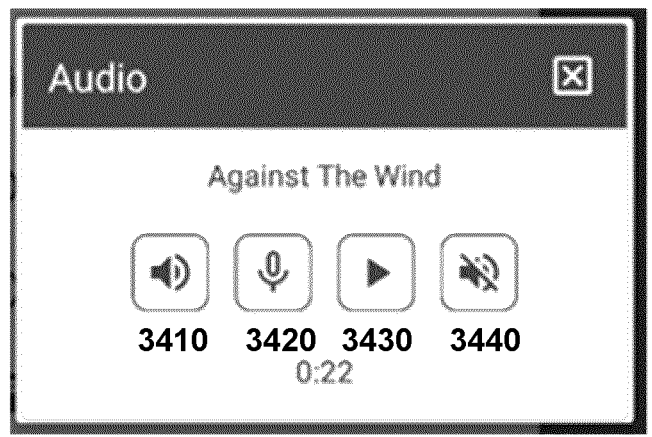

In some embodiments, SEFF files have an audio component that is either five seconds of silence, narrated at the time the file is created or edited, or associated with the SEFF by using an existing audio file. FIGS. 34A to 34C illustrate an example of generating an audio file usign SEFF, in accordance with some embodiments. Clicking Button 1 3410 opens a dialog from which an existing audio file can be selected. This is named with the Unique Id of the SEFF and stored in the SEFF folder. Clicking Button 2 3420 activates the microphone. The resulting file is named with the Unique Id of the SEFF and stored in the SEFF folder. Clicking Button 3 3430 plays the current audio. Clicking Button 4 3440 generates a silent audio file named with the Unique Id of the SEFF and stored in the SEFF Folder. In all cases when audio is changed, new variables are written to the audext (audio file extension), audnme (audio name), duratn (duration) and silent (Boolean: is silent?) entries in the metadata.

Playing Files

Figure 35:
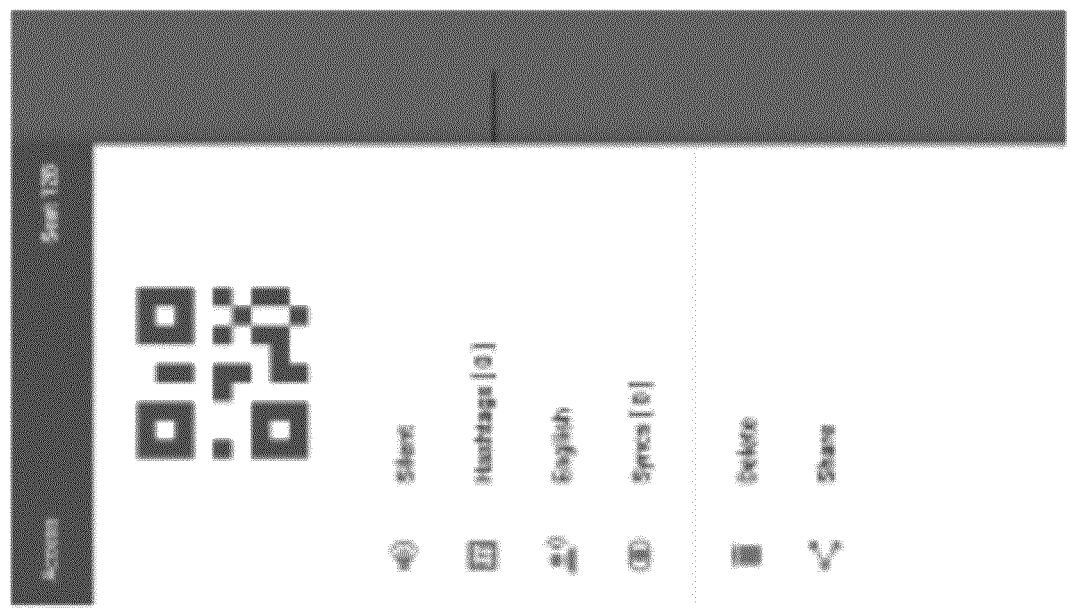
FIG. 35 illustrates an example of a SEFF user interface, in accordance with some embodiments.

Simply tapping a SEFF icon in any view opens it in the Play/Edit activity. The Seff can be edited if the Signature ID of the active user matches the Signature ID in the Seff. FIG. 35 illustrates an example of a SEFF user interface, in accordance with some embodiments.

Tapping the Play button plays the audio simultaneously with the visual representation (e.g. a Location or Image).

In some embodiments, SEFF files are played for the duration of their audio. The Editor/Player can be paused to enable the user to, for example, look around using a street view, submit a form, run a script and otherwise interact with the content.

When a SEFF file is opened, the player reads the SEFF's metadata. When it comes to the 'synchs' field, the loader/player iterates through the unique IDs of the synched SEFFs, builds a SEFF object for each, and stores all synched SEFF objects in an Array. In this way, the Synched SEFFs are all ready to be played with a single click.

The code iterates though the Synched SEFF IDs, calls a routine to build a SEFF object for each Synched SEFF, and stores the built SEFFs in an array for one-click access and playing.

Internally, SEFF files are played in a bespoke player. The player is part of the SEFF technology. The player may be written in different computer programming languages for all common devices (e.g. Mac, PC, Android, iPhone) on which SEFF runs. The dedicated SEFF player plays multimedia content (videos, maps, documents) within it using custom-written code calling APIs.

Externally, just as an email is opened in an email program, opening a related file—such as a PDF, Word document, image or video that is attached to a SEFF file—will invoke existing applications on the user's device to play the specific type of file. Thus, SEFF attachments may invoke existing applications while SEFF synchs are opened in the SEFF player.

View Options

Because the SEFF object has references to icons for both the SEFF itself (e.g. Location) and its Signature, multiple view options are available at the tap|click|swipe of a button. And because the Signature variables can be synched with the SEFF object, phone calls, directions, business hours, and other variables are never more than one tap|click|swipe away.

Figure 37B:
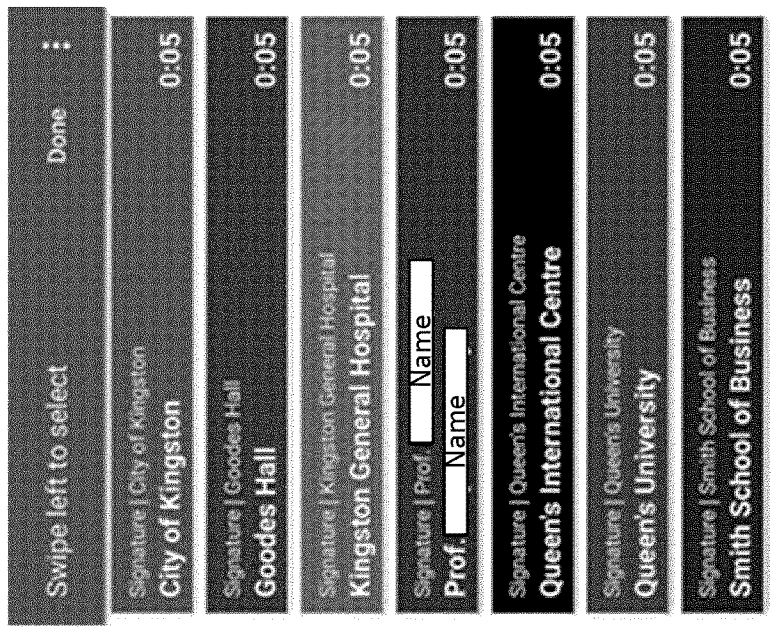
FIGS. 37A and 37B illustrate an example of a toggle collapse view of SEFFs, in accordance with some embodiments.
Figure 37A:
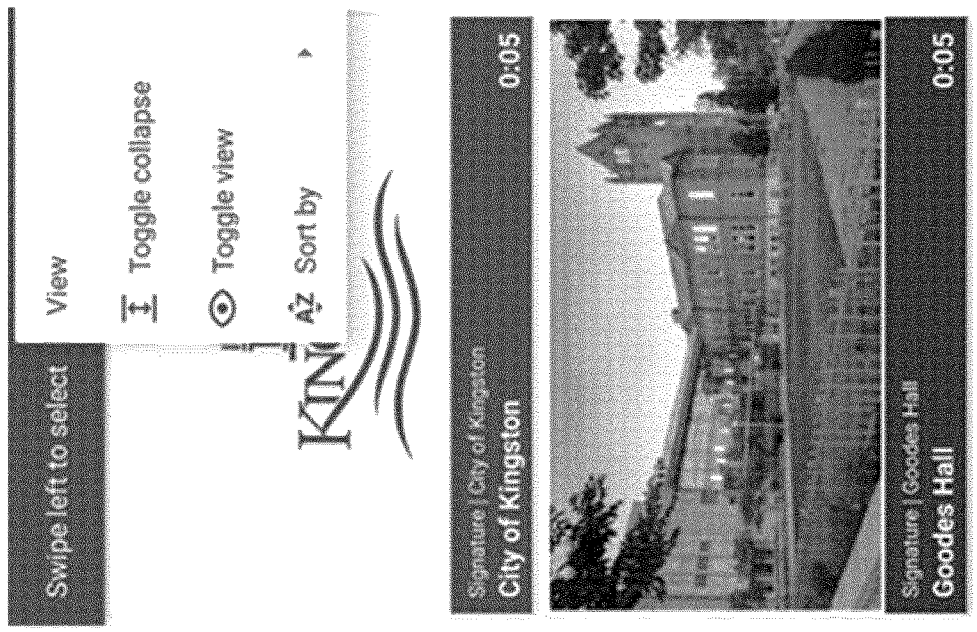

SEFFs can be viewed in either Expanded mode or Collapsed mode, toggled with the "Toggle Collapse" button. They can also be viewed either by their Signature icon or SEFF Icon. Finally, SEFFs can be sorted by SEFF file name, SEFF filetype, or Signature name. FIGS. 37A and 37B illustrate an example of a toggle collapse view of a SEFF, in accordance with some embodiments.

SEFF understands ISO 639 standardized nomenclature to classify languages. For example: en_ [English], en_001 [English (World)], en_150 [English (Europe)], en_AG [English (Antigua and Barbuda)], en_AI [English (Anguilla)], en_AS [English (American Samoa)], en_AU [English (Australia)], en_BB [English (Barbados)], en_BE [English (Belgium)], en_BM [English (Bermuda)], en_BS [English (Bahamas)], en_BW [English (Botswana)], en_BZ [English (Belize)] and en_CA [English (Canada)] are all understood to be "English" whereas fr_ [French], fr_BE [French (Belgium)], fr_BF [French (Burkina Faso)], fr_BI [French (Burundi)], fr_BJ [French (Benin)], fr_BL [French (Saint Barthelemy)], and fr_CA [French (Canada)] are all understood to be "French".

In some embodiments, a SEFF object and its metadata include a reference to the language used when the SEFF file was created or edited (most often the default language for the user's locale).

Figure 36:
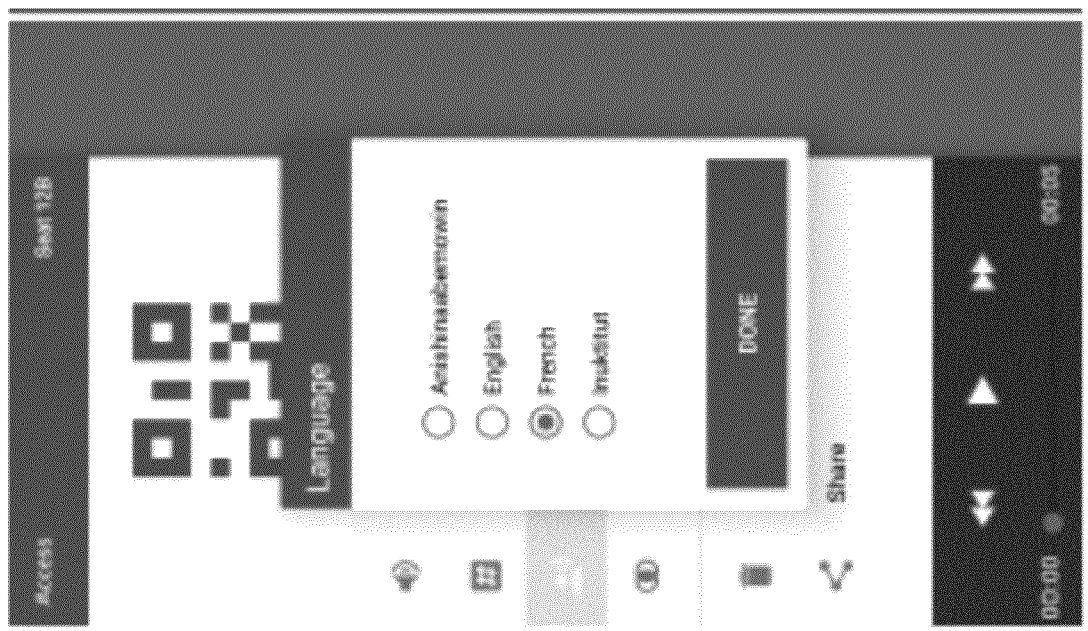
FIG. 36 illustrates an example of editing a language in SEFF, in accordance with some embodiments.

The language can be edited any time by tapping the language button and selecting a new language. FIG. 36 illustrates an example of editing a language in SEFF, in accordance with some embodiments.

For example, a user may have his or her default language set to "English" but may have narrated the SEFF in French, so would use the dropdown list of languages to select "French" which then changes the "language" variable on the object (langge) from "English" to "French".

In the example of FIG. 36, the language in use is "English". Tapping the button and setting it to, for example, "French" will update the value in the SEFF object and, subsequently, the metadata. It will also open the appropriate (French) keyboard, as required.

SEFF is a technology that gives every user the opportunity to create something more powerful and functional than a web page in mere seconds, and then add spatial and temporal metadata to it. In so doing, a user can effectively place information on the surface of the Earth (at a specific location defined as a point, line or area) and then optionally make it available only during an event. The ability to easily place content in any language has huge social benefits. In one use-case scenario, the Ottawa General Hospital could place SEFFs on its campus in spoken Inuktitut for the benefit of its patients from Nunavut.

In addition to the full W5L search described elsewhere, users can search for files by language, including Indigenous languages. Besides the social benefits described above, imagine the fun of standing at the base of the Eiffel tower and listening to SEFFs left there by Inuktitut speakers. SEFF's search capabilities are described as "W5L," because language is a useful search, selection and sort criterion.

Search

From a user's prospective, there are three ways to find information on the internet today: (1) search a domain-specific website like Amazon, British Airways, or Harvard University, (2) use a web-wide search-tool like Google to find text or images embedded in html, or (3) use a search "aggregator" like Trivago or Expedia to search multiple databases via their websites.

Some limitations of domain-specific websites include that users can only find very specific types of information, in a single database (owned by that company), and the search terms that can be applied are weak because the scope of information being returned is intentionally very restricted.

```
{"audext":".mp3",
"audnme":"Silent",
"colour":-9473157,
"duratn":5256,
"hshtgs":{"values":[ ]},
"langge":"English",           << --- Language variable is stored here
"orient":0,
"seffid":"3640593112569038708",
"sfdata":{"nameValuePairs":{ }},
"sfname":"Florida 1958",
"sftype":"Signature",
"signid":"3640593112569038708",
"silent":true,
"subtyp":"Signature",
"synchs":{"values":[ ]},
"verson": 1591914761668}
```

Limitations of web-wide search "engines" like Google include that they lack spatial and temporal awareness, don't understand filetypes, and are not multifaceted. Their spatial search algorithms are proxies for real geo-search and time is typically treated with a minimum granularity of one day, and is really not "understood" at all. Search aggregator websites are a business model that does not favor either small bricks-and-mortar businesses, or consumers, due to inherent conflicts of interest.

Figure 38:
FIG. 38 illustrates an example of a UI for a SEFF search, in accordance with some embodiments.

SEFF is unique in providing W5L search. It also brings SQL-like (but far more powerful) search functionality to information posted outside of proprietary domains. FIG. 38 illustrates an example of a UI for a SEFF search, in accordance with some embodiments. As with everything in the SEFF protocol, "Search" is a SEFF filetype and, as a result, searches can be narrated, saved for later use, included in stories, posted, and shared.

Developed by IBM in the early 1970s, SQL is a domain-specific language used in programming and designed for managing data held in a relational database management system (RDBMS).

SQL enables users to find, for example, British Airways flights from Sydney into Heathrow on a given day. In this example, three relational fields of data are being queried simultaneously (Departure Airport, Arrival Airport, Date) from a domain-specific (British Airways) database.

SQL may be more powerful than Google for finding specific goods or services, hence the usual two-search approach by which Google directs a user to the domain-specific database from which he or she can then extract the desired information. (On the internet today, this is done using SQL queries generated by JavaScript within html pages.) But what happens when a user wants to find flights on any of a dozen airlines or stay at any hotel in a city? The exercise of searching multiple websites to find the best hotel is time-consuming and frustrating. Companies like Trivago and Expedia (so-called "aggregators") have built successful businesses around consolidating these searches. But the conflict of interest inherent in their business models means hotels are not on an even footing and consumers are not necessarily getting the best availability or price. The advice to consumers on "smartertravel.com" is:

If you're trying to figure out how best to search for cheap hotels: First, scan this quick list of the best hotel search sites, in no particular order. Then, scroll down to read in-depth summaries of each: Booking.com, Kayak, Priceline, Hotels.com, HotelsCombined, Expedia (which owns Travelocity and Orbitz), Agoda, TripAdvisor, Trivago, Google.

It would be easier to just search the hotel chain websites themselves. Aside from the frustration and inefficiency of following the advice given by smartertravel.com, the consumer is still not protected from the conflict of interest inherent in the aggregators' business model. "In August 2016, Buckeye Tree Lodge and Sequoia Village Inn, LLC filed a class-action lawsuit in California accusing the company [Trivago] and its partners of 'brazen deceit' by coordinating with Internet search engines and social media institutions to return false results on lodging entities in favor of those affiliated with their websites, in violation of the Lanham Act."

Search is broken on the Internet. The solution is SQL-like functionality applied to content posted outside of specific domains. SEFF solves this problem by bringing much more than the power of SQL to everything posted on it. The smallest Airbnb loft is on the same footing as the Athens Hilton and the consumer can find their desired accommodation using easy-to-apply W5L search terms that are far more powerful than the best SQL routines available on domain-specific sites.

Who

Problem: Finding information on the Internet that was posted by a particular individual or corporation is usually a multi-step process with frustrating results. The first step is often to enter a personal or corporate name into Google and then see what websites it points to. Assume you want to search for Word documents posted by Henry Car. Because "Henry" and "Car" are just words to Google, you're off to a bad start. The Google search for "Henry Car" returns URLs for 360-million irrelevant web pages containing the words "Henry" and/or "Car".

Solution: Because SEFF is all about metadata, the SEFF search for "Henry Car" returns a full Signature, based on a unique ID, with an icon and multiple metadata fields that enable one-click communication, metadata such as business hours, directions, etc. Unlike Google, SEFF understands the difference between a Signature and two words.

What

Problem: Google is not a relational database so it treats all information as uncontextualized text. Domain-specific websites that employ SQL queries are more focused, but the user needs to access multiple websites individually to gain this search power, or use an "aggregator" website and be subjected to the conflicts of interest and failed search results inherent in their business model.

Solution: The SEFF file format is used to represent all information accessible on the internet as well as every method of accessing that information. It is even possible to search for a search using SEFF. It's also possible to search for an Event, Location, an Image (with or without a sketch), a Video, a JavaScript file that accesses a database, etc. In short, SEFF understands What you are looking for and only returns those filetypes. Scan a barcode and SEFF understands that you're looking for a product.

Where

Problem: Google is lost when it comes to locating things on planet Earth. Domain-specific SQL server databases aren't much better. This is because Google and many SQL databases use text as a proxy for location. For example, Google does not understand the difference between Athens (Georgia), Athens (Ontario), and Athens (Greece) and the United Airlines Website only understands the difference if someone has entered different airport codes for each of the three locations.

Solution: SEFF is smarter than that. SEFF uses latitude and longitude instead of text proxies for locations. SEFF uses a unique two-stage viewport (bounding box)/polygon search method to quickly find locations within user-defined Location files. SEFF can search within a specified distance of any location on Earth, including the user's current location. Finally, SEFF can search for information of any type within any combination of areas (e.g. find houses in Westmount OR Beaconsfield or find porta-potties beside Soccer Field 1 or Soccer Field 5 at a recreation complex).

Figure 39B:
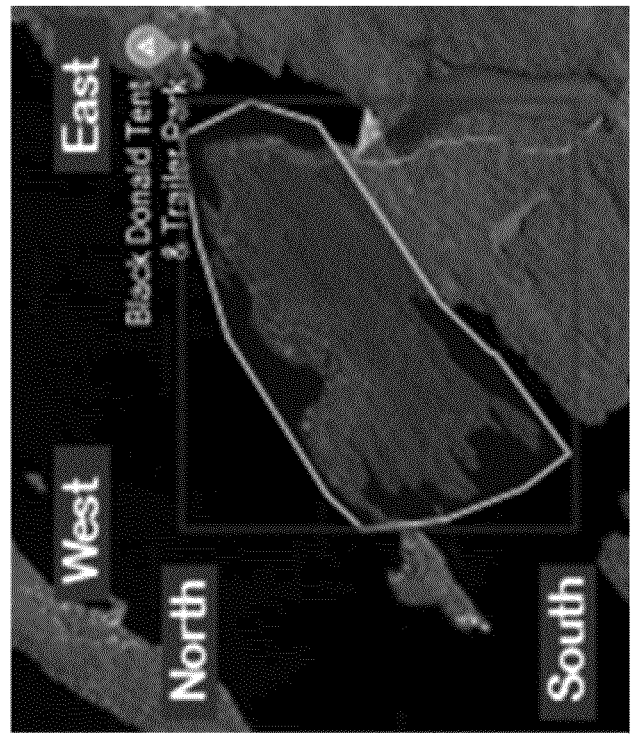
FIGS. 39A and 39B illustrate, in screen captures, examples of SEFF location files, in accordance with some embodiments.
Figure 39A:
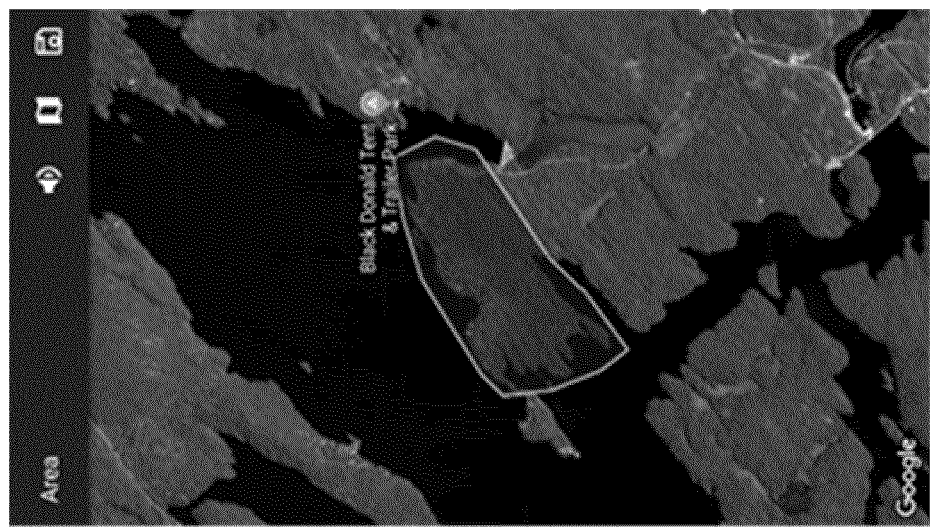

FIGS. 39A and 39B illustrate, in screen captures, examples of SEFF location files, in accordance with some embodiments.

Example: Try finding "properties affected by Black Donald Lake Forest Fire" using Google or any domain-specific website. Neither understands the area covered by the "Black Donald Lake Forest Fire," but SEFF does. In the screen capture of FIGS. 39A and 39B, the Ontario Ministry of Natural Resources may create a SEFF Location file, called "Black Donald Lake Forest Fire," outlining the extent of a forest fire on the shore of the lake. (See FIG. 39A)

Location Files: The SEFF Location filetype enables users to define any shape on the surface of the Earth within which to search. Beyond search, these Location files can also be used to share and subscribe to information located within an area. For example, Amber Alerts can be sent to only people within a defined area. As another example, users can subscribe to information about particular areas—of their own definition—such as overnight snow-removal parking bans on a section of their street in Brooklyn.

Viewports (Bounding Boxes): Behind the scenes (invisible to the user), SEFF creates a viewport ("bounding box") as an element of its Location file format. (See FIG. 39B)

Fast Searches: This enables extremely fast two-phase searches. (1) In order to determine whether a SEFF is located within, surrounds, or overlaps an area, all results north of the "north" variable, south of the "south" variable, west of the "west" variable and/or east of the "east" variable are quickly eliminated using GREATER THAN, LESS THAN and EQUALS comparators in a SQL-like search syntax. (2) In the second phase, all returned results within or overlapping the viewport (bounding box) set by the user are compared to the boundaries of the polygon defined in the SEFF Location file and only those results that match the user-defined criteria are presented.

Distance from Location: In addition to its geo-search (latitude/longitude based; not word proxies for location), viewport (bounding box), and detailed irregular polygon capabilities, users can also use SEFF to search for information within a given distance of any location (e.g. within 1 km of the Cairo Sheraton, or within 50 meters of their current location).

Simultaneous Search for Information Within Multiple Areas: See Multiple Who, What, Where, When, Why, below.

When

Problem: Google has a limited ability to translate a date written as text into a meaningful date field, and no ability to do the same with time. Even the most sophisticated domain-specific SQL queries are typically granular only to the level of a day (i.e. no hours or minutes).

Solution: SEFF takes a similar approach to temporal awareness as it does to spatial awareness: it uses a type of temporal "bounding box" in its Event file format. A user-definable SEFF Event file includes a start date and time, an end data and time, and the applicable time zone.

Parent Events: An example of a parent-child relationship might be "Talk on the future of html by Sir Tim Berners-Lee." This Event can be a child Event defined as 2:00 pm to 4:00 pm Eastern Daylight Time on Wednesday, Sep. 18, 2019, with its parent understood to be "Conference on the State of the Internet" described as starting at 9:00 am on Monday, Sep. 16, 2019 and running until 4:00 pm on Friday, Sep. 20, 2019. As with SEFF files, Event files may be given unique IDs, so the relationship of the "parent" Event file within the "child" Event file is established using the synchs object.

Relationships Between Events: As with spatial searches, the Event concept enables users to find only that information that is within another Event, surrounds another Event, or overlaps another Event. Finding all concerts in Las Vegas during "My birthday weekend" is a breeze. This is impossible using current search methods.

Simultaneous Search for Information Within Multiple Events: See Multiple Who, What, Where, When, Why, below.

Why

Problem: To Google, a keyword is just another text string.

Solution: The "Why" search box accepts one or more keywords that can be used to either narrow or widen a SEFF search. For example, if a user scans the barcode on a bag of Werther's hard candies, SEFF will return only that result. The user many prefer to search for any nearby candy for sale by using the general keyword "Candy" instead of the very specific barcode for a single product.

Multiple Who, What, Where, When, Why

Besides bringing powerful simultaneous multi-field SQL-like W5L search capability to everything posted on it, SEFF can handle multiple variables within each of the W5L categories. For example, search for all flights on Lufthansa OR British Airways from Frankfurt into Heathrow OR Gatwick arriving Friday, Jul. 19, 2019 OR Friday, Jul. 26, 2019, OR Friday, Aug. 2, 2019.

Search as a SEFF Filetype

As with everything in the SEFF protocol, "Search" is a SEFF filetype and, as a result, Searches can be narrated, saved for later use, included in stories, posted, and shared.

SQL enables users to simultaneously search multiple fields using powerful operators such as "AND", "OR", "LESS THAN", etc. However, the teachings herein allow this structured relational approach to be applied to information on the internet that does not reside in structured domain-specific relational databases.

Traditional search engines can return matching text from millions of websites. However, the teachings herein allow for users to search for information that is less general where the user cares about its filetype, the person or organization that posted it, its location, and/or the timeframe during which it is relevant. On the internet today search engines end up being used like a phone book to point the user to another database from which the information may or may not be available.

In some embodiments, SEFF provides true simultaneous W5L search. SEFF Location and Event files are definable, savable, sharable, searchable, and re-usable. They enable a sophisticated searching, sharing (e.g. Amber Alert), and subscription functionality for the internet.

Use Case: Jane Adams Bridal Couture

Jane Adams runs a "bricks and mortar" bridal couture in Boston. Over the years she has invested heavily in a website for her store and she recently added online shopping via Shopify.

Without SEFF

Amanda Wilson, a 27-year-old bride-to-be was looking to buy a wedding dress. Steps:

Amanda did a Google Search for "Wedding Dresses Boston."

Google returned, rather unhelpfully, "About 23,700,000 results (0.78 seconds)".

Amanda clicked on a returned link.

Clicking on that returned link took Amanda to the web page for Jane's store.

Amanda found a "contact us" link on Jane's web page.

Amanda filled out a form and sent a message to Jane, requesting an appointment.

Amanda included her email address in the request so that Jane would have a way of reaching her. Communication has now moved from one method (web form) to another (email) and context has been lost.

Jane replied to Amanda via email that she had set up an appointment.

Amanda drafted an email to her mother, grandmother and maid of honour, who would be attending the appointment with her, giving them the name of the store and the date and time of the appointment Jane had sent her in an email.

Before sending the email, Amanda went back to the Adams Bridal website, and found a photo of the Lillium dress she was interested in.

Amanda right-clicked on the image, chose "Save Image As" and saved the file named "Blue_2019_Pro_Lillium_for_web_1024×1024@2x.jpg" to a folder on her computer.

Amanda then clicked the paperclip icon on her email program, browsed to the folder, and clicked on the file name to attach the image to her email.

She then returned to her draft email and added "p.s. I have attached an image of the dress I will be trying on."

Amanda's grandmother emailed back asking for the address of the store.

Amanda's maid of honour emailed asking if Amanda knew the bus route to the store.

Amanda's mother's assistant wrote back that she had created a calendar event item for the appointment and had attached it to her email for Amanda's convenience.

Amanda received the attached .ics file, saved it, double-clicked it, added it to her calendar, and then emailed it to the others. Any change to the appointment would require repetition of all of these steps and all users would then have two separate appointment files, one of which contained erroneous information. If they had used a SEFF Event file, it would have notified all users when changed.

Amanda found the store's address on the website and cut and pasted it into an email to her grandmother, noting "I don't see anything about parking. Their phone number is 617-555-1212. Probably worth giving them a call to get more info before driving downtown."

With the address on the clipboard of her computer, Amanda opened a web browser, went to Google, and entered "Boston Transit find route".

Google returned "About 167,000 results (0.92 seconds)," one of which was "Boston T-Plan your trip".

Amanda clicked on that link and was able to find a number of bus options. Unfortunately none of them included the bus stop number, an image of the area around the bus stop, or any other information about it.

Not knowing which route her maid of honour would prefer, Amanda advised her friend to try using the transit authority website herself.

Amanda also wished she had a view of the front of the store that she could send to everyone who would be meeting there; it would make it a lot easier to find the store, whether driving, using public transit, or walking. Information about parking and local restaurants and coffee shops would also be good to have.
With SEFF Amanda used SEFF to find the stores in Boston where should could buy her preferred wedding dress. SEFF's powerful multifaceted search engine enabled her to limit her search to Boston.

Jane already had a SEFF story—comprising audio, video, images, and text—about the dress, that she had obtained when she ordered the dress from its manufacturer. In seconds, on her smartphone, Jane used SEFF to add an appointment file to this information. She sent this new SEFF to Amanda using her store's SEFF Signature, which included: one-click directions to the store from anywhere; a one-click button to call the store; a standard format contact file that, with a single tap|click|swipe, was added to everyone's contact lists; links to all social media platforms for Jane's business; a street view of the front of the store for easy identification; an interior street view of the store so Amanda's group could get an idea of layout, seating, and inventory; the store's business hours; narrated sketches of the area around the store describing best parking options and prices; street views of the bus stops in both directions for easy identification; transit information specific to Jane's business; descriptions of a local restaurant and two coffee shops.

Despite being far more powerful and useful than her $100,000 website, Jane had made or imported all of these SEFFs for free, in a matter of seconds each, when she first started using SEFF. The SEFFs describing (and made by) the transit authority, the community association, and the restaurant and coffee shops had been synched with Jane's Signature with a simple tap|click|swipe. Since then, all of these default files had been automatically included in all correspondence that Jane sends using her store's SEFF Signature. Adding the appointment file and the SEFF provided by the manufacturer took seconds.

SEFF saved Jane, Amanda, her grandmother, mother, mother's assistant, and maid of honour hours of wasted time and frustration by making it fast and easy to:

find only those stores, in Boston only, that carry the Lillium wedding dress book, share, import, update, and remember the appointment add the store's contact information to programs on all devices, using a single tap|click|swipe share a rich, multimedia story about the dress find the best bus route and the correct bus stop get one-click in-car directions to the store from anywhere call the store with a single tap on a mobile phone if lost, late, or in need of more information explore local restaurant and coffee shops, using SEFFs generated by those businesses find the best parking based on a narrated sketch made by the community association identify the store, bus stops, and eateries easily, having seen them on a street view SEFF brings fast, fun, business-critical information-sharing to the Internet in a revolutionary way. In comparison, the World Wide Web isn't much more relevant, useful, or fun than having a copy of last year's Yellow Pages in the back seat of your car.

In some embodiments, the SEFF protocol consolidates all filetypes, database links, communications services, searches, and URLs into a single system.

In some embodiments, the SEFF file system is designed for a multimedia world. The SEFF file can have an audio component, great for narration in any language, and the best way to convey information to people on the move in a hands-free world. SEFFs that do not require narration still have a tiny, silent, audio file associated with them, for synchronization.

In some embodiments, a SEFF file has a duration. As a result, SEFFs can be presented in sequence. All effective information sharing requires sequencing, and SEFF delivers it to all information types and all information-management methods on the internet.

In some embodiments, unlike existing filetypes, SEFFs are designed to be played together, sequentially and automatically. This means that a SEFF exists within its intended context (e.g. SEFF B plays after SEFF A and before SEFF C).

In some embodiments, SEFFs are not limited to static files. A form connected to a database (interactive) can follow a video (static). A street view (interactive) can precede an image (static).

In some embodiments, SEFF files have a visual-representation element (an icon). SEFFs can therefore be easily re-ordered, selected and dismissed with simple tap|click|swipe gestures on all devices. Some operating systems make icons available for images but no operating system or internet protocol makes custom icons available for all information types and all information-management methods (e.g. URLs, search criteria, and all other types of information and information-management methods).

In some embodiments, a SEFF is accompanied by a metadata-rich Signature. Before SEFF, when an image of a product was emailed or posted on a social media platform, context was lost. SEFF retains context to ensure meaningful sharing of all information about products and all other filetypes. For example, if directions, business hours, phone number, etc., to a store that posted the SEFF are needed, the SEFF is designed to provide that information (and other information and methods) using one tap|click|swipe.

The purpose of the novel SEFF protocol is consistent with, and an improvement to, the purpose of the development of HTTP in 1989: to turn data into information by organizing it for a purpose and presenting it within a context.

Searching for information on the internet is not an easy task. It often starts with a web-wide search-engine search which then leads the user to numerous proprietary websites with their own databases that then require individual searching. All of these second-order searches use different layouts, searchable fields, algorithms, rules, and formats for both input and the presentation of results. Results are limited to URLs. Search terms cannot typically be saved, easily re-used, or shared. Any context that the user can glean from the results is limited to the structure of the relational database from which the results were queried. Many companies spend vast resources annually on "Search Engine Optimization". Search engines—both web-wide (e.g. Google), and proprietary (e.g. United Airlines) do not use geo-search. Instead, they rely on place-name entries in databases (e.g. SFO=San Francisco airport) as surrogates for much more powerful and useful geographic-information-system search capabilities (e.g. within a viewport [bounding box] defined by geographic coordinates). Temporal searches (i.e. within a timeframe) are limited to calendar days. For example, find a hotel with a check-in date of May 29 and a check-out date of June 3. Many "bricks and mortar" businesses cannot compete in an environment where their products can only be found by first finding their business via a Google Search and then searching their proprietary database. Many such stores (e.g. certain convenience store chains) do not even bother to try to compete online. Simultaneous multifaceted search is limited to some proprietary algorithms, not available to all business owners or internet users.

In some embodiments, SEFF searches preclude the need to do a web-wide search. Because no second-order search is required, all queries and results are accomplished using a single, optimized and familiar layout. Results are SEFFs themselves, which are content- and context-rich, and which can be easily shared, sequenced with other SEFFs, re-used, re-contextualized, etc. "Search" is a SEFF filetype in and of itself. Searches can be easily saved, shared, and re-run. Context is derived from SEFF metadata and can be easily adapted. SEFF searches are already "optimized". Everyone is on the same level playing field. SEFF uses powerful geographic coordinate system (i.e. latitude/longitude) search methods that understand points, lines (e.g. routes) and areas. SEFF is unique in enabling people to search for, as an example, products within a city block. SEFF uses "Epoch time" for temporal searches. For example, return only those search results relevant to 9:15 a.m. E.S.T. on May 29 until 6:00 p.m. on June 3. It is fast, simple and inexpensive for bricks and mortar businesses to post their inventory online with SEFF. A customer may simply scan the barcode of a desired product and the nearest businesses selling that product appear on a map, showing price. One tap|click-|swipe to get directions or call the business, view its business hours, etc. SEFF provides simultaneous multifaceted W5L (Who, What, Where, When, Why, Language) search (including location, timeframe, keywords, data provider, etc.) for all.

Computer

Figure 40:
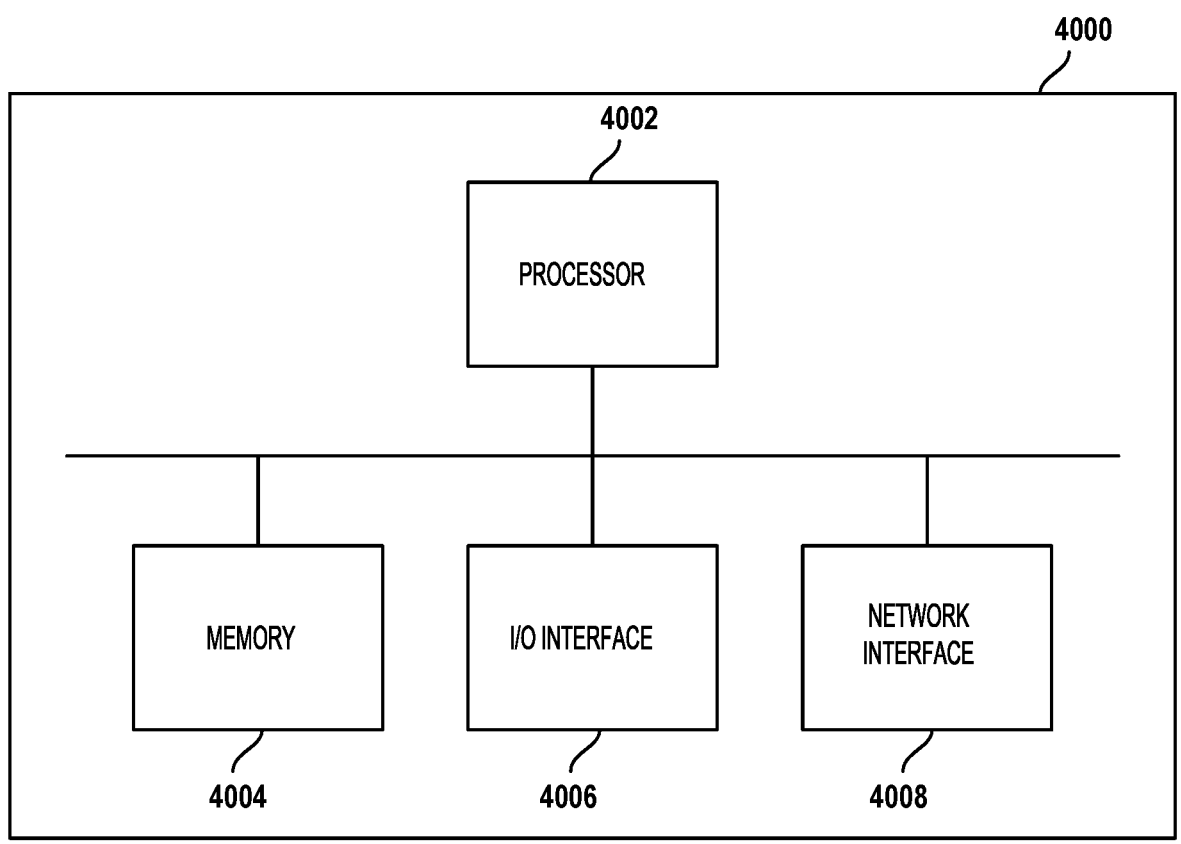
FIG. 40 is a schematic diagram of a computing device such as a user device or server.

FIG. 40 is a schematic diagram of a computing device 4000 such as a user device or server. As depicted, the computing device includes at least one processor 4002, memory 4004, at least one I/O interface 4006, and at least one network interface 4008.

Processor 4002 may be an Intel or AMD x86 or x64, PowerPC, ARM processor, or the like. Memory 4004 may include a suitable combination of computer memory that is located either internally or externally such as, for example, random-access memory (RAM), read-only memory (ROM), compact disc read-only memory (CDROM).

Each I/O interface 4006 enables computing device 4000 to interconnect with one or more input devices, such as a keyboard, mouse, camera, touch screen and a microphone, or with one or more output devices such as a display screen and a speaker.

Each network interface 4008 enables computing device 4000 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

The foregoing discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references are made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A digital information management system comprising:
   a receiving device comprising:
      at least one processor; and
      a memory storing instructions which when executed by the at least one processor configure the at least one processor to:
         receive a file construct from a source device, the file construct comprising:
            a file construct identifier attribute;
            an audio file;
            an icon element; and
            at least one metadata file; and
         render the file construct;
      wherein the file construct was generated by:
         receiving a selection for at least one signature construct to be associated to the file construct, each of the at least one signature construct comprising:
            a signature identifier associated with a source of the file construct;
            a signature icon file;
            a signature audio-synchronization file; and
            a signature metadata file;
         receiving a selection for a file construct type;
         initializing a temporary directory used to compile the file construct;
         generating an identifier associated with the file construct;
         generating and storing a file construct structure in the temporary directory, the file construct structure comprising:
            the identifier associated with the file construct;
            the file construct type;
            the signature identifier and name of the signature construct; and
            at least one additional settable file type variable associated with the file construct;
         associating a file construct audio-synchronization file to the file construct; and
         associating digital content represented as metadata to the file construct, the metadata associated with one of a plurality of content files, each content file comprising an identifier and a content file type.

2. The digital information management system as claimed in claim 1, wherein the icon element comprises:
   a fixed dimension icon rendered representation; and
   a multi-element exchangeable image file format (EXIF) metadata tag storing:
      the file construct identifier attribute;
      a file construct type attribute;
      a file construct name attribute;
      a file construct signature identifier attribute;
      a file construct signature name attribute;
      a file constrict duration attribute; and
      a file construct version attribute.

3. The digital information management system as claimed in claim 1, wherein the metadata file comprises a plurality of fields storing:
   a file construct identifier attribute;
   a file construct signature identifier attribute;
   a file construct type attribute;
   a file construct subtype attribute;
   a file construct name attribute;
   an audio name attribute for the audio file;
   an audio file extension attribute for the audio file;
   an audio file duration attribute for the audio file; and
   an audio file indication attribute for the audio file, the audio file indication for indicating whether the audio file is silent;
   a file construct language attribute;
   a file construct color attribute;
   a file construct orientation attribute;
   a file construct version attribute;
   a file construct hashtag array;
   a file construct syncs array; and
   a file construct data element comprising data corresponding to at least one data type field, each data type field comprising:
      a data type attribute; and
      data associated with the data type attribute.

4. A method of digital information management comprising:
   receiving at a receiving device a file construct from a source device, the file construct comprising:
      a file construct identifier attribute;
      an audio file;
      an icon element; and
      at least one metadata file; and
   rendering the file construct;
   wherein the file construct was generated by:
      receiving a selection for at least one signature construct to be associated to the file construct, each of the at least one signature construct comprising:
         a signature identifier associated with a source of the file construct;

a signature icon file;
a signature audio-synchronization file; and
a signature metadata file;
receiving a selection for a file construct type;
initializing a temporary directory used to compile the file construct;
generating an identifier associated with the file construct;
generating and storing a file construct structure in the temporary directory, the file construct structure comprising:
the identifier associated with the file construct;
the file construct type;
the signature identifier and name of the signature construct; and
at least one additional settable file type variable associated with the file construct;
associating a file construct audio-synchronization file to the file construct; and
associating digital content represented as metadata to the file construct, the metadata associated with one of a plurality of content files, each content file comprising an identifier and a content file type.

5. The method as claimed in claim 4, wherein the icon element comprises:
a fixed dimension icon rendered representation; and
a multi-element exchangeable image file format (EXIF) metadata tag storing:
the file construct identifier attribute;
a file construct type attribute;
a file construct name attribute;
a file construct signature identifier attribute;
a file construct signature name attribute;
a file constrict duration attribute; and
a file construct version attribute.

6. The method as claimed in claim 4, wherein the metadata file comprises a plurality of fields storing:
a file construct identifier attribute;
a file construct signature identifier attribute;
a file construct type attribute;
a file construct subtype attribute;
a file construct name attribute;
an audio name attribute for the audio file;
an audio file extension attribute for the audio file;
an audio file duration attribute for the audio file; and
an audio file indication attribute for the audio file, the audio file indication for indicating whether the audio file is silent;
a file construct language attribute;
a file construct color attribute;
a file construct orientation attribute;
a file construct version attribute;
a file construct hashtag array;
a file construct syncs array; and
a file construct data element comprising data corresponding to at least one data type field, each data type field comprising:
a data type attribute; and
data associated with the data type attribute.

7. A digital information management system comprising:
at least one processor; and
a memory storing instructions which when executed by the at least one processor configure the at least one processor to:
obtain a file construct, the file construct comprising:
a unique file identifier;
an icon file; and
a content file comprising digital content; and
send the file construct to a receiving device;
wherein the file construct was generated by:
receiving a selection for at least one signature construct to be associated to the file construct, each of the at least one signature construct comprising:
a signature identifier associated with a source of the file construct;
a signature icon file;
a signature audio-synchronization file; and
a signature metadata file;
receiving a selection for a file construct type;
initializing a temporary directory used to compile the file construct;
generating an identifier associated with the file construct;
generating and storing a file construct structure in the temporary directory, the file construct structure comprising:
the identifier associated with the file construct;
the file construct type;
the signature identifier and name of the signature construct; and
at least one additional settable file type variable associated with the file construct;
associating a file construct audio-synchronization file to the file construct; and
associating digital content represented as metadata to the file construct, the metadata associated with one of a plurality of content files, each content file comprising an identifier and a content file type.

8. The system as claimed in claim 7, wherein:
the icon file comprises metadata comprising at least one field of information, the at least one field of information includes at least one of:
a file type indication;
the unique file identifier;
a file title;
a file version reference;
a file color attribute;
a signature identifier;
a signature name;
a duration attribute; and
an orientation attribute; and
the content file comprises at least one of:
a mime-type file;
a variables file comprising at least one of:
the digital content;
attributes associated with the digital content;
a uniform resource locator (URL) associated with the content; or
search terms for locating the content; or
a script, which when executed by a processor, provides the content.

9. The system as claimed in claim 7, wherein to obtain the file construct the at least one processor is configured to one of:
receive the file construct from another user device;
generate the file construct; or
locate and retrieve the file construct from a repository.

10. The system as claimed in claim 7, wherein the file construct includes a signature icon file comprising at least one field of information including at least one of:
- a signature type indication;
- the unique signature identifier;
- a signature title;
- a signature version reference;
- a signature color attribute;
- a signature identifier;
- a signature name;
- a duration attribute; and
- an orientation attribute; or
- an audio file comprising:
  - a unique audio file identifier; and
  - wherein audio in the audio file comprises at least one of:
    - a default duration of silence;
    - a narration generated for the file; or
    - existing audio associated with the file.

11. A method of digital information management comprising:
- obtaining at a processor a file construct, the file construct comprising:
  - a unique file identifier;
  - an icon file; and
  - a content file comprising digital content; and
- sending the file construct to a receiving device;
- wherein the file construct was generated by:
  - receiving a selection for at least one signature construct to be associated to the file construct, each of the at least one signature construct comprising:
    - a signature identifier associated with a source of the file construct;
    - a signature icon file;
    - a signature audio-synchronization file; and
    - a signature metadata file;
  - receiving a selection for a file construct type;
  - initializing a temporary directory used to compile the file construct;
  - generating an identifier associated with the file construct;
  - generating and storing a file construct structure in the temporary directory, the file construct structure comprising:
    - the identifier associated with the file construct;
    - the file construct type;
    - the signature identifier and name of the signature construct; and
    - at least one additional settable file type variable associated with the file construct;
  - associating a file construct audio-synchronization file to the file construct; and
  - associating digital content represented as metadata to the file construct, the metadata associated with one of a plurality of content files, each content file comprising an identifier and a content file type.

12. The method as claimed in claim 11, wherein:
- the icon file comprises metadata comprising at least one field of information, the at least one field of information includes at least one of:
  - a file type indication;
  - the unique file identifier;
  - a file title;
  - a file version reference;
  - a file color attribute;
  - a signature identifier;
  - a signature name;
  - a duration attribute; and
  - an orientation attribute; and
- the content file comprises at least one of:
  - a mime-type file;
  - a variables file comprising at least one of:
    - the digital content;
    - attributes associated with the digital content;
    - a uniform resource locator (URL) associated with the content; or
    - search terms for locating the content; or
  - a script, which when executed by a processor, provides the content.

13. The method as claimed in claim 11, wherein obtaining the file construct comprising at least one of:
- receiving the file construct from another user device;
- generating the file construct; or
- locating and retrieve the file construct from a repository.

14. The method as claimed in claim 11, wherein the file construct includes a signature icon file comprising at least one field of information including at least one of:
- a signature type indication;
- the unique signature identifier;
- a signature title;
- a signature version reference;
- a signature color attribute;
- a signature identifier;
- a signature name;
- a duration attribute; and
- an orientation attribute; or
- an audio file comprising:
  - a unique audio file identifier; and
  - wherein audio in the audio file comprises at least one of:
    - a default duration of silence;
    - a narration generated for the file; or
    - existing audio associated with the file.

* * * * *